US009183572B2

(12) United States Patent
Brubaker

(10) Patent No.: US 9,183,572 B2
(45) Date of Patent: Nov. 10, 2015

(54) SYSTEM AND METHOD FOR OBTAINING REVENUE THROUGH THE DISPLAY OF HYPER-RELEVANT ADVERTISING ON MOVING OBJECTS

(76) Inventor: Curtis M. Brubaker, Monarch Beach, CA (US)

( * ) Notice: Subject to any disclaimer, the term of this patent is extended or adjusted under 35 U.S.C. 154(b) by 937 days.

(21) Appl. No.: 12/293,277

(22) PCT Filed: Mar. 16, 2007

(86) PCT No.: PCT/US2007/064175
§ 371 (c)(1),
(2), (4) Date: Jan. 20, 2009

(87) PCT Pub. No.: WO2007/109541
PCT Pub. Date: Sep. 27, 2007

(65) Prior Publication Data
US 2009/0299857 A1 Dec. 3, 2009

Related U.S. Application Data

(60) Provisional application No. 60/783,577, filed on Mar. 16, 2006, provisional application No. 60/794,006, filed on Apr. 21, 2006.

(51) Int. Cl.
G06Q 30/02 (2012.01)
(52) U.S. Cl.
CPC ............ G06Q 30/0269 (2013.01); G06Q 30/02 (2013.01)
(58) Field of Classification Search
None
See application file for complete search history.

(56) References Cited

U.S. PATENT DOCUMENTS

| 5,150,116 | A * | 9/1992 | West | 340/928 |
| 6,484,148 | B1 * | 11/2002 | Boyd | 705/14.64 |
| 6,545,596 | B1 * | 4/2003 | Moon | 340/425.5 |
| 2002/0009978 | A1 * | 1/2002 | Dukach et al. | 455/99 |
| 2002/0135515 | A1 * | 9/2002 | Rankin et al. | 342/385 |

(Continued)

FOREIGN PATENT DOCUMENTS

| JP | H02-93147 | 7/1990 |
| JP | 3020426 U | 1/1996 |

(Continued)

OTHER PUBLICATIONS

PCT/US07/64175 A3 Search Report dated Oct. 12, 2007.

(Continued)

*Primary Examiner* — Eric Netzloff
(74) *Attorney, Agent, or Firm* — Wilson Sonsini Goodrich and Rosati

(57) ABSTRACT

A system for obtaining revenue through the display of advertising on fixed or moving objects id disclosed. Such objects receive, store, poll and extract data to present content based on the time of day, locations, and relative movements in a specific environment, where data and information stored in moving or mobile objects within that environment can be transmitted between those objects or to stationary objects, where it is then used to enable and control such displays for which the owners of those objects are then compensated. The system enables the display of hyper-relevant ad content with synchronized remote audio, personal messaging and public service alerts on surrounding objects and provides for the real-time logging and later downloading of data to confirm communications and content deliveries between objects, track and measure consumer engagement, verify consumer's direct responses to ad viewings with accountability systems.

70 Claims, 23 Drawing Sheets

(56) References Cited

U.S. PATENT DOCUMENTS

| | | | |
|---|---|---|---|
| 2002/0164962 A1 | 11/2002 | Mankins et al. | |
| 2002/0167416 A1 | 11/2002 | Polyakov | |
| 2003/0006911 A1* | 1/2003 | Smith et al. | 340/988 |
| 2003/0050744 A1 | 3/2003 | Saraiva | |
| 2003/0195670 A1 | 10/2003 | Smith et al. | |
| 2004/0036622 A1 | 2/2004 | Dukach et al. | |
| 2004/0226204 A1* | 11/2004 | Green | 40/591 |
| 2005/0024189 A1 | 2/2005 | Weber | |
| 2005/0091890 A1* | 5/2005 | Snyder | 40/442 |
| 2005/0231385 A1 | 10/2005 | Haase | |
| 2007/0079331 A1* | 4/2007 | Datta et al. | 725/42 |
| 2007/0112762 A1 | 5/2007 | Brubaker | |
| 2007/0132664 A1* | 6/2007 | Weissman | 345/30 |

FOREIGN PATENT DOCUMENTS

| | | |
|---|---|---|
| JP | H10-207413 | 8/1998 |
| JP | H 11-065343 | 3/1999 |
| JP | 2000-071895 | 3/2000 |
| JP | 2004-279509 | 10/2004 |
| JP | 2007-526165 | 9/2007 |
| KR | 10-2005-0008281 | 1/2005 |
| KR | 10-2005-0043353 | 5/2005 |
| KR | 10-2005-0072369 | 7/2005 |

OTHER PUBLICATIONS

International written opinion dated Oct. 12, 2007 for PCT Application No. US07/64175.

CNET. Light car open source: bringing OLED TVs to the streets. Mar. 4, 2009. Accessed Jul. 23, 2014.

European search report and opinion dated Apr. 25, 2014 for EP Application No. 07758697.2.

Evans. German Firm EDAG Previews Light Car Concept Ahead of Geneva Debut. Jan. 20, 2009. Accessed Jul. 23, 2014.

Paukert. Geneva 2009: Clever EDAG 'Light car open-source' is like safety television for tailgaters. Mar. 3, 2009. Accessed Jul. 23, 2014.

Office action dated May 21, 2015 for KR Application No. 10-2014-7033391.

* cited by examiner

SYSTEM AND METHOD FOR OBTAINING REVENUE THROUGH THE DISPLAY OF HYPER-RELEVANT ADVERTISING ON MOVING OBJECTS

CROSS-REFERENCE TO RELATED APPLICATIONS

This application claims priority from U.S. provisional application Ser. No. 60/783,577, filed on Mar. 16, 2006, incorporated herein by reference in its entirety, and from U.S. provisional application Ser. No. 60/794,006, filed on Apr. 21, 2006, incorporated herein by reference in its entirety.

This application is related to U.S. nonprovisional application Ser. No. 11/552,932, filed Oct. 25, 2006, incorporated herein by reference in its entirety, which claims priority from U.S. provisional application Ser. No. 60/729,919, filed on Oct. 25, 2005, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant

BACKGROUND OF THE INVENTION

1. Field of the Invention

This invention pertains generally to effectively providing advertising content with respect to a prospective consumer's desires and, more particularly, to an integrated system and method for directing hyper-relevant content to consumers through the use of wireless technologies for the exchange of information, including the compensation of users for providing or viewing content.

2. Description of Related Art

In the ad business, there are a handful of yet to be realized holy grails. They are: (1) Deliver your ad to the correct demographic (age, gender, income level, etc.); (2) Deliver it at a time its recipient is sure to see it (not when he's out for a soda or in the bathroom); (3) Pitch your ad to consumers who are truly interested in what you are selling (instead of wasting advertising dollars on those who are not); (4) Catch consumers when they're relaxed and open to suggestion (instead of preoccupied with other things); (5) Reach audiences TV can't reach and do it with more targeted spots in a single day than they'd catch on regular TV; (6) Connect with buyers at the right time (i.e.: sell them food at meal times); (7) Get your message to consumers when they are at an opportune location (for example, promote a great restaurant at meal time a couple of blocks from the place); (8) Put ads into the distribution pipeline in just seconds using the Internet; (9) Base billings on the actual content delivered and do it all electronically and automatically; (10) Give advertisers proof their ads actually ran and track them on a minute to minute basis; (11) Provide feedback to the agency or its clients on consumer engagement; (12) When your ad shows, let viewers buy (or at least get more information) at the push of a button. Unlike any existing commercial advertising system, the present invention delivers all of these objectives, and more, by creating a totally new kind of mobile communications platform and forum.

Advertising.

Madison Avenue is working to outdated media models and needs to figure out emerging media fast or it stands to lose billions of dollars to others who will. Over the next decade, major money will be set in motion to create entirely new ad platforms and new ways to reach consumers in what today is a $250 billion industry. In the process, the ways and means of the contemporary ad business are going to be turned inside out, not so much because of the present invention, but because of the many emerging technologies that make it possible. For years, marketers have taken their best shots at consumers. Much of it is creative guesswork which follows available technology and distribution streams that were invented for other purposes. Television, for example, developed as a communications resource and quickly evolved into a form of free entertainment where marketers could insert the products and services others wished to sell into the paths of consumers while they were having a good time. It was not important if those people were really interested in the products and services; TV was simply the best way to expose products and services to consumers because TV had traffic. However, ad executives are beginning to recognize how much money is being wasted on antiquated media plans. For the first time in history, TV Spot ads were the biggest loser in ad spending for 2005, sinking 9.5% to $15.5 billion, because viewers have 'left the building.' Yet, newspapers, magazines, cable, and syndication all showed gains, with the category of outdoor advertising rising by 9.8% to $3.5 billion.

While consumers are looking for new things to do and new ways to entertain themselves, marketers are looking for audiences. However, audiences today are increasingly sophisticated about avoiding advertising messages. What is needed isn't just any audience, but an audience that truly cares about what advertisers have to say and sell, and those ad messages have to be bright, quick, and relevant to the new audience's current interests and lifestyle. Today, the gold rush is toward the Internet and to what has been termed the "3rd screen," those tiny carry-around displays found on cell phones, iPods, and PDAs. Once again, marketers want to insert themselves (and their content) into our everyday business and fun. It is estimated that as much as 25% to 30% of the $100 billion spent each year on brand advertising will soon find its way to such mobile screens, but will users who pay for such services accept advertising? To borrow a statement from a highly-placed marketing industry executive: "If I'm a 22-year old male and I've downloaded four 3D games to my phone in the last 30 days, chances are pretty good I'd be interested in seeing a Sony PS3 commercial on my device." He may be right. Recent studies have determined that kids like watching ads as long as they represent something they're interested in. Look at the Super Bowl, where large numbers of viewers tune in primarily to watch the ads. Consumers like these want to participate, want more to talk about, and want ultimately to have a say, so they can certainly take the time to tell advertisers about the kinds of content they would like to see. Yet, today's marketers have failed to recognize that there are technologies emerging today that can open dialogs between consumers and creatives and still leave the field open for expression and execution by the professionals in it.

New canvases are needed along with the audiences to go with them, but to secure them will require more than repurposed TV spots for tiny screens on the go. What is required is a systemic rebirth of the ad game including novel applications and pragmatic distribution. But more than anything, it requires marketers to get more in touch with consumers who are more in touch with themselves, with consumers who are articulate enough to tell us at least two things: 1) who they are, and 2) what they want. Technology can enable this, but there needs to be an economic reason for consumers to opt into the game. The present invention has been conceived to provide just that.

Visual Congestion

American cities are converging on BladeRunner-like visual clutter, and few regulatory brakes have been applied to this accelerating buildup. Electronic displays on taxi tops vie with sign-wrapped busses and trailers, bus shelters plastered with ads, lighted store signs, and a profusion of billboards, many with revolving panels and flashing lights, and now many with radio-enabled audio. The situation promises to worsen. Nanoscale components promise larger, cheaper, high-resolution video screens that are bound to find their way into signs, surfaces, and products of all kinds. We are already inundated with visual ads: our daily sensory diet includes thousands of commercial impressions, from pop-ups and animations in Web content to TV's full arsenal of 30-second spots, now with product placements embedded in what remains of the entertainment. With increasingly new technologies and eye-catching designs competing for drivers' attention, regulatory agencies, traffic engineers, and advocates are beginning to question which of these potential distractions may also pose a risk to driving. To what extent can commercial signage be blamed for accidents? What do we know about the nature of attention and distraction? Can this proliferation be rationally controlled?

Surveys show that signs and billboards indeed compromise traffic safety, especially at intersections and on curves. Flashing lights, motion, visual clutter, and novelty (e.g., the Times Square/Las Vegas Strip effect that is replicating so quickly in major cities) are implicated as part of the problem. Additionally, research on driver distractions confirms that visual complexity compromises safety by forcing drivers to scan the environment longer for street signs, turns, or critical landmarks. Researchers using eye-tracking devices to monitor drivers in traffic are finding that video signs are more distracting than static signs and can act as catalysts, increasing ad gazing of all types, even in unsafe situations. Similar studies are documenting the effects of visual distractions on both young and old drivers to determine what constitutes safe, manageable amounts of information, and the effects of animation, video, and moving panels on drivers, in efforts to set standards so that electronic signs and billboards are legible and non-distracting. To be non-distracting, however, is to contradict the entire purpose of outdoor advertising, and therein lies the problem.

It is undisputed that people are easily distracted. Theories of attention point out relationships between mental excitation/interest and the ability to perform tasks. We function best somewhere between boredom and over-stimulation. What researchers have found is that new or unexpected stimuli trigger involuntary responses and the more bored or unfocused we are, the more susceptible we are to these surprises. Studies have also identified modes of visual perception: a focal, or search, mode that is narrow and specific, and an ambient mode that is a sort of default, which is not focused on anything in particular, but having better peripheral awareness. We've learned that computer users performing search tasks in the center of the screen are slowed when objects appear on the perimeter, even when they aren't consciously aware of them. The more peripheral objects, the greater the distraction. Thus, the more we direct our attention towards that periphery, the less we focus on what's in the middle of our screens, or in the middle of our roads. Researchers have also found that new, moving and looming objects command attention; that the onset of motion triggers overriding or urgent attention, possibly tapping the survival instinct; and that changes in color can capture attention. None of this proves that outdoor ads cause accidents, but behavioral mechanisms clearly come into play when drivers encounter roadside signage. The notion that content is a major factor in drawing attention is starting to be examined. Because content and distractions are inevitable, a solution may lie in controlling them and in determining exactly how, when and where they should occur. That's a tall order, but it is also a primary objective of the present invention.

Physical Congestion

Just as advertising seems to clutter our landscape, so do moving objects. Traffic congestion in our major cities has reached epidemic proportions, prompting nationwide studies to get a handle on the problem. In places like Los Angeles, where, in the late fifties, one could drive anywhere to its outskirts in 20 minutes, it now takes hours, regardless of the time of day. According to the 2005 Urban Mobility Study Report, released in May by the Texas Transportation Institute of Texas A&M University, sixty-seven percent of the peak period travel was congested in 2003, compared to only 32 percent in 1982; fifty-nine percent of the major road system was congested in 2003 compared to 34 percent in 1982. The number of hours of the day when congestion is encountered has grown from about 4.5 hours in 1982 to more than 7.1 hours today. Traffic congestion is worse in the large urban areas than in the smaller ones, but even the smaller areas are unable to keep pace with rising demand. According to the study, 10 years is not an unrealistic timeframe to go from an idea to a completed project or to an accepted program due to the significant planning and development required. But in ten years at current growth rates, the urban area average congestion values will jump to the next highest classification—i.e.: medium areas in 2013 will have the congestion problems large areas had in 2003.

What does this mean in cost to consumers? In 2003, congestion (based on wasted time and fuel) cost drivers about $63.1 billion in the 85 urban areas studied. The average cost per traveler in those 85 urban areas was $794. Costs ranged from $1,038 per traveler in "very large" urban areas down to $222 per traveler in the "small" areas—and all this with fuel costing far less than it does today. Of the 85 urban areas studied, 2.3 billion gallons of fuel were wasted, an amount that would fill 46 supertankers or 230,000 gasoline tank trucks. In urban areas with populations greater than 3 million, 1.5 billion gallons of fuel (more than two-thirds of the total!) was wasted. At $2.00 per gallon, that's $3 billion tossed out by drivers in stop and go traffic. During that same period the Outdoor Advertising Association of America (OAAA) reports advertisers spent $5.5 billion on out-of-home advertising. If outdoor advertisers had instead placed that $5.5 billion in ads using the present invention, they'd not only have put their money into a superior ad platform, they'd have been able to reimburse drivers for their wasted $3 billion and still have $2.5 billion left over to spend elsewhere.

Plenty of studies have been launched to figure out what to do about our worsening traffic, but few concrete proposals have surfaced. Certainly, no proposals have emerged suggesting that we compensate drivers for their daily delays. Just the same, until we have a meaningful cure for congestion, the present invention can, to a degree, offset owners for their wasted time and money while they experience it.

Moving Objects

For as long as there have been moving objects, people have advertised on them. From early buckboards and stagecoaches to modern trains, subways, busses and aircraft, moving objects are the basis for corporate and self promotion, personal expression, identification and advertising. Today, it is not unusual to see cars, trucks, entire busses, even independently-towed trailers adorned with wraps or ads for products and services—many of these are backlighted to draw the attention of drivers and pedestrians while they parade down city streets nationwide. One of the world's largest advertisers, ClearChannel Outdoor, markets a variety of Taxi Tops for use in city traffic atop cabs. These come in various sizes and in two, three or four sided models which are typically backlighted to display graphics at eye level to passing sidewalk or pedestrian foot traffic. Some of these have lenticular screens to create movement, built-in LED readout pads, or larger LED panels to produce scrolling text, or more elaborate displays with flash type animation. The latter can be optionally linked to an onboard GPS system so it can be programmed to show only on specific streets or in special areas of the city. On these displays, ClearChannel's clients control the content, not in real time, but well in advance of street exposure. ClearChannel also offers a 14"×36" flat, bolt-on trunk mounted sign which is positioned more or less at eye level to following motorists. ClearChannel's Taxi Media division refers to these as advertising "tonnage" since the car behind will view the same static, print ad for 5 to 20 minutes (the time a vehicle spends behind it in traffic in such places as New York City).

Another company, MotionLED, sells a long, slim LED panel which can be attached with suction cups to the interior of a vehicle's windows where it can scroll text messages horizontally, similar to those present in retail stores. These units are available in four lengths, from 8 to 40 inches, and in a choice of lettering in one of three colors. All of these are piecemeal efforts toward the presentation of advertising messages in public spaces and represent little more than a "shotgun" approach to demographic targeting. Advertisers using these techniques can only hope they will get exposure in the right part of town or at the right time of day and to people who may be inclined towards their product.

Distribution

Madison Avenue is working aggressively to convert its costly, labor-intensive and still largely paper-based process of buying and billing media. Even the Internet has yet to develop the crucial rules of business or programming schemas for buying and selling online that Madison Avenue truly needs. A recently released status report compiled by the American Association of Advertising Agencies (AAAA) shows that the Internet has achieved only one out of nine essential steps for conducting all electronic advertising, giving it the worst "discrepancy" rates (the percentage of advertising buys that don't run as originally ordered) of any major medium. That puts the Internet on par with out-of-home, radio, and network TV as the least progressive electronic business trading partners. Even the most analog of all media—magazines and newspapers—have made greater electronic business strides than the Internet and are today capable of at least taking orders electronically. The advertising community needs to engage in a massive combined effort before it can claim independence from the labor-intensive manual steps of paper processing and human input which drives up the cost of media buys and produces accounting inaccuracies. The present invention represents not merely an ad platform to deliver hyper-relevant content, but is one which is totally electronic from the ground up, integrating creativity, distribution, tracking, measurement, engagement, accountability and compensation into a single, verifiable, automated closed-loop network. As comprehensive and seamless a system has been previously unheard of in the world of contemporary advertising.

Television

Advertisers place ads everywhere from skywriting to urinals and from grocery store check-out dividers to the fruits and veggies themselves. However, it has always been the full motion video display that delivers the goods. Advancements in flat screen technology have allowed displays to creep into elevators, gas pumps and restrooms—wherever someone with a need to pause for a few seconds is present. Just as relentlessly, marketers are pursuing consumers who are on the move. With nearly 200 million U.S. subscribers to wireless services, marketers are wondering if ads beamed to wireless devices such as cell phones, Blackberries and hybrid devices will evolve into a viable media platform without upsetting their users. Some have referred to GPS cell phones as "the silver bullet" since they promise to let marketers send retail pitches to mobile users who might be in the vicinity of their stores. Chrysler Corporation is launching its own Mobile Phone TV Channel called "The Jeep Channel" which will actually run TV style commercials on cell phones.

From tiny screens to huge ones: ClearChannel's Outdoor Division and Digital Advertising Network, a Montreal provider of digital screen networks, have teamed to place hundreds of 4×16 foot video displays in shopping mall food courts across the country. Among other things, these will show the same kinds of 30-second TV spots you can see in your living room. And despite declines in viewership due to ad-skipping Digital Video Recorders (DVRs) and media alternatives such as the Internet, American viewers still spend between four and eight hours per day, per person, glued to their TVs—more than any other nation—but with Japan a close second. If these hours are spent watching commercial television, it's a fair guess they're watching about 15 minutes of commercials as well. Look again at the 2005 Urban Mobility Study Report. In the "very large" areas studied, there were 61 hours of delay per traveler per year, which is 219,600 seconds a year. In television ad terms that's nearly thirty 30-second commercial spots per day, and nearly sixty 15-second commercial spots each day. In Los Angeles, the numbers are even better. Angelinos experience 93 hours of delay per traveler per year or 334,800 seconds a year, That equals 44.64 30-second TV spots per average day, or nearly 90 15-second spots per day.

Measurement

Getting a handle on who's watching what in terms of advertising is critical to proving the worth of a media platform. This need for proof has spawned a variety of devices, programs and companies—some are now household words—whose job it is to measure the existing ad viewer base. ClearChannel is evaluating Requests for Proposals (RFPS) looking for new electronic devices to measure its huge radio audiences. Arbitron, a firm specializing in ad measurement, has developed a device called a portable people meter (PPM), a passive electronic device intended to replace the old-fashioned paper diary methods of documentation. Nielsen Media Research, meanwhile, plans a "portfolio" strategy toward adopting devices to improve the accuracy of its TV ratings services, which today also measure the time-shifted viewing of DVRs, video-on-demand and other competing platforms such as the Internet and mobile media. In December 2005, Nielsen Outdoor delivered its first wave of out-of-home demographic data to reveal the most likely people to see advertising on billboards. Nielsen convinced respondents to wear GPS-equipped pager size devices called Npods, then combined their respondents' traffic patterns with a map of outdoor advertising sites to determine who passes what kinds of outdoor ads, and when. Nielsen's data does not provide demographics on a per user basis for individual outdoor sites; it only gives advertisers a sense of what consumers could have been exposed to and roughly how often. The methods for gathering and applying ad measurements are woefully lacking in an industry that, in other respects, is mature and widespread.

Fundamental to ad measurement is defining what constitutes an "impression" or a "view." Special software has been created to measure billboard views. Systems for television identify the number of household impressions, the time of day video-on-demand (VOD) programs are viewed and the demographics down to a ZIP code. But like the online industry, the VOD industry is still trying to figure out an "impression." Cable operators count them as any on-demand program that's been downloaded for which playback has been initiated. Advertisers are more interested in knowing how many people watched the entire stream to be sure they saw the ad. There is often discrepancy even within the same company as to what the guideline should be. Some Internet folks say an ad can't be counted until the user's browser sends a message requesting it, while others won't count it as an impression until the full ad loads and appears on the screen. The cable guys count VOD views from the moment a program is ordered from a customer's set-top box, but if ad-supported VOD is to become more prevalent, the definition needs to include whether or not viewers started watching, and if they did, for how long? Still other companies are deploying electronic verification technologies to prove ads really ran on the schedules ordered and that their clients got what they paid for. Confusing? Yes.

The present invention does not have these problems. First, the present invention is not inserting commercials into an entertainment stream, it is showing ads exclusively. Secondly, since every showing is essentially "requested" by an electronic device on one moving object or another, all such requests and completed deliveries are confirmed as they occur and are logged for later downloading. Such integral measurements reveal what content was viewed, precisely where it was viewed (based on GPS data), when and by whom it was viewed (in significant demographic detail), and for exactly how long. The system also documents whether or not any impulse information was requested or if any purchases were made as a result of the viewing. Finally, the system can the track geographic movements on the part of moving objects after content viewings to confirm local area effectiveness—for example driving to a specific hotel or restaurant immediately after seeing an ad for it. Furthermore, every content request—whether or not it resulted in a confirmed delivery—is recorded on the hard drive of every involved moving object. This means that a detailed 24-hour map—a "data snapshot," if you will—can be reconstructed to tell marketers where consumers went, when they went, who may have been with them at the time, what they were looking for as they did and whether or not in some cases they found it. To the best knowledge of the Applicant, to date, no other organization, system, means or technology has conceived or proposed offering such an exacting and automated capacity to deliver, measure, collect, process, assess, re-create, distribute, confirm, and then measure again the absolute effectiveness of conventional or hyper-relevant advertising and other types of consumer content on such a widespread scale and, in addition, to reward the average consumer for so doing.

Targeting

Geo-destination targeting is a process of combining IP-based targeting—a very common technique that allows advertisers to target ads based on the location of a user—with, for example, information about the city a user is searching for. For example, if a user in San Francisco is searching for an address in Austin, Tex., online marketers can target airline ads advertising cheap fares from San Francisco to Austin.

In the same way, the present invention can poll information from a moving object. For example, by using its onboard GPS Navigation system with its selected destination and route and then coupling that information with an owner's stored profile, a wide variety of highly directed ads can immediately be triggered for presentation on any of the moving objects it might encounter en route: retail stores of high interest, restaurants with favorite foods, hotels, trip stops or other points of interest that are known to meet his or his family's preprogrammed interests. Additionally, if onboard data indicates a history in searching out or purchasing certain kinds of items, such as men's leather boots, for example, and the traveler is passing through a town where there is a manufacturer specializing in fine leather boots, the present invention can "borrow" the displays of surrounding objects as the traveler nears town or passes through it, and call that fact to his attention. The providers of those borrowed displays will be compensated in kind for their use.

Behavioral Targeting

Behaviorally-targeted advertising is a way for marketers to get better aquatinted with their buyers. The Internet allows researchers to track buyers after the fact, to measure the things they look at, browse through or order. When they go back for more they can be "retargeted" with relevant advertising, relevant because they've already expressed significant interest in it, or perhaps in something related to it. Retargeting is used to cross-sell customers who previously bought something, or to contact prospects again in an attempt to lead them to a conversion event, such as a sale, a download or a newsletter signup. This works better with some groups than with others but it's another way for potential buyers to tell potential sellers who they are and what they want through their actions. Why not take this idea to the next level—as with the present invention—where buyers and sellers actually cooperate in such an exchange and where each side benefits greatly from the effort?

Buzz Targeting

Nielsen BuzzMetrics, a company which specializes in the measurement of consumer-generated media and word of mouth, claims, "In a world where word of mouth is on steroids, marketers need to focus just as much on the negative buzz as on the positive," then goes on to characterize most advertisers as "ill-equipped" to respond to the quick-acting blogospheres so famous for churning out bad news at prodigious rates. The real 'read-between-the-lines' news here is that today's consumers are quite willing to speak out, and speak out loudly, about having better products and services. In other words, when it comes to understanding their customers, advertisers no longer have to be reactive, they can be proactive. They can ask. This is something marketers have not often bothered to do. Learning what buyers really want and really care about—what truly turns them on—and using that to mutual advantage is a critical part of the present invention.

Interactivity

Remember the last item on the list of advertising holy grails? Buy at the push of a button? XM Satellite Radio is preparing to ship portable MP3 players that will do just that, at least for music. A deal with Napster lets users push a button to "bookmark" songs they hear, and then the next time they dock their player with their computer it automatically buys those songs over the Internet. This is possibly the start of a trend. The present invention, however, goes a few steps further, thanks to a totally integrated advertising and distribution infrastructure. When users in moving objects in the field see an ad that intrigues them, they can push a button to get immediate information (such as pricing and availability), or they can request other things such as having a brochure sent to their computer. If they really like what they see and hear, however, they can buy the item on the spot. No need to dock with the Internet to complete a transaction, because credit and shipping have all been set up in advance, as will be explained later. You can even request a day or two to change your mind before the product ships. Imagine you're major film studio releasing a big movie for the weekend. You've budgeted a substantial ad spend to promote the grand opening with significant print and TV spots to generate excitement. How would you like to be able to deliver a mind-blowing 30-second trailer with surround sound to 100,000 teenage boys driving at 6:00 PM on a Friday night just as they're trying to figure out what they're doing that weekend? Then follow it up with a push button opportunity to have tickets waiting at a theater just minutes from their precise locations along with an electronic discount at a nearby Burger King? The present invention allows exactly such a promotion to be executed, both instantly and seamlessly.

The New Canvas

Computer and display technologies are considerably more advanced than the world of advertising which uses them. Liquid crystal displays (LCDs), Plasma and Digital Light Processing (DLP) have hit their stride and, although they are still expensive for many consumers, they are today produced in volume and their costs are falling. LCDs were invented around 1963 and were first intended as slimmed-down replacements for bulky CRTs or as screens for wall mounted TVs. Scaling up to large surfaces, unfortunately, was a problem. Instead, LCDs became the standard display for everything from watches to laptop computers and, as is commonly known, are rapidly replacing conventional lighting including brake lights and tail lamps on production automobiles.

A newer product, Organic Light Emitting Diodes (OLEDs), pioneered and patented by Kodak/Sanyo, now promise that original vision with higher levels of brightness and sharpness not possible with previous technologies. OLEDs are self-luminous but don't require the backlighting, diffusers or polarizers required by LCDs. OLEDs consist of two charged electrodes sandwiched on top of organic light emitting material, which eliminates the need for mercury lamps and yields a thinner, lighter display having very low power consumption. These displays are tough enough to use in portable devices and automobiles, can be viewed at angles up to 160 degrees and are able to produce clear, distinct images, even in bright light. OLEDs also produce high image resolutions, and because each pixel can be turned on or off independently, they can create multiple colors in a very fluid, smooth edged display. They are 20% to 50% cheaper than LCD processes yet utilize plastics that make them tougher and more rugged. Manufacturers claim processes that are akin to the "printing" of newspapers and anticipate panels that are bendable and potentially formable with no inherent barrier to large size glass and displays. In other words, these should be very cheap in the future.

Meanwhile, scientists at the Fraunhofer Institute for Applied Polymer Research (IAP) in Potsdam are making OLEDs transparent. While metal oxide coatings in earlier OLEDs made them opaque, researchers are investigating transparent physical properties. Such displays can be switched on and off to create graphics or video on demand, embedded in normal glazing. Because these new panels interfere little with visible light or views, their development is ideal for such applications as heads-up displays in car windshields or for the kinds of displays anticipated by the present invention. Of significance is that under the proposed business model, capital investment will become available to refine processes and develop the necessary production equipment for the earlier supply of OLED displays on a cost-effective basis, volume-matched to an established and mature transportation industry.

Government Agencies

It may be beyond the practical scope of this document to assess all of the potential areas of interface with respect to the U.S. government and the present invention. Although the U.S. government has many ongoing programs relating to moving object telecommunications, the applicant is unaware of any specific government prior art that would conflict with this invention. One envisions the government's role as essentially responsive and supportive towards the present invention by providing or assisting in the aspects of technical assessment, rulemaking, the creation of new standards and legislation. There are areas, however, where the U.S. government is independently or with private contractors exploring programs where the intent or results could overlap and lead to similar conclusions or cooperative implementations. Here are three such examples:

1) The U.S. Department of Transportation has launched its Intelligent Transportation System (ITS) program, designed to improve transportation safety and mobility and enhance productivity through the use of advanced communications technologies. ITS encompasses a broad range of wireless and wire line communications-based information and electronics technologies which, when integrated into the U.S. transportation infrastructure and into vehicles themselves, should relieve congestion, improve safety and enhance American productivity. One such ITS study involves the creation of a LIGHT VEHICLE FORWARD-LOOKING, REAR-END COLLISION WARNING SYSTEM for eventual integration into passenger cars worldwide. This study attempts to establish guidelines for the creation of a driver warning system which can prevent or reduce rear end collisions.

In some respects the proposed system is similar to the present invention in the sense that it proposes the use of a forward looking proximity sensing technology to read the speed of a vehicle in its forward path, calculate the range and closing speeds and then issue an 'impact warning' or a 'following too close warning' if conditions warrant, one that will be noninvasive to the driver of the following (host) vehicle. ITS properly assesses the available data on driver inattention (some of which was previously taught) but then fails to make recommendations consistent with its own and common findings. For example, Section 3.2.1, Background for the ITS guidelines, states: "The primary rear-end collision causal factor is driver inattention to the driving task (approximately 66% to 77%). Driver inattention in this context includes both inattention and distraction. Drivers are constantly scanning the roadway environment (i.e., looking down the road, left side, right side, scanning the mirrors and attending to internal and external stimuli). Drivers can only focus well on one thing at a time because the eyes focus together. So, for example, when drivers are attending to other stimuli they may not be able to adequately perceive the roadway in front of the vehicle. It is often necessary for drivers to take their eyes off the roadway and "attend" to other stimuli when operating in-vehicle controls and possibly carrying on conversations. Often drivers use multiple glances to attend to other stimuli thus taking their eyes off the roadway. These glances distract the driver and lead to inattention to the driving task. The glances may be momentary or of extended duration. Driver distraction accounts for approximately 11% to 24% of driver inattention. Drivers can also exhibit a behavior where they are focused on the roadway ahead but don't perceive the changes that are occurring. This "looked but didn't see" phenomenon is also indicative of driver inattention. This is similar to the previously discussed problems resulting from distractive advertising.

Unfortunately, ITS, in its recommendations, goes on to assume a very common solution found in various moving objects such as aircraft, trains or other types of machinery: that of installing a prominent visual warning indicator on the instrument panel of the vehicle, possibly augmented by an audio and a haptic (force feedback) warning, or a thumping on the throttle pedal. In other words, at a time when an inattentive driver is supposed to be re-engaging his thoughts and responding to an intense vehicular situation on the road ahead of him, his attention, based on ITS recommendations, is being diverted by yet more visual, audible and physical stimuli. As noted hereinabove, researchers have determined that new or unexpected stimuli trigger involuntary responses, and the more bored or unfocused we are, the more susceptible we are to these surprises. Also discussed above is the phenomenon of computer users performing search tasks, such that the more their attention is directed towards the periphery of their desired focus, the less they focus on the middle of their screens or the meaningful target. Imagine a warning light goes off on the on the instrument panel accompanied by an audible warning and a thumping on your right foot. Your natural impulse may be to look first at the light then possibly towards the floor until you collect your thoughts and by then, based on studies, the prospect of overreacting is high. All this when your attention should be outward on the car in front of you which represents an imminent collision. We've also learned that new, moving and looming objects command attention and that the onset of motion triggers overriding or urgent attention, possibly tapping the survival instinct, and also that changes in color can capture attention. But interpreting this as a potential solution is overlooked by ITS' engineers. We have a long and effective history of putting brake lights in prominent locations on vehicles that might stop quickly in front of us. It works. Perhaps a more natural and less distractive solution would be to utilize rear-facing video displays on the vehicles in front of us—as taught by the present invention—to provide color and graphic transitions for 'following too close' with more intense warnings or warnings with more impact (supported by the audible cues) upon more imminent potential collisions. Such a warning would audibly alert a driver to a situation which would be supported by directing his visual attention precisely where it should be to avoid an accident. This would be enabled by a similar proximity technology that ITS is proposing, then adding a returning wireless signal to the leading vehicle.

Upon full implementation, the present invention represents a more effective solution to the ITS proposed collision avoidance and 'following too close' visual warning since it provides a means to trigger and present attention-grabbing color and light changes prominently on the aft surfaces of moving objects which are in certain modes designed to capture the attention of the operators of following moving objects. It is the intent of the present invention to facilitate numerous such novel safety solutions and these are further explained in the subsequent text.

2) The U.S. Emergency Alert System (EAS) was designed by the Federal Communications Commission so that important emergency information could be sent quickly to targeted specific areas. EAS alerts not only broadcast media but also cable television, satellite, pagers and new forms of digital technology such as Direct Broadcast Satellite, High Definition Television, and Video Dial Tone. FCC rules have required broadcasters to monitor at least two independent sources for emergency information, ensuring that it is received and delivered to viewers and listeners in a timely manner. However, technology has moved on. Today, significant new methods are available to improve the capabilities of the present EAS. Satellites can be used to deliver EAS messages within seconds with high available levels of security without the geographical limitations of today's EAS. The Internet is a further impact-worthy technology since it offers redundant or back-up path communication with valuable follow-up capabilities. However, a private study on EAS effectiveness, completed in 2002, identifies three main concerns preventing EAS from becoming a truly effective system. One is that there is no concerted government or industry effort that combines EAS and other alerting techniques with existing and new technologies such as wired and wireless Internet, cell phones, PDAs and pagers to form a combined and seamless warning system. An FCC Report from the same period allocated increased numbers of EAS event and location codes so that local emergency managers and law enforcement officials could plan vastly improved local emergency public information warnings. Those new codes, according to the report, could lead to valuable information displays that are not currently connected to the EAS, such as changeable highway message signs. Every state, county, part of a county, and offshore (marine) area, has a specific number and hundreds of allocated numbers are unused. These could effectively identify unique areas or zones for hazardous weather conditions, nuclear power plants, military bases, neighborhoods or even groups of individuals such as police, firefighters, FEMA or other personnel, provided that the equipment is in place to facilitate those communications.

One aspect of the current invention is that any moving object so equipped becomes, in fact, a rolling billboard, well suited to delivering location-sensitive, real time information to other moving objects within the area. Weather information such as flash flood, tornado or hurricane warnings or on the spot highway information such as traffic conditions, detours, road-out, or turn-back situations.

3) In a similar effort, Motorola recently signed a contract with The Michigan Department of Transportation (MDOT) for what Motorola calls a "Wireless Super Highway" program. The project represents an initial deployment of a wireless network aimed at supporting the previously mentioned U.S. Government Vehicle Infrastructure Integration (VII) initiative. Motorola and the State of Michigan are exploring ways to establish a roadside network that can reduce accidents and road congestion by wirelessly connecting vehicles to the roadside and to other vehicles. MDOT is helping to fund the deployment of Motorola's system in Southfield, Mich., as part of the State's ongoing investment in real-world testing of practical Vehicle Infrastructure Integration applications. MDOT is also supporting the research and development efforts of private sector firms as well as Original Equipment Manufacturers. Motorola's vision of wireless future roadways includes: vehicles that could detect potholes, ice-patches or other road hazards, then wirelessly transmit that information to other nearby vehicles so that they can avoid the hazard; and a panic brake alert application that can operate in foggy conditions and in which trailing vehicles could receive an in-vehicle alert recommending they brake immediately. Government and private industry projects like these could share, utilize and benefit from the present invention because its parallel development and mass-market deployment will be driven by private investment in commercial advertising and in the development of personal media platforms that promise new incomes to consumers or the equivalent of new production vehicles that are less costly to operate.

Integration

We see an advertising industry in relative disarray, desperate to develop new platforms in the aftermath of falling numbers for old media (like TV) while chasing after the new ones (cell phones and ipods) like gadget freaks at the local Best Buy. All the while the solution has been staring them in the face: capture consumers on their drives to and from work each day. This is perhaps the "4th screen": a unique media platform totally dedicated to the display of ads. For a truly dedicated platform, however, integration must occur at a variety of levels:

1) Advertising. Advertisers can start by cleaning up their own act by a) electronically developing a new creative alliance with the public and by connecting their creatives and managers to that pipeline, and b) incorporating distribution, measurement, consumer feedback, tracking consumer engagement, content delivery accountability and compensation into a single automated system.

2) Manufacturing. As previously explained, the technology exists today to fully implement the present invention. Making it cost effective requires the acceleration and integration of manufacturing processes appropriate to the higher volume production of OLED displays to ensure even lower costs and permit mass-market installations on moving objects across the board, industry wide. Even here, proper integration must be thoughtful and paramount. In terms of traditional components, the present invention has the capacity either to replace or to incorporate into a single revenue-producing part for automated manufacture the following items from standard automotive production: tail lights, turn signals, brake lights, back up lights, license plate light and side marker lamps including their molded/metalized plastic housings, reflectors, lenses, bulbs (or LEDs), gaskets and connector seals (2 per side), center mount stop lights, vehicle brand and model logos or graphics with attach hardware; panel finishes with decorative trims including primers, surface preparation, finish painting, molding or plating; license plate recess structures and lamp mount assemblies, attach points and frames; and, finally, the independent stamping, painting and distribution of license plates and plate frames together with annual DMV registration sticker production, distribution and consumer attachment, together with all overhead, shipping, assembly and direct labor related thereto. How nice to be able replace all that with a single part that not only launches an industry, but puts money back into a new car owner's pockets in an age of skyrocketing fuel costs.

3) Government. As previously discussed, there are numerous programs where development of the present invention can enhance or enable better solutions to current government programs. Of greater importance is government participation on proposed standards, rulemaking, legislation and compliance. It is in the best interests of all concerned that the use of the present invention as a rich, mobile communications resource is exploited beyond mere marketing. It should be developed, from the outset, as a highway safety system in its own right by coordinating the interests of such government agencies as the National Highway Traffic Safety Administration (NHTSA), the Federal Highway Administration (FHWA), the National Telecommunications and Information Administration (NTIA), the Research and Innovative Technology Administration (RITA), the National Oceanic and Atmospheric Administration (NOAA) and National Weather Service (NWS), and the Bureau of Transportation Statistics (BTS), as well as other international agencies and commissions. This ensures commerce and system compatibility across the board and across borders, in terms of highway signage, hazard and weather warnings, vehicle identification and signage, vehicle lighting and safety systems and public service announcement and alert networks such as the EAS, to name but a few. For the same reasons, the U.S. Armed Forces may need to be peripherally involved. The coordination of state and local agencies to incorporate standards for police, firefighters and similar first responders as part of a versatile and failsafe mobile communications system is just as important as the involvement of the Federal Government. A tall order, but considerably simpler than reaching the same levels of consensus and production readiness as were necessary in areas such as vehicle standards for crashworthiness, fuel economy and emissions.

4) Financial. The integration of financial interests is critical to getting a project of this magnitude launched. Commercial advertising is clearly the financial driver so it is reasonable to expect significant investment, directly or indirectly from the world of large corporate advertisers and their agencies along with companies having core stakes in communications, transportation or media. As is later explained, governments are likely to contribute to the development of segments they feel is in the best interest of the public or in areas that are in line with their agency's charter, programs or objectives. A third leg in investment may come from the individual motor companies, who will appreciate that the sale of moving objects which can also generate incomes for their owners (and is therefore tantamount a product having a lower cost of operations) is likely to gain favor with the consumer and that competition could quickly drive acceptance of products incorporating the present invention industry wide. A final leg of support will come from one or more of the major communications or outdoor advertising companies that will emerge as gatekeeper for this new platform. The real money will be in content Distribution and Compensation.

5) Compensation. The present invention introduces a novel and powerful means to reward the entire driving population, from the beginning student driver to daily commuters; from carpools to commercial fleet operators; and from the lowest income drivers to the wealthiest, delivering to all an ability to earn income as they sit in traffic, or alternatively, to lower their costs of transportation by allowing the use of their personal assets in a profitable public forum. In terms of market size for the present invention, the applicant envisions an orderly phase-in of video-equipped moving objects, with ultimate market penetration limited only by the total numbers of moving objects produced worldwide.

Compensation

There are certainly instances where the driving population has been enlisted to promote or advertise products and services using their personal vehicles for profit. These have been limited in scope and technology, are costly, relatively inconvenient and generally inconsistent with average consumer lifestyles. The method involves paying drivers to wrap their personal cars in ads touting products such as ice cream, juice bars or Internet services. The driver's job is simple: drive to and from work, pick up the kids, run errands—and be willing to operate as a traveling billboard. Some companies offer drivers the free use of a new ad-wrapped car, while other drivers are paid $300 to $400 a month to allow the wrapping on their own vehicles. Critics call it another example of creeping—and creepy—commercialism. As mentioned previously, taxi owners in some major cities are being allowed to place ads on the outside of their cabs. Leasing ad space in this way provides taxi owners and drivers with additional revenue which helps them offset the costs of adding wheelchair-accessible vehicles and similar mandated requirements. Cab owners and the drivers who lease them split revenues from the advertising, which has been estimated at around $400 per car per month.

As will be seen in a later description of the present invention, registered owners of appropriately equipped moving objects may be similarly compensated, but through a novel combination of private and public entities which control content and monitor compensation, operate automated accountability systems and integrate multiple media resources, financial partnerships and transportation support industries. Ironically, the huge revenues and personal incomes promised by the present invention are made possible by the very thing that causes millions of drivers each day to waste their precious time and money: traffic congestion.

Conclusion

Madison Avenue, up to now, has been reactive instead of proactive. It hires other entities to follow up after the fact to determine whether or not their content was actually delivered, and if it was, whether or not it went to the right parties. It has no effective procedures in place for judging ad "performance" (other than post analysis assumptions by creatives and the evaluation of sales) to determine what, if anything, the public thinks about the content they believe was delivered. Madison Avenue is about creative guesswork. It's about "following" media technologies rather than leading them. It would be extraordinarily advantageous for marketers to have a channel through which consumers could actively or even passively inform advertisers about the things they truly want to see and hear, for advertisers to fill those channels with content about products and services consumers really want and need, and to provide this content at a time and place of the consumer's choosing. For the first time in advertising history, the present invention enables a self-monitoring mobile network in which consumers can request specific content; view it, hear it, accept, reject or praise it; provide immediate and direct feedback on that content to the creatives and managers involved; and allow those creatives to modify and resubmit that content for distribution. Marketers are able to receive real time confirmation on that distribution along with priceless data on its engagement, effectiveness and acceptance, and the presenters of that content are financially rewarded on a per ad, per screen basis for the use of their platforms just as though they were partners in the same industry, which they are.

The applicant is unaware of the existence of any commercially-viable system capable of generating revenue for the general driving population through the display of targeted or hyper-relevant video advertising on moving objects which is governed and controlled by stored database profiles in other moving objects. Nor is the applicant aware of any single, closed-loop ad platform which allows consumers to request specific kinds of content, to distribute that content, to confirm delivery of that content, to measure its effectiveness, to account for and compensate such deliveries, and to create new content based upon direct consumer feedback and confirmed in-field performance. The present invention offers a unique opportunity to turn around the status quo in the world of advertising. It promises new channels of communication with consumers, new sources of public and private capital for investment plus significant ROI with shared revenue to the driving population. It further promises the alignment of multiple essential industries for the manufacture of unique video displays, the improvement of moving object safety and cost effectiveness, the environmental clean up of transportation corridors and the sharing of just compensation with the owners and operators of a new kind of mobile communications and advertising platform.

SUMMARY OF THE INVENTION

The present invention describes a system, apparatus and method for obtaining revenue through the display of either conventional, targeted or hyper-relevant advertising on moving objects which receive, store, poll and extract data to present ads and other types of information based on the time of day, their location and their movements relative to other objects in a specific environment, and where data and information stored in moving or mobile objects within that environment can be transmitted between said objects, or to stationary objects where it is then received, polled, extracted and used to enable and control such displays for which the owners of those objects are then compensated. A proposed embodiment describes the development, production, deployment and operation of an integrated audio/video and data communications system capable of presenting hyper-relevant commercial advertising with synchronized audio, real time road, weather and emergency alerts, personal, fleet or government communications, mobile signage as well as vehicle branding, illumination and safety systems on and between moving objects. The business model portion describes a means for business development, technological adoption, funding, rule-making, certification, media creation, content distribution, consumer utilization and user/owner operations and compensation. The apparatus section defines the placement of lightweight video displays on or integral to the body panels, exterior finishes and/or glazing of both moving and stationary objects with an electronic means for the wireless transmission of stored, encoded user profiles containing the ad viewing preferences for the occupants of one moving object, to the receiving system in another moving or fixed object. The system enables the display of hyper-relevant ad content with synchronized remote audio, personal messaging and public service alerts on surrounding objects and provides for the real-time logging and later downloading of data to confirm communications and content deliveries between objects, track and measure consumer engagement, verify consumer's direct responses to ad viewings with accountability systems for moving object owner/operator Just Compensation. The invention further enables the widespread, non-invasive, profile-driven, ad hoc collection of privacy-compliant data for research purposes relating to consumer movements, travel patterns, buying habits, interests, needs and preferences.

The present invention also defines a high-volume production solution in which data and information contained in objects moving within the environment can be transmitted, received, polled, extracted and used to control or modify the audio and video output on viewed moving objects based on the viewer's specific interests, preferences, habits and needs, the needs or conditions of the environment or the requirements of those who are responsible to monitor safe and secure movements within it. It further describes a means for the low cost conversion of production vehicles so they can display video and transmit synchronized audio to other vehicles.

Considerations regarding the apparatus involve the placement of video displays on or integral to the body panels of existing production vehicles, exterior finishes and/or glazing with an electronic means for receiving, storing, queuing and displaying ad content, and for the wireless transmission of stored audio or audio codes to a viewing vehicle's internal sound system. The present invention also includes a method for compensating the owners of moving objects for the use of their assets as mobile advertising and communications platforms and further defines a means to generate revenue from the ad hoc collection of hyper-relevant data through the deployment and use of those platforms.

By allowing an object to learn a little about your personal history, background and experiences, together with a little information about your short or long term goals, needs or desires and by then granting that object—whether the object is small enough to carry in a pocket or purse or large enough to ride in—permission to passively convey that information to other nearby objects at certain times and places in your life, you permit those other objects to interact with you or with your own object and your own life in a way in which the net experience can enhance, enrich or inform. Focusing for the moment on a single embodiment of the invention—and on a moving object which is large enough for people to ride in—one can envision a scenario in which an individual (or a group of individuals) riding in such a moving object which, as just suggested, possesses some information about the people it is carrying—for example, a little about "who they are" and "what they want"—and in which that object can transmit that information to other nearby objects (whether those objects are mobile or fixed). Once those nearby objects receive and process that transmission, they can respond by presenting very special information of significant value to the individuals riding in the first object. Imagine, in the above scenario, an individual seated in such a land-based moving object who is viewing the road ahead. Let's assume he is also controlling or guiding his moving object so his eyes are where they are supposed to be: on the road and on any moving objects in his path. Assume the object in which he is riding now transmits unique information concerning his personal interests, needs, habits, or experiences, then passively, but without disclosing any confidential information, additionally transmits general data about who he is (age, sex, marital status, educational level, occupation, number of children, area of residence, etc.) combined with a little information about the moving object in which he is riding and its recent movements, to another object or objects nearby. If the information is received by a similarly equipped moving object, that object can now process that information and draw from an internal library of stored data, data that is of unique interest or of significant value to the individual who is in another object which is following and watching. For example, if data stored in the library of a moving object ahead is converted into a digital signal containing audio information and is transmitted wirelessly to a moving object that is following, then the individual who is inside the following object can be immersed in audible sounds that are of genuine interest and value to the individual(s) inside. If that library data is processed into video information and is then delivered to a video display positioned prominently on rear portions of the moving object ahead, then the individual seated at the controls of the following object can also see images displayed on the object ahead of him which can be further synchronized to the audio information, all of which is derived from the information transmitted from his own moving object, and which is therefore of great personal interest or value. Thus, a set of carefully prepared preferences in the form of personal information transmitted from one moving object to another, or to fixed objects nearby, can—when combined with data relating to the environment and the movement of the objects within it—trigger or enable many forms of audio visual imagery that can address the previously mentioned twelve objectives in commercial advertising. What if such transmitted and displayed audio and visual information is not merely based on a person's preferences and moving objects, but on the conditions of the surrounding environment itself? Once again, in an independently controlled, land-based moving object—one which might be negotiating a highway or following electronic guideways or tracks—if there were a serious slowing or blockage of other moving objects or a hazardous condition ahead, that information could be received by one or more such moving objects and could then be simultaneously and prominently displayed on those other moving objects or on nearby stationary objects, thereby alerting all occupants and observers to any local and potentially serious conditions. Such displays might simultaneously alert the operators of moving objects in foggy conditions to the slowing of multiple vehicles some distance ahead, to the presence of detours, one-way traffic, icy surfaces, flash flooding or tornados, or to conditions such as landslides, a bridge out or extended construction. One way to do this is by displaying a graphic and pictorial message on the display surfaces of the moving object immediately ahead. In one such example, information triggering such an audio or visual presentation might come from a wireless signal targeting a specific geographical point or route, or from a broader signal that might blanket an entire town or part of a city. Triggering information could also come from previously downloaded instructions or from a preprogrammed internal resource library able to interact with the Internet or with the navigational system of an individual moving object. Thus, at a predetermined time and place during its travels, moving objects could display critical information, alerts or warnings either to or upon other moving or fixed objects in the environment which could then be viewed by the occupants of those moving objects or by individuals in the immediate area (such as pedestrians or foot traffic) or by other means (such as traffic monitoring cameras) capable of viewing such moving objects from remote locations. Although this latter kind of audio visual presentation might at first seem similar to on-board GPS navigation systems, which place prerecorded audio/visual content on displays inside a moving object, the visual content of the present invention is displayed on the outer surfaces of moving objects or on nearby fixed objects—generally at eye level or within clear line of sight of the moving object's operator as in the case of a land-based vehicle—and is therefore generally intended for viewing through the windows of another moving object or from outside of a moving object. Thus, the location of the display of the present invention can be considerably more effective and a great deal safer than displays located along a roadside or on the interior of a moving object, because operators do not need to take their eyes off the other objects moving in their paths to focus on the interior of their conveyance or to focus and track signage, illumination or warnings that are stationary at roadside. This is the reason we put brake lights on the moving vehicles in front of us, and not on a warning light on our vehicle's instrument panel. Moreover, such video presentations are timely and reflective of immediate conditions since they can be electronically updated, deployed, triggered and displayed instantly and in real time wherever there are appropriately equipped moving objects. Further, when such images or sounds are generated using interactive onboard database libraries they can be modified in real time to incorporate the needs and characteristics of both the moving objects and their operators. Importantly, all such content is monitored for safe and timely presentation because all delivery is ultimately controlled by the speeds and relative motions between moving objects themselves, the specific locations of those objects in the environment and the condition of the environment itself.

If moving objects are able to exchange data sufficient to enable conventional, targeted or hyper-relevant audio/video commercial advertising and time-sensitive, location-specific communications, then they can also display highly personalized messages and personal advertising, enable personal sponsorships, assist in law enforcement or emergency operations, produce a unique means for the branding of moving objects and offer many exciting opportunities for the lighting, operating and safety systems of moving objects and for their basic registration and identification. For example, a land-based moving object might display the name or logo of its owner's favorite sports team or political candidate, as a kind of "electronic bumper sticker". Another owner might display a promotion or an ad for his own small business and do it at precise times of the day or night and in meaningful venues, such as his home neighborhood or business or university campuses. By adding a means for law enforcement to communicate with moving objects and a method for the owners of mobile objects to communicate with their own property, lost, stolen or speeding moving objects would be able to announce their presence and alert others in the vicinity. Importantly, such displays will enable the manufacturers of moving objects to incorporate and periodically change the name, branding, functional designs or styling of their moving objects simply by modifying the electronic data controlling the content of its default display. Another significant improvement will come with the introduction of an all-electronic system for the registration and licensing of moving objects. The display's ability to present powerful, well illuminated external graphics and nomenclature on moving objects and to further encrypt and link such data electronically to the moving object itself will result in a system where all moving objects, upon acquisition by an owner, will immediately be programmed to display identifying numbers (i.e., license plates) properly and prominently in accordance with set standards and such content would be updated each year if annual registrations are required. All such electronic procedures would be encrypted and documented to prevent tampering or hacking without otherwise triggering companion regulatory monitoring systems. One can see that such a system, applied again in the area of land-based road vehicles, could eventually eliminate the need for the manufacture, distribution, installation, maintenance, changing and/or replacement of vehicle license plates altogether. If such a system were properly and securely designed it could also prevent the theft and false use of such vehicle identification. Just as significantly, annual DMV registrations could be conducted solely online and paid registrations would be sent electronically via the Internet directly to vehicles themselves, eliminating the cumbersome process of printing, distributing and installing new registration stickers each year. However, by far the greatest benefit to the use of this invention is that it allows the operators of moving objects to keep their eyes, their focus and their attention on the other moving objects in play around them, and not on the ever-increasing array of brightly-animated billboards, roadside signage and other distractions competing for their visual attention. In fact, the present invention offers the distinct possibility of cleaning up the landscape by enabling significant reductions—and quite possibly the eventual elimination altogether of conventional signage and advertising in high traffic environments.

Using today's off-the-shelf technology, one could easily assemble an operating demonstrator of the described invention. However, it might be more expensive than necessary and would certainly lack the integration, legislation and marketability vital to inaugurating such an ambitious and widespread program. To succeed, such an effort is likely to require an international consensus in, but not limited to, such areas as proposed rulemaking, legislation, testing, compliance, design, production and performance, in the realm of product development; the coordination of multiple national interests in terms of highway, airway or waterway traffic management, safety and infrastructures; general telecommunications, telematics and technology adoption as well as the integration of national, state and local environmental and weather services, to name but a few. Of equal importance are standards and practices for content, content display, delivery, distribution, engagement tracking, accountability and finance in the areas of advertising, and also coordinated developments in data processing, displays, telematics, body panels and glazing for the mass market production of moving objects on the international manufacturing side. None of this will happen without money and clear incentives to generate appropriate capital and cash flows to make this invention a commercial reality. It is therefore another prime objective of this invention to demonstrate not merely a capable and operable systems technology, but additionally a general business model designed to stimulate capital investment, the application of development funds, appropriate investment in R&D and the capital equipment necessary to produce cost-effective end products, the proper monitoring and effective use of those products or services and finally to foster a means and enable a system to financially reward all who participate, from the advertisers and agencies who will pay to use the invention's ad platform to the manufacturers of moving objects that will introduce what will be the equivalent of more cost-efficient moving objects as the result of incorporating this invention to the governments who will assure better and safer public services through the adoption of this invention to the new entity(ies) that will profit through the distribution of content through this invention to the many transportation support industries which, through partnerships, will enable fuel, insurance and other incentives to stimulate acceptance of this invention and, perhaps most importantly, to the numerous fleet, business and general mobile population users who will ultimately offer up their private and personal moving objects to be used as public communications and advertising platforms for profit.

Commercial advertisers will continue to deal with selected ad agencies and will develop creative content in the same ways as they do today, but they will do it under the new industry standards and practices defined under the present invention. Content producers will continue to work with their ad agencies, creating end products appropriate to the selected media, then media buyers will purchase ad slots and schedule content, but it will be done over the Internet. Submitted content will be first reviewed for conformance to standards and practices and technical requirements, and then encoded for time, venue, and relative priority over other scheduled ads or content types. Once content is encoded, the best method for distribution is determined (cable, satellite, wireless), fees are attached, and the scheduled content is uploaded to the network. Distribution methods are discussed in the drawings, but in practice, final method for delivery may depend on the infrastructure available in the various markets.

Law enforcement and military and government-related public service content is periodically uploaded in a similar fashion, starting with quality and conformance standards for graphic content, followed by similar time, venue, and priority encoding over other types of content. Typically, government or public service content will have a display priority over ads. The triggering of public service alerts is critical and is sometimes accomplished through external systems. In the case of the roadwork alert which saved mom from a delay in her trip, generic audio and visual content was pre-loaded into her hard drive (perhaps at the factory) while actual triggering for the event was accomplished by an on-board GPS input having time and location constraints (a moving object entering a defined area at a certain time of day) or through a localized broadcast radio signal.

Fleet and business users such as taxicabs, delivery vans, or car rental agencies, or even large commercial carriers and government-owned and operated fleets such as U.S. Postal Service vehicles or GSA carpools will submit specialized content under their fleet contracts. After similar approvals and scheduling, fleet and government content is uploaded via the Internet and is distributed to fleet parking or maintenance garages and storage areas in the same way as family, consumer, and commercial advertiser content is distributed in business, university, or mall parking garages.

It is anticipated under the present invention that law enforcement, fire departments, and perhaps even military users would be granted unique access, enabling these users to override any ongoing, in-field content displays in the interests of public safety. For example, if police in a land-based or airborne moving object were able to "take possession" of the video display on the exterior of a land-based moving object which is presumed to be lost or stolen, is involved in a car chase, or is posing some immediate hazard or threat to others or to the environment, such possession could release prerecorded data from the hard drive in that moving object—and in other nearby moving objects—so that visual warnings and other types of displays could appear prominently and simultaneously on a multitude of moving or stationary objects within the area.

The applicant envisions that, except in rare cases, all users would pay for the right, privilege, and opportunity to distribute content using the present invention and that a portion of these payments, after expenses, will be paid to the individual owners or operators of the various moving or stationary objects that comprise the ad platform and were involved in the delivery of that particular content. The present invention introduces an integral system of electronic accountability to assure this.

General consumers will pay for the distribution of their own ads and personal messages, even when such displays are on their own moving objects, although such personal use will likely be priced at a discount. Of course, such personal use reduces the opportunity for these users to earn greater revenue by displaying content for big brand advertisers over their own.

Professional advertisers will pay a premium to use the system, especially during prime hours and venues. This parallels established norms in the industry which are based upon reaching specific markets at certain times of the day and in specific locations delivering a certain number of impressions to a preferred demographic. With the present invention, fees charged will be based on the going rates for the media type, content, and application, but with payments based only on deliveries that are electronically confirmed.

Government and public service users may have content distributed under special contracts or circumstances and such contracts might possibly use public funds.

Financially, the present invention is a little like offering stock in a public company. The company's shareholders own the moving objects—its communications platform—which is used from time to time to distribute the company's products. A shareholder's financial investment comes through his purchase, maintenance, and operation of his own transportation. His return on investment (ROI) comes in the form of a payment for services rendered or as a dividend based on the company's performance. The more a shareholder invests in the company—buying and using more moving objects or by using them more often—the greater his ROI. The larger the number of shareholders, the bigger the company's distribution network and the greater its potential for revenue.

However, earlier investment will be required from a number of resources. Seed money from a coalition of key entities who are those most likely to benefit from the new platform is likely to occur first. The advertising industry has the driving incentive and is the long term beneficiary; thus, early investment may be from the more entrepreneurial content producers, media buyers, and ad agencies, along with their large corporate clients, and finally the traditional competing major media platforms (television, Internet and outdoor). Next, the Federal and local governments are investment candidates, principally in supporting R&D, legislation, and in the operational areas of highway traffic safety, and public communications. Finally, the manufacturers of moving objects will invest in their own competitive design and development efforts together with investment from government and transportation support industries such as petroleum, insurance, banking, computing, electronics, and telecommunications, along with State Department of Transportation Agencies and others.

The kinds of moving objects that will launch the system in a land-based embodiment are likely to fall into roughly four initial categories: 1) New Vehicle Production; 2) Pre Existing Vehicles (or aftermarket installations); 3) Vehicle Conversions (the replacement of existing body panels such as rear deck lids or doors on SUVs, minivans, or station wagons and truck tailgates) with their original body panels converted to accept the appropriate display technologies; and 4) Modular "add-on" packages suitable for use on trucks, trailers, RV's, motor homes, and on very old or unusual types of vehicles.

1) New Vehicle Production in a preferred embodiment, a land-based moving object such as an automobile will contain a small electronics package that will interface with other on-board equipment such as GPS navigation, audio entertainment, and perhaps newer telematics systems, if available. This package will include a transmitter, which sends a wireless encoded signal with information on the vehicle type and VIN (or comparable identifying information) along with encoded user profiles or user codes which define the preferences and personal interests for each occupant selected, to moving object receivers or fixed object receivers within range. Signals may be broadcast in omnidirectional patterns, depending on the application, but in cases involving motor vehicle applications in traffic, such signals are most likely to be transmitted in a generally forward-looking pattern having a horizontal and vertical spread of from 15 to 30 degrees or that typically illuminated horizontally by a motor vehicle's headlamps. This spread may ultimately be governed by rule-making, and could further be automatically adjusted by local road, personal preferences, or traffic conditions. The electronics package will include, on each vehicle, an antenna to receive such signals, a motion sensor to measure the speed of the receiving vehicle, a rear-looking proximity sensor to measure the closing speeds of any following vehicle(s), and a decoder to process the signals transmitted from such vehicles. The package will contain antennas for receiving and transmitting information wirelessly from network access points (NAPs), an upload/download transceiver, a central processor, and a hard drive for storing all information received that is downloaded from a network or is logged in the field as a result of intercommunication between various moving objects. When signals are received from similarly equipped nearby vehicles, they are typically in the form of user codes which define the nature of that vehicle's occupants along with their content preferences (as in the case of hyper-relevant advertising) together with information on the vehicle itself relating to a specific VIN and including specifications on the physical characteristics of that particular moving object. In most cases, these requests are used to poll the onboard hard drive in a viewed (or displaying) vehicle and to then queue the necessary content for a video display based on predetermined delivery protocols. Specific instructions governing the delivery of content are encoded with that content. Content can be stored on board a viewed vehicle, a viewing vehicle, or on both. Video content stored on a viewed (display) vehicle is normally queued and displayed from that vehicle's self contained hard drive storage medium. However, video content that is queued from storage in a viewing vehicle must be wirelessly transmitted to the viewed (display) vehicle for presentation on that vehicle's external display means (unless it is intended for an in-vehicle display). By contrast, audio content queued from storage in a viewed (display) vehicle must be transmitted wirelessly to the viewing vehicle for reproduction and playback over its internal sound system. Thus, in practice, and to avoid unnecessary short range transmissions of audio and video content, the system will first choose to store all content in all moving objects so that only user/content codes are transmitted between vehicles. In this way the video content itself is never transmitted to another vehicle, but is queued and displayed solely within the viewed (display) vehicle's system. At the same time, any audio content related to that display of video is queued, synchronized and released for audio reproduction over the internal sound system of the viewing vehicle. All such presentations are controlled by the motion and proximities of the moving vehicles involved, their relative speeds, their locations and relative positions, the time of day, and a variety of other factors bearing on subsequent signals received from the viewing vehicles, from other vehicles, and from the environment, and those generated by the presenting vehicle itself.

2) Pre Existing Vehicles are those that have been manufactured prior to availability of the present invention, or simply those without the invention; however, owners or users should be able to purchase, lease, or otherwise add versions of the New Vehicle Production package to such moving objects. Aftermarket packages do not need to add the video display portion of the technology unless they wish to earn money from the display of content. If they wish to view hyper-relevant content and/or control what they see and hear from moving objects using the full technology, they can buy and install a stripped-down version of the full production system. Such an aftermarket version would have the ability to receive, process, store, encode, and transmit data including content requests, VIN data, and user/occupant profiles or user codes. It would also have the ability to log content requests, information relating to the content presented by other vehicles, and its owner's responses to viewed content. All of this information remains stored on the hard drive of any Pre Existing Vehicle for later downloading to the network.

3) Vehicle Conversions will involve installations of a New Vehicle Production package, but on a panel by panel basis in terms of the video display. Such installations are perfect for fleet or limited production applications like taxis or commercial vans, particularly those which operate in high-density traffic areas. The most cost effective way to implement such conversions is to isolate the display portion of the technology to body components which are easily removable or replaceable, and often set into their own easily serviceable shock mitigation mountings such as the rear hatches of SUVs or minivans, truck tailgates, and doors or trunk lids of passenger cars. The electronics package, proximity sensors, antennas, receivers, and transmitters can be easily integrated into existing body structures. Indeed, such conversions for city transit and taxi fleets are anticipated as a form of beta-test and preproduction ramp-up and as market test deployments of the present invention.

4) Modular "add-on" packages which offer full system capability (proximity and motion sensing, data transmission, processing and storage as well as displays) that can be "bolted-on" to large, unusual or older types of vehicles to allow their owners revenue generating potential are easily managed. Such applications would be for trucks and busses, or even large or medium sized fixed roadside signage or billboards under the right circumstances. Imagine a full-sized SEARS or WALMART truck-trailer rig carrying large panel displays with the company logo, which is also able to read the specific preferences and shopping interests of passing or surrounding motorists and then instantly queue and display products of genuine interest to them.

It is therefore an object of the present invention to provide a system and method for obtaining revenue through the display of advertising content and other types of audio/video information on the exterior surfaces of mobile objects which can receive, store, contain, poll, extract and use information for this purpose which has been transmitted from other fixed or mobile objects within its vicinity.

It is another object of the present invention to allow data and information which is stored in one mobile object to be transmitted to another mobile or fixed object in the environment where that data is then received, polled, extracted and used to control the display of ad content or other types of information on the surfaces of such other objects.

It is a further object of the present invention to display and permit the viewing of such displays at precise times of the day and in exacting geo-locations, further governed by the relative speeds, angles, proximities or movements of other moving or stationary objects within the environment.

It is another object of the present invention to control the visual displays on moving objects which are in motion so that such displays are not distractive to the process of operating moving objects within the immediate vicinity.

It is yet another general object of the present invention to provide a means for the owners of such mobile or fixed objects to be compensated for the use of their property as it relates to the above referenced system.

It is yet another general object of the present invention to permit the widespread use of personal vehicles for revenue producing activity.

It is yet another general object of the present invention to compensate owners and operators of moving objects for the confirmed use of their assets.

It is yet another general object of the present invention to convert drivers' wasted time and money in traffic into incomes, thereby increasing the tax base.

It is yet another general object of the present invention to make new vehicle ownership and/or operation virtually cost free.

It is yet another general object of the present invention to stimulate the earlier consumer adoption of alternate energy vehicles by incorporating into them the revenue-generating advantages of the present invention.

It is a further general object of the present invention to allow government agencies, or those responsible for the safe and proper use of such moving objects, to override the display of advertising or lower priority utilization of the invention to facilitate communications which may be of greater importance in terms of public safety and well being.

It is another object of the present invention to allow advertisers to submit ad content together with delivery information for approval and subsequent distribution to moving objects.

It is a further object of the present invention to allow the general driving population to select the kinds of advertising content it would like to view and display, and to further enter into contracts defining their rights and responsibilities to use that content, and to receive compensation for such use.

It is another general object of the present invention to facilitate an online community through which users of the present invention can register their moving objects, establish memberships and submit user profiles containing their personal preferences and user criteria.

It is yet another object of the present invention to allow fleet and government users of moving objects to use the present invention to determine the kinds of advertising content or other types of information they would like to view and display, and to enter into contracts defining their fees and compensation for such use.

It is a another object of the present invention to facilitate a system in which users can identify "who they are" and "what they want" and then be rewarded for providing that information by being able to control what they see and hear with respect to ad content that is presented to them.

It is another object of the present invention to permit the distribution of advertising or sponsorship content, private or personal content and public service or emergency content directly and simultaneously to multiple moving objects where it can be stored, retrieved and displayed upon demand.

It is a further object of the present invention to allow content to be encoded for unique deliveries (such as for time and place, under specific conditions and circumstances or to specific demographics) and to enable contracts with clients, customers and entities who wish to pay for such encoding.

It is a further object of the present invention to allow users to request that specific kinds of content be displayed on their own or on other moving objects on a predetermined or spontaneous basis, and to optionally pay for that service.

It is still another object of the present invention to permit users to delete, or prevent the display of, certain kinds of content on moving objects, on a predetermined or spontaneous, real-time basis, and to optionally pay for that service.

It is another object of the present invention to enable the display of advertising and sponsored content on the exterior surfaces of moving objects when such objects are parked or are non-moving and that such content be related to the immediate surroundings and/or be controlled by the presence of both pedestrians and handheld electronic devices.

It is a further object of the present invention to provide a means to store information and data relating to any delivered content requests, any "delete" requests or any "prevent" requests on board a moving object together with a means for subsequently uploading that information for the purpose of tracking, measurement, accounting and compensation.

It is yet another object of the present invention to enable the wireless, automated downloading of encoded user codes or profiles to moving objects.

It is a further object of the present invention to enable the wireless, automated uploading of encoded public service content (such as public alerts and weather warnings) together with venue-specific or time-specific triggering criteria to the on-board storage devices of moving objects.

It is another object of the present invention to enable the wireless, automated downloading of encoded commercial ad content, together with encoded delivery information, to the on-board storage devices of moving objects.

It is another object of the present invention to enable the wireless, manual uploading of encoded personal content by private citizens, together with encoded delivery information, directly to the on-board storage devices of moving objects from home or personal networks.

It is another object of the present invention to allow users to spontaneously request additional information, to purchase merchandise or otherwise respond to electronic offers and advertisements as they view such content from or while operating moving objects.

It is a further object of the present invention to provide a means for logging and storing information on board a moving object relating to the delivery of audio or video public service content, including content requests, and to provide for the later uploading of such information for tracking, engagement measurement, accounting, and compensation purposes.

It is a further object of the present invention to provide a means for logging, documenting and storing information on board a moving object relating to the delivery of audio or video advertising or sponsorship content, or content requests, and to provide for the later uploading of that information to a network for tracking, engagement measurement, accounting, and compensation purposes.

It is a further general object of the present invention to provide a means for logging, documenting and storing information on board a moving object relating to the delivery of audio or video personal use content, and for the later uploading of that information to a network for the purpose of tracking, engagement measurement, accounting, and compensation.

It is a further object of the present invention to enable the display of video content on the exterior surfaces of one's own moving object, such content generated previously and stored, or created spontaneously in real time (such as an instant personal text message), and optionally, to enable and cause the audio portion of that content to be synchronized to said video and wirelessly transmitted to another moving object for its reception and listening.

It is another object of the present invention to enable a means for the owners of current production motor vehicles to easily and cost-effectively exchange certain of their motor vehicle's body panels for revenue-producing video display body panels which then permit them to be compensated for the use of their property as it relates to the above referenced system.

It is another object of the present invention to enable the cost-effective fleet conversions of personal and commercial motor vehicles through the exchange of vehicle body panels and the addition of electronics to allow individuals or small business fleet owners to profit from the use of their vehicles as multi-media communications platforms.

It is a further object of the present invention to enable the simultaneous uploading and downloading of information and content from a network to large numbers of parked or moving objects for the purpose of updating on-board libraries, or for the purposes of tracking, engagement measurement, accounting and compensation.

It is a another object of the present invention to enable the uploading of information stored in moving objects relating to content, time, place, nature and trigger for any logged delivery, and to then process and to feedback that information to authorized government users, advertising agencies, advertisers or registered fleet, business or personal users for the purposes of tracking, engagement measurement, accounting, compensation or billing.

It is a further general object of the present invention to display conventional, targeted or hyper-relevant advertising, public service content and other types of information transmitted to moving objects on the internal video displays of such moving objects.

It is a further general object of the present invention to display conventional, targeted or hyper-relevant advertising content, public service content and other types of information on the internal video displays of moving objects with the presentation of said displays governed and controlled by the speed, location, contents, time of day, proximity and nature of the moving object and of other nearby moving or stationary objects within an environment.

It is another general object of the present invention to permit the selling, scheduling and display of hyper-relevant advertising content, together with public service content, personal content and other types of information, on video displays which are located on the interior of moving objects.

It is another object of the present invention to permit the distribution, display and documentation of conventional, targeted or hyper-relevant advertising, public service content, personal content and other types of information, on video displays located on the interior of moving objects, and to financially compensate the owners or operators for such display.

It is another object of the present invention to upload user codes which have been transmitted on an ad hoc basis between moving objects in the field for the purpose of tracking consumer movements by VIN, demographics, time, place, interests and other factors, for the purpose of research, marketing and planning.

It is another object of the present invention to enable the sale of user codes and information relating to the movements of consumers in the field by VIN, demographics, time, place, interests and other factors for the purpose of research, marketing and planning.

It is another object of the present invention to convert the ad industry's enthusiasm and its need for unique advertising platforms into capital investment in said invention, thereby stimulating companion investment from private industry and government.

It is a further object of the present invention to use its ability to generate incomes for the general driving population to stimulate further investment from industry and government.

It is another object of the present invention, through its ability to generate incomes for the driving population, to leverage the competitive interests of manufacturers causing them to incorporate the invention into their high volume production of moving vehicles, said higher volumes reducing the costs for manufacture and making the product more accessible to the driving population.

It is a further object of the present invention to enable a system wherein a moving object can detect and learn the traffic patterns and signal sequences at highway intersections, convey that information to other moving objects, synchronize that information with said objects and then calculate the time remaining at such locations within which content can be safely displayed.

It is a further object of the present invention to enable a system for the geo-tracking of moving objects in a manner that will not violate civil liberties, since tracking data cannot be lawfully generated in the absence of a subpoena.

It is a further general object of the present invention to permit the use of its video display(s) for entertainment purposes or for static presentations on moving objects when enabled by appropriate audio and video devices.

It is a further object of the present invention to provide a novel system for reducing the spacing between moving objects when such objects are in stopped, or near-stopped modes, thereby conserving significant amounts of wasted city traffic lanes especially at traffic signals, intersections, on ramps and turning lanes.

It is a further general object of the present invention to allow law enforcement to remotely override or take command of a moving object's active display to confirm moving object identification, highlight lost or stolen moving objects or to use a moving object as a mobile hazard, lighting or communications platform.

It is a another object of the present invention to electronically display moving object identification, licensing and registration at all appropriate times and to further allow the driving population, including law enforcement, to electronically capture and record such identification upon demand.

It is a further object of the present invention to incorporate all of the normally required lighting, safety, branding, licensing and registration systems, to the greatest extent possible, into the digital video display(s) of future moving objects.

An aspect of the invention is a system, comprising: a first object; a transmitter in the first object; a second object; a receiver in the second object; and a profile comprising data regarding a user associated with the first object; wherein the profile or a subset of the profile is transmitted from the first object to the second object; wherein content is presented to the first object; and wherein at least a portion of the content is based on the profile or subset of the profile transmitted from the first object to the second object.

In one mode, the profile is stored in the first object. Another embodiment of this aspect further comprises compensation to a user associated with the second object for presenting content. In another mode, the first object is capable of motion. In other modes, the first object is a vehicle, a device in a vehicle, or a handheld device. In other modes, the second object is a vehicle or is fixed or movable signage.

In another mode, the first object is a vehicle; and the profile further comprises data regarding other users or potential users associated with the first object. In another mode, the first object and the second object exchange information relating to relative positions, speeds, and motion of the first and second objects; information relating to the character, configuration, and properties of the first and second objects; information relating to surrounding objects; and information relating to surrounding locations; or any combination thereof. In another mode, presentation of the content is influenced by information relating to scheduling patterns of nearby traffic signals. In still another mode, the content further includes content not based on said profile.

Another embodiment of this aspect further comprises a priority system relating to presentation of the content based on a nature of the content. In one mode of this embodiment, a nature of the content is classified as emergency content; content relating to a surrounding environmental condition; registration and identification content relating to the second object; public safety content; or a combination thereof.

In another mode, relative motion data from the first and second objects determines whether content is presented and whether presented content is presented as animated video, static video, or a combination of both. In another mode, the content includes audio content, video content, or a combination of both; wherein the audio content is presented by the first object; and wherein the video content is presented by either the first object or the second object.

In another mode, the first and second objects are vehicles; the content comprises positioning information relating to the first and second objects; and the content indicates to an operator of the first object an optimum stopping position. In another mode, speed and positioning information is exchanged between all objects within transmission range; and the content presented to the first object indicates to an operator of the first object relative braking conditions of any objects in front of the first object.

In another mode, the second object has a user associated with the second object; and at least a portion of the content presented to the first object is created by the user associated with the second object. In another mode, a third party purchases a right to present content on the second object; and the second object presents content based on preferences of the third party. In a further mode, the right is based on a fixed or relative geographical area; a time of day; a period of available display time; or any combination thereof.

In another mode, the profile is transferable to other objects at an option of any user associated with the first object. In another mode, the content is viewable by persons other than those associated with the first object. In another mode, the content is presented in a manner to render the content not viewable by individuals other than those associated with the first object.

Another embodiment of this aspect further comprises a display integrated with the second object; wherein at least a portion of the content presented to the first object occurs on the display. In another mode, presentation of the content occurs on an exterior portion of the second object.

Another embodiment of this aspect further comprises a first storage medium associated with the first object; and a second storage medium associated with the second object; wherein data related to presentation of the content is stored in the first and second storage media. Another mode of this embodiment further comprises a central server wirelessly connected to the first and second objects; wherein the data related to presentation of the content is uploaded to the central server. In a further mode of this embodiment, a compilation of uploaded data in the central server is offered for sale. In one mode of this embodiment, the data related to presentation of the content includes time of display; subject matter of said content; duration of display of the content; a subset of the profile; or any combination thereof.

In one mode, presentation of the content occurs in an interior portion of the first object. Another embodiment of this aspect further comprises compensation to the user associated with the first object for receiving content, viewing content, or any combination thereof.

In another mode, information related to identities of all adjacent and nearby objects is exchanged between and stored in the first object and any adjacent or nearby objects. In another mode, the first and second objects exchange information related to audio playing in the first object; and the content presented to the first object comprises video content synchronized to the audio. In another mode, the content presented to the first object is limited by a user associated with the second object.

Another aspect of the invention is a computer implemented method, comprising: compiling a unique profile of a first user based on analysis of data provided by the first user; associating the profile with a first object; transmitting the profile or a subset of the profile to a second object; and presenting content to the first user; wherein the first object is associated with the first user; wherein the content originates from the second object; and wherein at least a portion of the content is based on the profile or subset of the profile transmitted to the second object.

An embodiment of this aspect further comprises compensating a user associated with the second object for presenting content to the first user.

Another embodiment of this aspect further comprises prioritizing display of the content based on purpose of the content; wherein purpose of the content is advertising; informational; traffic related; safety related; news related; region specific; political; mere frivolity; or any combination thereof. One mode of this embodiment further comprises preempting presentation of the content based on surrounding environment of the first and second objects; presence of emergency circumstances; public interest; or any combination thereof.

Other embodiments of this aspect further comprise prioritizing display of content based on preferences of the first user; transferring the profile to other objects at an option of the first user; displaying registration and identification information for the second object on the second object; or displaying content created by a user associated with the second object on the second object.

Another embodiment of this aspect further comprises displaying indicators of optimal traffic and view positioning on the second object to the first user; wherein the first objects and the second objects are vehicles.

Other embodiments of this aspect further comprise preempting display of the content in the presence of external wireless signals for emergency or traffic direction purposes; presenting audio content to the first user using the first object; presenting video content to the first user using the first object, the second object, or a combination of the first and second objects; or exchanging information relating to relative positions, speeds, and motion of the first and second objects; information relating to the character, configuration, and properties of the first and second objects; information relating to surrounding objects; and information relating to surrounding locations; or any combination thereof, between the first object and the second object.

Another embodiment of this aspect further comprises determining relative motions of the first and second objects; and presenting no content or content as animated video, static video, or a combination of animated and static video, based on the relative motions of the first and second objects.

In other modes, the content is presented on a display integrated with the second object, or the content is presented on an exterior portion of the second object.

Other embodiments of this aspect further comprise storing data related to presenting the content in the first and second objects; uploading data related to the presenting the content to a central server wirelessly connected to the first and second objects; or offering a compilation of uploaded data from the central server for sale. In another embodiment, the data related to presenting the content includes time of display; subject matter of the content; duration of display of the content; a subset of the profile; or any combination thereof.

A still further aspect of the invention is a method, comprising: populating a source object with content; and presenting the content to a recipient object in response to a unique profile or portion thereof associated with the recipient object that is provided by the recipient object to the source object.

Yet another aspect of the invention is a system, comprising: a content storage device; and means for presenting content stored on the content storage device to a recipient object in response to a unique profile or portion thereof associated with the recipient object that is provided by the recipient object to the source object.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes, the present invention is embodied in the system and method generally shown in FIG. 1 through FIG. 35. It will be appreciated that the system and apparatus may vary as to configuration and as to details of the parts, and that the method may vary as to the specific steps and sequence, without departing from the basic concepts as disclosed herein.

Figure 1:
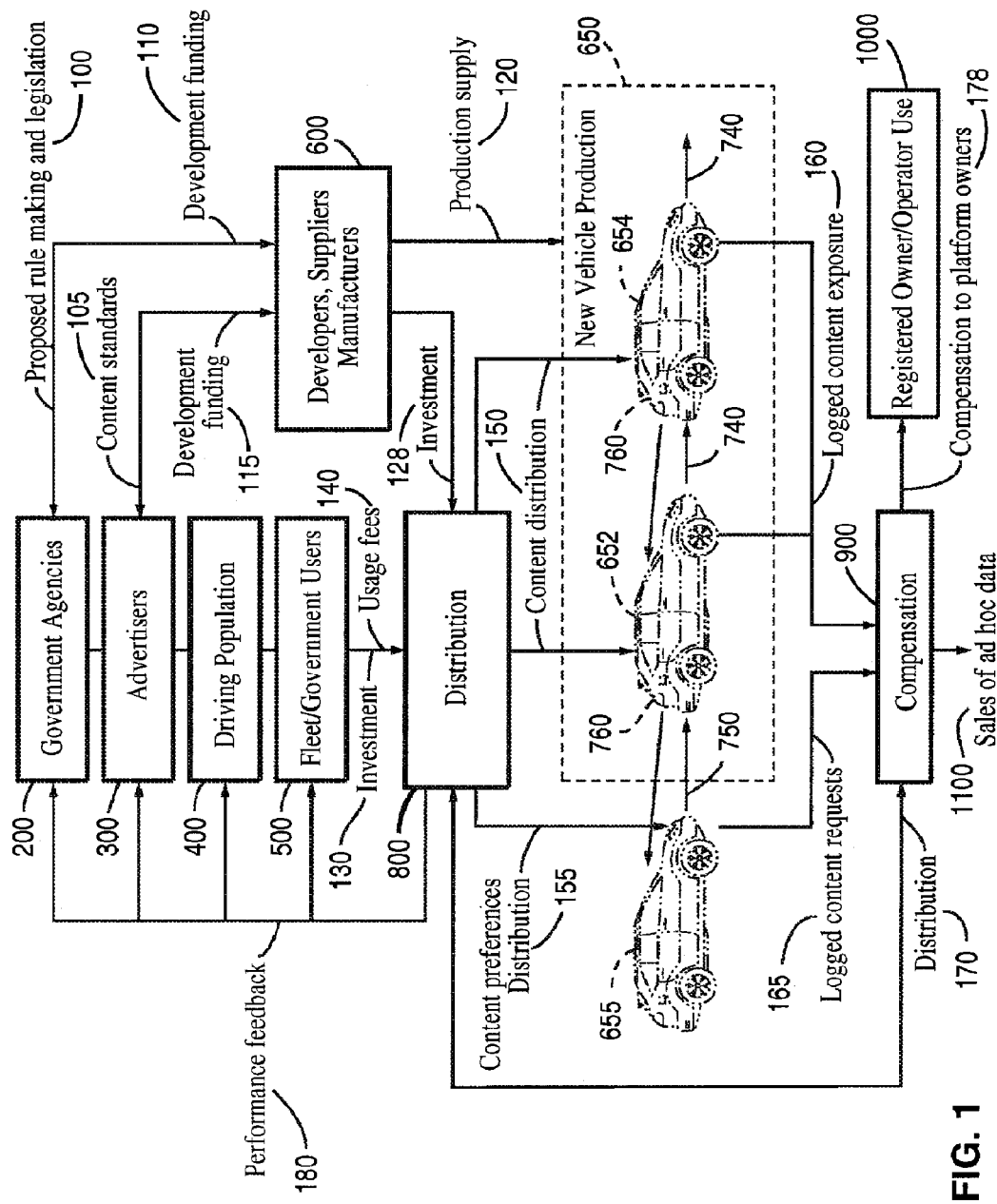
FIG. 1 illustrates a general embodiment and overview of the present invention.

FIG. 1 illustrates a general embodiment and overview of the present invention by showing some of the essential elements which must interact to launch such a unique advertising and communications platform: first, the user base (comprised here of Government Agencies 200, Advertisers 300, the Driving Population 400, and Fleet/Government Users 500); the Developers, Suppliers, and Manufacturers of moving objects 600, (in this embodiment, production automobiles); the Distribution entity (or entities) 800, the Compensation entity 900 (shown separate here for clarity; in practice, this entity would likely be combined with the Distribution entity), and the body of Registered Owners and Operators, represented at 1000. Although a given embodiment might include a large number of such groups with wide variations of interactions between them, the groups listed herein are some of the most basic and essential to a widespread deployment of the present invention. Such relationships will range from development funding and investment to the manufacture, implementation, operation, and maintenance of the system. A fundamental element to early planning is the proposed rulemaking shown at 100, followed by the legislation of design, performance, and compliance standards for the operating aspects of the emerging system. Such effort represents a give-and-take objective and creative exchange between government and industry following which policies will emerge that all the parties can live with. Precedents and parallels exist for such efforts between government and transportation, and are well known with respect to establishing even more stringent standards for automotive performance, such as, for example, The Department of Transportation's Federal Motor Vehicle Safety Standards (FMVSS) concerning vehicle operating standards and crashworthiness; the EPA's Clean Air Act Amendments (CAAA) or National Low Emission Vehicle (NLEV) Standards for vehicle emissions or NHTSA's Corporate Average Fuel Economy (CAFE) Standards for fuel economy. Such standards will be negotiated essentially between the transportation industry suppliers and automakers 600 and appropriate Government Agencies 200, with input by any other interested parties. Content standards 105 defining how conventional, targeted and hyper-relevant advertising is ultimately presented to consumers will most likely be established concurrently with the operating and distribution portions of the system. This interaction will be between the advertising community 300, the manufacturing body 600, the distribution entity 800, and its compensation unit 900, with input from concerned government entities, fleet and government operators 600 and from the driving population.

It is envisioned that very early funding for R&D and technology development may come from the investment arms 110, 115 of the advertising and media community on the commercial side, and from the government for exploration on the highway/traffic safety and public service side. This early development funding would be combined with funding provided by the major automakers and their suppliers 600, resulting in prototype operating systems, and leading eventually to full production supply 120, with such production to be integrated with regularly scheduled vehicle production. There are also specific, highly targeted operating niche markets ideal for introducing this platform on a controlled basis, such as fleet and taxi operations, which will be explained later. It should be noted that there are also as many different potential scenarios and models for program funding since interest, participation, and investment is expected from many private sector entities, foundations, institutions, or government agencies. Another likely investment scenario is reflected at 128, in the form of potential investment in the Distribution entity by the transportation manufacturers themselves, because their end products are essential components to this new advertising and communications platform.

Private investment 130 from the user body can assume many forms, such as state and local government funding in support of innovative law enforcement applications (some of which have been previously described); direct equity investment from advertisers 300 or from big media owners; private investment from the general driving population 400 or from fleet and business users 500 (other than their investment in private vehicle ownership), such investments coming perhaps in the form of equity in the Distribution entity 800, perhaps through an IPO. Once Distribution is operational, however, the user body will commence paying Usage Fees 140 to place content on the new platform.

The output side of the Distribution unit 800 is the delivery of content (as discussed in the preceding section) distributed directly to the vehicles registered in the network through channels 150, 155, and are explained later. Content 150 represents conventional, targeted and/or hyper-relevant audio and video ad content, public service content, personal content and encoded personal profiles from fleet or government users and the general driving population. Content 155 represents the delivery of personal preferences to Pre Existing Vehicles 655 which use aftermarket systems sold through retailers or installed as upgrades at automobile dealerships. Pre Existing Vehicles 655 are able to wirelessly transmit VIN, model data, content requests and ad control signals 750 to New Production Vehicles 652, 654, and then receive audio and view video content derived from that data on moving object video displays 760. Fully equipped New Production Vehicles 652, 654 will send similar VIN, content and control requests 740, receive audio content internally and view video content on displays 760 which are integral to those vehicles, exterior surfaces or glazing. As previously explained, all such content and control requests are logged on both new and aftermarket platforms for later wireless downloading as shown by 160, 165 via network access points (NAPs) to be discussed in a later section.

The Compensation unit 900, collects all data downloaded from registered moving objects and compares content requests with content deliveries (discussed in greater depth later), and confirms actual content deliveries by matching these data. Confirmed distribution information is subsequently returned to the Distribution unit 800 (which may be the same as Compensation unit 900) as shown at 170. A critical step in content delivery measurement, accounting and compensation occurs at this stage. The applicant believes that it is important for any such system to be able to identify and prevent what has become known in the Internet advertising industry as "click-fraud." This is a process in which users, entities or software create fraudulent requests for content deliveries (viewings) in an effort to demonstrate greater interest in a specific ad or site than really exists. In the case of the present invention, this could be attempted by individuals to get paid for presenting ads that were not actually viewed. At this stage, an exchange of data 170 between the Compensation unit 900 (which has downloaded logged vehicle data) and the Distribution unit 800 takes place which involves the matching of specific VINs on moving objects together with the time, place and the physical movements of those objects to determine the likelihood of fraud. This process is explained in greater detail in a following section. Once in-field content deliveries have been authenticated, the Compensation unit 900 can approve payments to the registered vehicles that have had their display of content confirmed via the mechanism at 170. This applies to all registered production vehicles 652, 654, and in some instances to the vehicles which only view content such as vehicles having aftermarket installations 655.

The Distribution unit 800 can then feed back in-field performance measurements to the general user body as indicated at 180. The Compensation unit 900 has, among numerous tasks discussed in a later section, two key functions: the payment of financial compensation to Registered Platform Owner/Operators 1000, as shown at 178; and the sale of ad hoc collected data to marketers and researchers, as indicated at 1100.

Figure 2:
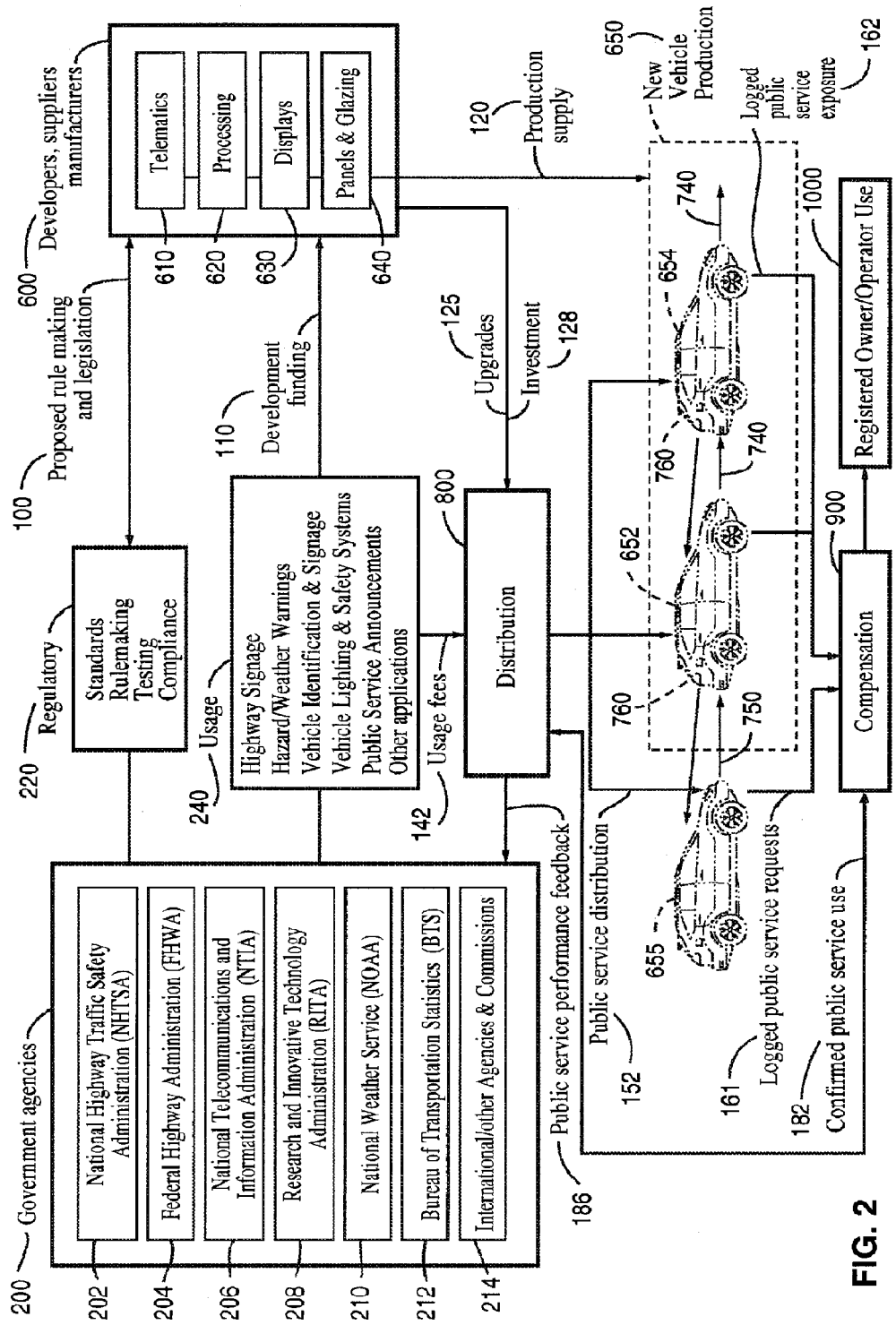
FIG. 2 is a diagram showing the relationship of governments and manufacturers to the present invention.

FIG. 2 shows potential relationships between Government Agencies 200 and Developers, Suppliers and Manufacturers 600 relative to the funding, regulation and use of the present invention. Although there are many such possible combinations, named are a few of those agencies that may have a bearing on some of the Regulatory issues 220 and public service usage issues 240. The National Highway Traffic Safety Administration (NHTSA) 202, for example, would have a clear role in establishing vehicle standards, including testing and compliance procedures, just as it has had in other Department of Transportation (DOT) programs, some of which have been previously mentioned. The Federal Highway Administration (FHWA) 204 has a vision to create the best transportation system in the world. In partnership with the overall highway and transportation community, its charter is to assure the safest and most efficient highway and intermodal transportation systems possible, in which crashes, delays and congestion are significantly reduced, where roads protect ecosystems, where pedestrians and bicyclists are accommodated and where transportation services are restored immediately after disasters and emergencies. The present invention is capable of making significant contributions to all of these specific objectives. A prime goal of the National Telecommunications and Information Administration (NTIA) 206, is to bring dramatic growth and change to the nation's economic, social and political life through a fundamental mission of promoting market-based policies that can lower prices to consumers and encourage innovation, while harnessing the resources of the Federal government to support spectrum-based technologies that enhance efficiency and productivity. Clearly, the broad application of the wireless spectrum to produce commercial and public communications opportunities that also benefit consumers financially, are within NTIA's charter. The Research and Innovative Technology Administration (RITA) 208 is dedicated to the advancement of DOT priorities for innovation and research in transportation technologies and concepts. Innovations that will improve our mobility, promote economic growth, and ultimately deliver a better integrated transportation system. The agency's charter is to foster the exchange of ideas and information in a high-priority incubator committed to research and to getting innovative ideas from the laboratory into the field. RITA can effectively assess the present invention's ability to clean up distractive highway signage stimuli, adopt more effective direct vehicle collision warning systems, incorporate state-of-the-art techniques in the enforcement of drunk driving laws and the delivery of emergency medical services and generally, through the present invention, dramatically improve the design and management of highway safety programs. The National Weather Service (NOAA) 210 has a current program in place called "Flooding Ahead Turn Around Don't Drown", an attempt to reduce the high numbers of lives lost each year by drivers whose vehicles are swept away while trying to cross heavily flooded areas. This program has previously involved posting a plastic sign on a small metal stand where the road disappears beneath the water. The program has enjoyed limited effectiveness but is a logistics nightmare in terms of deployment on an urgent basis. Tornados, landslides, hurricanes, flash floods, wildfires: all have similar impact and problematic solutions when it comes to protecting the public. The present invention, however, is, in fact, a rolling billboard having instant communications whose content (including animated, mobile, warning signage complete with flashing lights) can be deployed instantly where ever it is. Thus, NOAA's involvement in early rulemaking could prove a tremendous benefit to public safety. The Bureau of Transportation Statistics (BTS) 212 is responsible for assessing the relationships between transportation and the economy on an ongoing basis, including our transportation system's share of Gross Domestic Product, employment and transportation expenditures. Its work bears heavily on such previously discussed areas as urban congestion and the direct costs to consumers in wasted fuel and time. This area alone justifies the early involvement and sustained tracking of BTS to document the tangible long term benefits of the present invention. Finally, there are numerous other agencies 214 whose capabilities can come to bear on the present invention's implementation, and their coordinated efforts must be multinational in scope.

Usage 240 indicates just few of the potential applications worthy of funding by Federal Governments. Such funding 110 is to be directed in part towards supporting the research and development efforts of automotive Developers, Suppliers and Manufacturers 600. The principal areas for development are Telematics 610, the means for implementing communications between moving objects; Data Processing 620, methods for decoding, storing, polling, extracting, queuing, encoding and uploading data and content for distribution via the present invention; Displays 630, the evolution of cost-effective displays from current or new technologies for incorporation into high volume production vehicles of all kinds; and Panels & Glazing 640, the use of automotive glazing as platforms for content display.

Proposed Rulemaking and Legislation relationships 100. Upgrades in telecommunications and content handling, operating systems, displays, including hardware and software for the present invention after its initial introduction are indicated at 125. Investment is shown at 128, suggesting the possibility of automakers and their suppliers taking equity positions in the Distribution entity (or entities). At 142, Usage Fees are paid to the Distribution entity 800 for government or public service content downloads indicated at 152, which are then stored on vehicle hard drives. Such fees would likely be paid, part in advance, based upon negotiated service contracts between various government agencies and the Distribution entity. The balances would be paid later, once in-field content deliveries have been confirmed from logged downloads. At 161, logged public service content requests (and optionally, confirmed deliveries) are downloaded from aftermarket platform installations. At 162, logged public service content requests and logged public service exposures are similarly downloaded to Compensation 900 for processing and confirmation. At 182, confirmed public use content exposure is returned to Distribution where it can then be translated into effective measurement information regarding engagement and the precise time, place, circumstances for content delivery and whether or not specific and appropriate actions were taken by the recipients on a timely basis in response to such content deliveries (In other words, did they act on a specific audio/visual display presented to them in the field?). Finally, at 186, documented performance is fed back to the appropriate Government Agencies 200. This feedback will vary with the needs of the specific agencies involved and would perhaps be accomplished under contract between Distribution and that specific agency of government. An example of such measurement and feedback would be the confirmation to NOAA that a specific number of vehicles were turned back from a flash flood zone and were directed over an alternate route well in advance of an actual crisis, along with geo-specific mapping showing the positions and numbers of vehicles simultaneously exposed to the audio/visual alert (via the present invention), the precise timing and movements of those vehicles after that alert (based on logged GPS data) and the movements of those invention-equipped vehicles that did not heed the alert, so that alert effectiveness can be determined.

Figure 3:
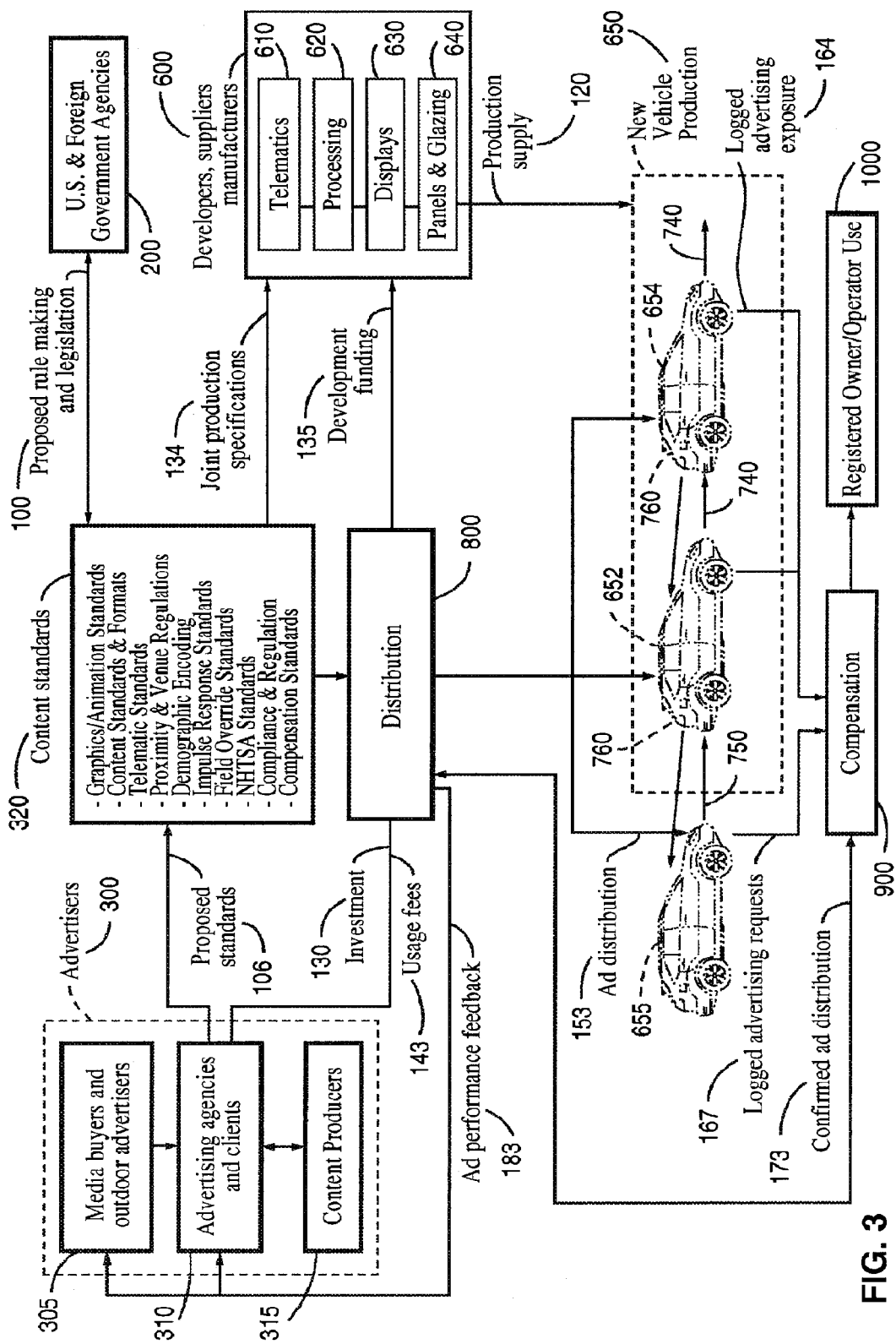
FIG. 3 is a diagram showing the relationship of advertisers and manufacturers to the present invention.

FIG. 3 is a diagram showing the relationships of advertisers and manufacturers to the present invention. Although the advertising community 300 is multifaceted, it has been defined collectively as three elements: the media buyers 305 (entities responsible for purchasing and scheduling ads in various media), the advertising agencies and their clients 310, and the content producers 315 (entities typically hired by the ad agencies to create, produce and execute products for media placements). The applicant envisions these groups, individually and collectively, influencing and guiding proposed standards 106 for creative content and system functionality, key elements of which are listed in Content Standards 320. Note that the development of these standards will be augmented at 100 by the interface with U.S. and Foreign Government Agencies 200. These groups will combine their essentially creative and marketing powers and their political and legislative experience to shape rulemaking for such issues as: Graphics & Animation Standards (determining, for example, the distractive qualities of animations with regard to driver attention and establishing criteria for such displays); Content Standards & Formats (limitations on certain kinds of ad content relative to specific demographics, or the manner in which certain presentations can be made and to whom); Telematics Standards (the technologies that will be applied in allowing moving objects to talk to each other); Proximity & Venue Regulations (determining times and locations in which certain kinds of ads might not be permitted, or might be limited in scope or content); methods and schemes for Demographic Encoding (classifying the various types of products and ads so they can be matched to consumer request profiles and properly tracked for measurement, accountability and compensation); Impulse Response Standards (uniform methods allowing consumers to request information on products or to order and purchase products safely while using their moving objects and to securely link such orders with credit and shipping information; Field Override Standards (the criteria and procedures allowing law enforcement to take command of an ongoing display in the interests of public safety or need); assuring conformance with current and anticipated NHTSA Standards; Compliance & Regulation (developing testing and compliance procedures to assure standards in manufacturing and use; and Compensation Standards (the development of accounting, billing and general compensation procedures and contracts including defining industry fair practices, ownerships, taxation, disbursements and similar consumer related business issues). At 134, Joint Production Specifications are implemented with the manufacturing teams 600 and are incorporated into the network's operating systems by the Distribution unit 800.

Paths 130 and 143 represent two of the key financial channels for the advertising community. Although there are numerous scenarios for investment to occur, the most likely is through equity, loan or advancement by the advertising or media industry as a whole, because these represent both a significant user and beneficiary. As noted hereinabove, there is a serious need for improved ad accountability, demographic effectiveness and tracking of engagement, and there is no question that advertisers and large media buyers are desperate to find new ways of reaching consumers and in recapturing defections from commercial television to the Internet. With so much at stake in the industry, the logical core investors for the present invention are, the major Media Buyers 305, the Advertising Agencies and their Clients 310, the content Producers 315, and, of course, the operators of traditional media and advertising platforms such as commercial television. One reason this makes so much sense is that this Advertising community 300, which comprises these three entities, will also become the network's largest user and payer of User Fees 143.

Again, 120 represents the supply path for New Vehicle Production 650, and 153 represents the uploading of Advertising Content, along with encoded profiles, upgrades and distribution instructions via the Internet, to individual vehicles 652, 654, 655.

Path 167 indicates Logged Content Requests from Pre Existing Vehicles, while path 164 shows the upload path for Logged Advertising Requests and Logged Advertising Exposure from New Vehicle Production. As it was with Confirmed Public Service Use, path 173 indicates Confirmed Ad Distributions sent back to the Distribution unit for ad performance assessment, engagement tracking, measurement, accountability, fraud exposure and compensation. Once data is processed by the Distribution unit 800, it can provide performance feedback 183 to Media Buyers, Ad Agencies or Advertisers in a variety of formats, including data on the direct daily deliveries to specified demographics with the exact times, places and durations for such impressions, along with consumer views and opinions, related information requests, resulting purchases and other criteria, all at multiple levels of depth in accuracy and measurement previously unavailable in the advertising industry.

It is also worth noting that with the creation of such a widespread, flexible and mobile video platform, it is only a matter of time before the major news and entertainment media companies realize that the present invention offers an exceptional means to reach consumers with rich content presentations while they are on the go, yet are in a safe and relaxed mode to receive such information. For cable leaders such as Fox News, the present invention offers a unique mobile forum for delivering breaking news and local event alerts and thus represents a huge potential revenue stream for all general media and telecommunications.

Figure 4:
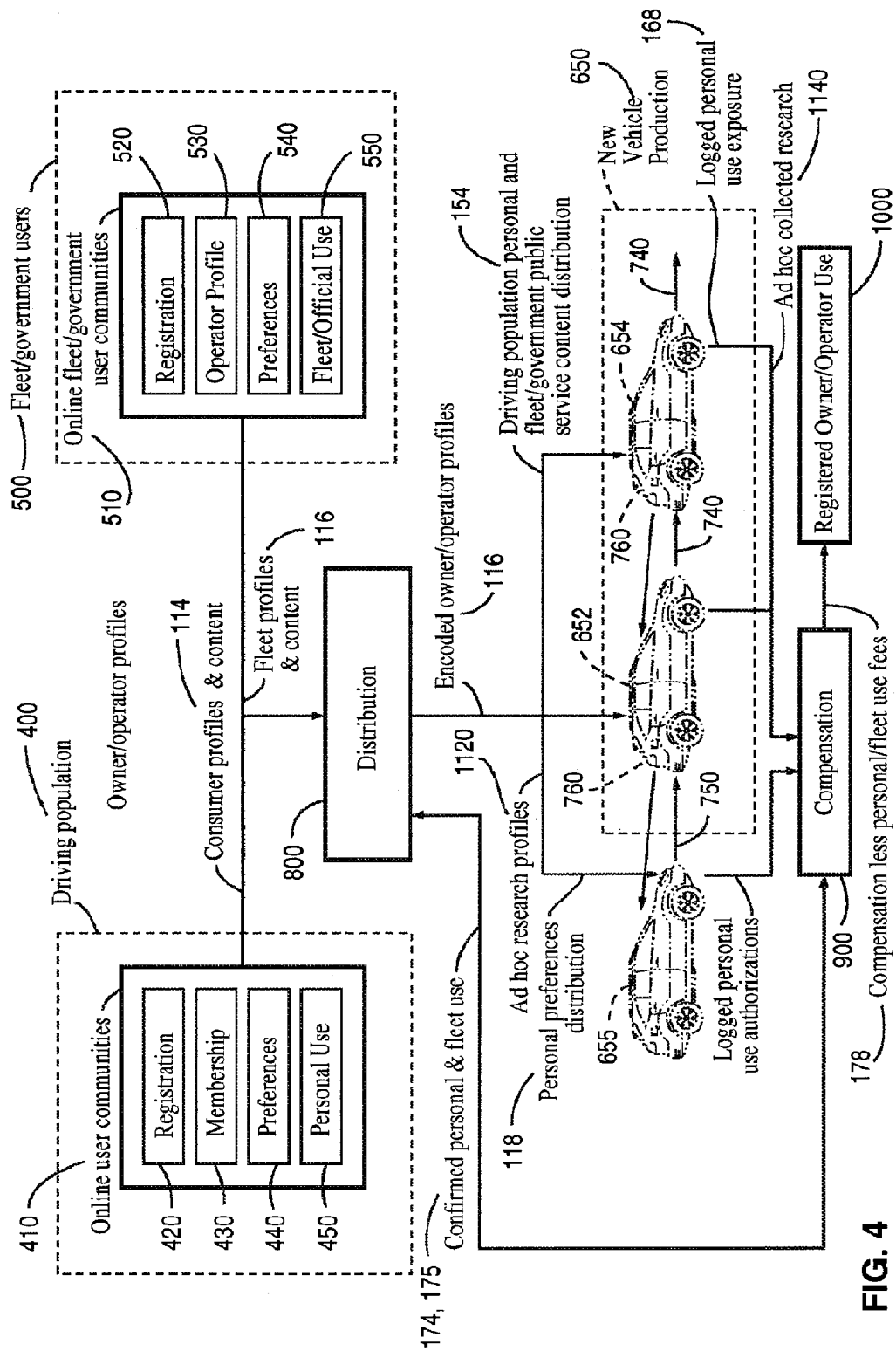
FIG. 4 is a diagram showing the relationship of the driving population and fleet or government users to the present invention.

FIG. 4 is a diagram showing the relationship of the Driving Population 400 and Fleet/Government Users 500 to the Distribution unit 800. Both of these user groups will be discussed in terms of Online User Communities, one referenced at 410 for the General Driving Population, the other at 510 for Fleet Business and Government Users. Examples of these and how they work have been described in previous text. Over time, such communities may take on a variety of forms; however, the applicant envisions most of these being operated by the individual automakers, aftermarket producers or retail dealership bodies responsible for the design and manufacture of the moving objects themselves. For purposes of this discussion, these communities are defined in four sections, each representing an online activity. For the Driving Population these would be: (1) Registration 420, which can begin at the dealership with the recording of a vehicle's VIN, a process which can be completed at home with final licensing online; (2) Membership 430, where each member of a family can join the community by creating his own User Name and Password; (3) Preferences 440, where each new member can follow easy online prompts in multiple choice, pull down menu, check box or text write-in format to define his personal interests, wants, needs, desires, capabilities and experiences, these in terms of a pair of profiles defining "who he is," and "what he wants" as these preferences relate to his personal lifestyle and to the kinds of advertising he would like to view or present; and (4) Personal Use 450, where a member—typically upon approval of the Registered Owner who is the designated System Administrator—can elect to create and upload a variety of personal messages, sponsorships or advertising they would like to display to others for personal or business purposes and for which they will be billed at a discounted rate if presented on their own vehicle.

These online sections are similar to those used for the Commercial or Fleet Business User body or for Government Users, except they are tailored for business and commercial applications and are structured to accommodate a multiplicity of moving objects or vehicles: (1) Registration 520, where a business or fleet owner can register a number of vehicles to be driven by drivers under contract to that business; (2) Operator Profiles 530 where a business manager is responsible for identifying his drivers and informing them of the network's system and rules; (3) Preferences 540, where a business or government fleet manager can establish the communications, viewing and presentation preferences for his own drivers and his fleet; and (4) Fleet/Government Official Use 550, where registered business owners or fleet managers can enter into contracts with the Distribution entity 800 to display their own company's advertising, branding or promotions. The applicant anticipates that a number of individually operated advertising and promotion businesses may spin off from such commercial platforms wherein small business owners might purchase dual-purpose vehicles with the intent of operating a fleet of mobile ad platforms around the clock in key markets, to train and manage drivers for such an enterprise, and to then charge advertisers for the presentation of content by specialized venue or times which might be otherwise unavailable. This would not be unlike privately-operated auction businesses which have spun off from the popular Ebay model. An embodiment for such a fleet application is discussed in a later section concerning moving object fleet adoption and production. The combined upload path for Owner/Operator Profiles is shown at 114.

As previously explained, Vehicle Registrations for the present invention are linked to Vehicle Identification Numbers (VINs) and are cross-checked with DMV records for information which, from a legal or business perspective, might preclude a membership approval. Such precautionary measures are well known in the industry and follow commonly established prudent business and legal practices. Owner/Operator Profiles 530 and Preferences 440, 540 may be subjected to similar scrutiny; however, it is the objective of such profiles to define the nature of the content which is to be viewed by such owners and operators, and to a lesser degree, to determine what they will be displaying to other members and to the public at large. In terms of what is actually displayed to the public under the present invention, all content is thoroughly monitored and approved under strict standards and practices which have been established through the joint efforts between government and business, as described in the foregoing sections. Approved and Encoded Owner/Operator Profiles for both Personal and Fleet/Government Users are uploaded at 116 to specific vehicles by VIN, or by an equivalent vehicle identifying process which links registered owners to their vehicles. As occurred previously with Advertising and Public Service content, personal content for the general Driving Population and Fleet or Government Public Service and Business content is uploaded to New Vehicle Production at 154. Additionally, Personal Preferences for controlling the viewing characteristics from Pre Existing Vehicles are uploaded to these vehicles at 118.

An important byproduct of the present invention (in addition to its ability to request and confirm the delivery of profile-enabled hyper-relevant content), is its ability to simultaneously, and even passively, track and measure all such requests and deliveries, including any actions taken by consumers as the result of such deliveries while in the field, then to gather and compile such data in terms of consumer movements by time, venue and VIN, all relative to their demographic and psychographic profiles. This kind of information can be easily generated through the interaction of moving objects using the present invention, and through moving object interactions with other kinds of compatible, profile-driven mobile devices in the field. As each moving object or mobile device communicates with others in an effort to match transmitted user code "requests" with stored content, as in the case of the present invention (or to match User Codes as disclosed in the applicant's nonprovisional patent application Ser. No. 11/552,932, filed Oct. 25, 2006, entitled: "METHOD AND APPARATUS FOR OBTAINING REVENUE FROM THE DISTRIBUTION OF HYPER-RELEVANT ADVERTISING THROUGH PERMISSIVE MIND READING, PROXIMITY ENCOUNTERS AND DATABASE AGGREGATION", incorporated herein by reference in its entirety), these moving objects emit encoded signals which describe the essential nature, makeup and interests of a seeking party. Regardless of matched content requests, delivered content, or attempted or consummated in-field communications, all such moving objects or mobile devices may, if so programmed, receive and store in-field transmissions from all other such moving objects and devices. Each of these transmissions is time-stamped and identified by device and location. The codes for any such attempted or consummated communications can then be collected and uploaded to the Compensation unit 900 and the Distribution unit 800 when these moving objects are linked to a network.

This level of verifiable information on consumer demographics, psychographics and interests, when coupled with their movements and travels, can be of extraordinary value to market researchers and planners. These include: architects and developers, retail store and mall planners, high schools and universities, concert and event producers, resort and theme park planners, transportation planners, law enforcement, government lawmakers and of course advertisers and marketers. The sale of this data is indicated at 1100 in FIG. 1. The downloading of special instructions for the collection of ad hoc research and planning data based on independently contracted or measured studies is shown at 1120 in FIG. 4. The uploading of such ad hoc collected in-field data is shown at 1140.

Logged Personal Use Authorizations (request signals permitting or preventing personal content to be presented to a viewing vehicle) are uploaded from all vehicles at 167 to the Compensation unit 900. Logged Personal Use Exposure (data confirming the presentation of personal content to a viewing vehicle) is uploaded at 168 to the Compensation unit 900 via Network Access Points (NAPs) in the same manner as logged Advertising or Public Service Exposure is uploaded from moving objects. Such logged exposure is sent to Distribution 800, where it is matched with Personal and Fleet/Government Use Profiles as shown at 175. Once content deliveries are matched and authenticated (by confirming that the codes on delivered content match the codes on the receiving moving object and also cross-check with the originally uploaded content), then the Compensation unit authorizes the fees charged for such Personal Use Exposure to be either billed to the Registered Owner 1000 or subtracted from any Compensation that is to be paid to that Registered Owner as indicated at 178.

Figure 5:
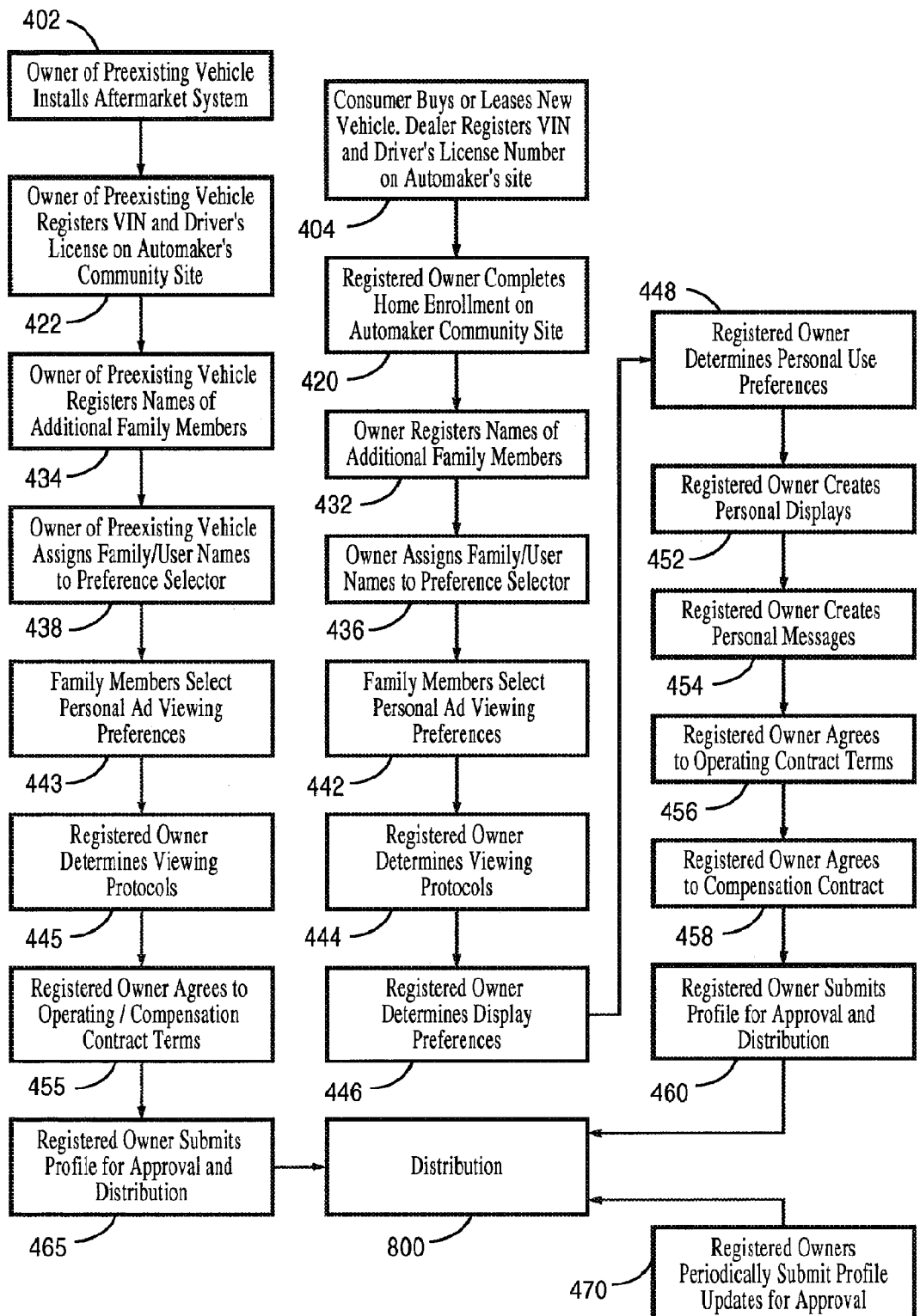
FIG. 5 is a block diagram depicting an owner registration process for the present invention.

FIG. 5 is a block diagram depicting a typical owner registration process for the present invention. The basic procedure for completing online registrations are commonly known today, so it is the purpose of this diagram to describe the steps and decisions a consumer might make in engaging with the business of viewing and displaying hyper-relevant ads and personal communications. Two parallel engagement paths are shown, reflecting a preferred embodiment including a land-based vehicle. Both paths describe a consumer's entry into the distribution network beginning at 402 for Pre Existing (or aftermarket) Vehicles and at 404 for New Production Vehicles.

Beginning at 402, the consumer of a Pre Existing Vehicle bears the responsibility for buying, installing and setting up the hardware and software through which he participates in the distribution network 800. This can be accomplished through a purchase of the electronics package from an automotive dealer (followed with installation by that dealer) or it might result from the purchase of the package from an automotive accessories or aftermarket retailer and could be installed by the owner himself. Regardless, the process of registration and membership which follows is essentially the same for both user paths.

At 422, using a computer, a modem and an online browser to interact with the aftermarket manufacturer's web site, the prospective user submits his Vehicle Identification Number (VIN) and other required information, such as (pending final registration and contractual requirements) his Driver's License number and other necessary information such as the brand, year, make and model of his vehicle, unless such data is provided for in the VIN, and Credit Information. The physical characteristics of each vehicle—height, width, driver's eyepoint (or eye envelope), number of occupants when at full capacity, etc.—are pre-encoded, either as part of the registered VIN, or under each owner's vehicle profile by make and model. In practice, these specifications are transmitted between moving objects so that optimum, yet minimum, spacing between moving objects is always established when stopping in traffic with precise line-of-sight viewing angles based on the different vehicle types. For example, a driver's forward sightline through a windshield at a height typical of a low sedan or sports car to the rear area of a tall SUV will result in a more upward angled sightline and a specific bumper to bumper vehicle spacing requirement; conversely, a line-of-sight through the windshield of a taller SUV to a video display on the aft surfaces of a low sports sedan would result in a more extreme downward viewing angle and yet different kind of vehicle to vehicle optimum spacing; and finally where an SUV to another SUV of similar height would produce a more horizontal sightline and yet another specification for vehicle spacing. In other words, because interacting vehicles talk to each other and exchange VIN numbers, the lead or stopped vehicle is able to tell a vehicle approaching from the rear precisely the best place to stop for the optimum viewing of its rear mounted display. In every case, the proximity measurements and the vehicle-to-vehicle spacing (further discussed in FIG. 17) is governed by vehicle codes so that optimum sightlines are established for content delivery and so that the tightest practical spacing between all so equipped vehicle types is assured, which conserves traffic lane consumption under practical traffic conditions. Vehicle-to-vehicle lane space conservation enabled by a visual range/stopping indicator is a valuable byproduct of the present invention.

Continuing the online registration process at 434, each new user has the opportunity to register, or allow other drivers or passengers in the family (or in the business if a fleet application) to register, along with the ages and genders of any children or other family members who might be passengers in the vehicle under that VIN. At this point, each family member can establish his own user name and password if they wish. If that person is underage, or if it is preferred by the Registered Owner (who normally becomes the System Administrator for the VIN), then he or she will control access to the system and to any profiles that are later completed for such family members.

Figure 7:
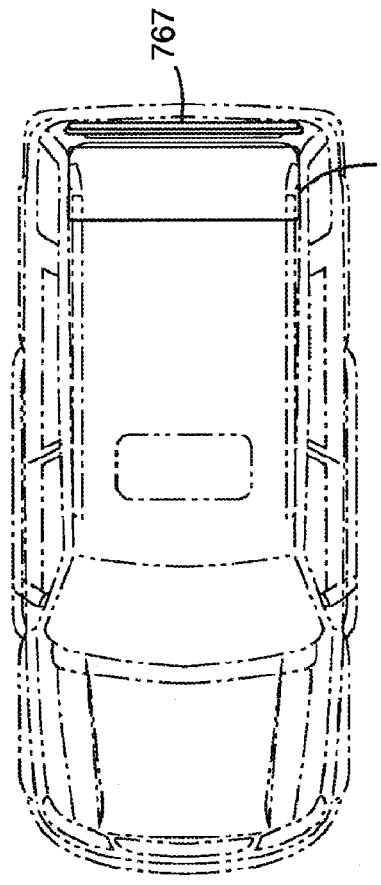
FIGS. 7-10 illustrate an aftermarket body panel conversion for a sport utility vehicle (SUV).
Figure 8:
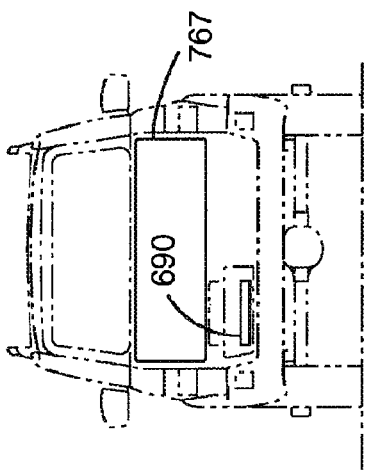

At 438, these user names (or nickname handles) are programmed into the vehicle's User Selector 780 (explained in more detail in FIG. 7). This control allows consumers to switch the viewing preferences on-the-fly from one person to another, or combinations thereof. However, final control can always remain with the vehicle's System Administrator. In other words, dad controls who gets to see what while riding in dad's car.

At 443, family members are allowed, in the privacy of their own home, to select their individual ad viewing preferences. Here, each member of the family (or the authorized users in a business) can execute multiple choice, click-on, or write-in-the-box text responses which allow them to define "who they are" and "what they want" in terms of their personal interests, wants, needs and experiences, and in the kinds of advertising they would like to view. This profiling technique is explained in detail and is the subject of the applicant's nonprovisional patent application Ser. No. 11/552,932, filed Oct. 25, 2006, entitled: "METHOD AND APPARATUS FOR OBTAINING REVENUE FROM THE DISTRIBUTION OF HYPER-RELEVANT ADVERTISING THROUGH PERMISSIVE MIND READING, PROXIMITY ENCOUNTERS AND DATABASE AGGREGATION", incorporated herein by reference in its entirety.

Using an individual's home or office computer, a networked laptop, a PDA or even a cell phone, user personal profiles can be updated and submitted periodically from nearly any location having network access. Also, because ad preferences can be highly personal in nature—and because they directly influence the kinds of products and services, or the kinds of entertainment and lifestyles a user is interested in or curious about—it is possible for users, at 443, to select and control the timing and circumstances for all outgoing content requests. For example, if an individual is interested in certain kinds of personal products or subject matter which he prefers remaining confidential, when he completes this portion of his Personal Ad Viewing Preferences, he can limit such content requests, for example, to only the times he is alone in his vehicle. It is also possible to control the external display viewing angle so that others in vehicles adjacent to a viewed vehicle are unable or less able to see any content that is displayed.

In a similar manner, a user can prevent certain kinds or all kinds of advertising to be presented to him by other objects at the time he is operating or is inside his own moving object. If a user finds certain content to be of little or no personal interest, or if he finds it offensive or objectionable, he can prevent its exposure to himself and to others who may be with him or are in the immediate vicinity. The present invention accomplishes this simply by deleting or preventing content requests based on a specific user's stored profile. When a user prevents the display of such content to himself, he also precludes the displaying party from earning any compensation from such display. Thus the present invention is in many ways a very democratic process.

For parents of young children, the system is a tremendous advantage. Under a preferred embodiment defining a land-based moving object, when kids are traveling in their parents' vehicle, parents can prevent certain ads or content which they feel are inappropriate from being displayed on moving or fixed objects around them. When the kids are no longer in the vehicle, those ads can be switched back on or allowed.

At 445, the Registered Owner of a Pre Existing Vehicle can also determine his own and his family's Viewing Protocols. Preferences can be switched on or off depending upon the occupants of the vehicle, or whether the party responsible for the vehicle wishes to allow or to prevent ads from being viewed by any other specific party. Research reveals that kids today truly enjoy watching commercials as long as they deal with subjects they are interested in. So if kids are misbehaving, parents might just threaten to shut off their ad viewing preferences for the rest of the way home.

A wide variety of ad viewing features are expected to be implemented by the individual manufacturers of moving objects under the guidelines framed by the Distribution network 800 and government regulations relating thereto. For example, such features might allow users to give weight to each family member's preferences in terms of time sharing during use (e.g., 20% to dad's preferences, 30% to mom's preferences, with the kids splitting the remaining 50% evenly, assuming they've been good). These preferences are interpreted into signals broadcast to other moving or stationary objects in the vicinity, thereby controlling the variety and nature of the ads polled and selected for presentation by such other objects. Based on each vehicle manufacturer's specifications and on network content guidelines, the application of user preferences can be further controlled, either automatically or manually, based on the time of day and event location. For example, if mom is running around all day doing errands, then picks up the kids and delivers them home or to a friend's house between 3:00 PM and 4:00 PM, she can set the preferences to favor herself up until 3:00 PM, then engage the kids preferences for an hour, then instruct the vehicle to switch them back automatically to hers after they've been dropped off, or she can do this manually. Just as in the design and execution of vehicle air conditioning and entertainment control systems, it will be up to each manufacturer to design and integrate its own version of these controls for marketing, human factors and user friendliness under its own quality control and operating standards, providing of course they also comply with any federally or more universally mandated system standards.

At 455, after completing membership, viewing, and protocol preferences, the newly Registered Owner of a Pre Existing Vehicle is presented with the network's Distribution and Compensation contract terms and conditions which he must read and sign electronically. Finally, at 465, he submits his profile package and executed contracts online to the Distribution entity 800 for approval.

In the second engagement path, beginning at 404 (and also under a preferred embodiment using a land-based vehicle), an owner has purchased or leased a New Production Vehicle with the ad display technology built in. As we saw in the family scenario, the dealership has pre-registered the vehicle using the new owner's Driver's License number which has been linked to the new product's VIN. At 420, this new owner completes his registration process using the automaker's Home Enrollment community web site.

It is beyond the scope of this document to describe the various potential methods of consumer profiling or content encoding, because these are straightforward processes well known to those skilled in the fields of demographic and psychographic analysis and in the arts of interpreting the subjective elements that comprise human interest and commercial engagement. Regardless, the process begins in FIG. 5 at 420 for New Production Vehicles (continuing through steps 432, 436, 442, 444, 446), and at 422 for aftermarket vehicles (continuing through 434, 438, 443 and 445), as consumers are asked in separate profiles to generally define "who they are" and "what they want" in terms of relative life experiences, expectations, beliefs, interests and objectives regarding various types of products or services. This may extend to specific brands, product makes, companies or even political affiliations. Such profiles are executed in guided, online question and answer sessions which combine multiple choice questions and unstructured text responses designed to encourage individuals to better know and reveal themselves and their unique personalities. These profiles can be later analyzed for hidden relational values and meanings utilizing proprietary deep-search software designed to identify personal characteristics that individuals are often unable or unwilling to define for themselves. The methods for creating and gathering such personal information through profiling are well known to professionals in the fields of psychology and marketing. Also known are the methods of quantifying, weighting, characterizing, prioritizing, integrating and ultimately linking such results to the selling of products and services, along with methods of encoding and encrypting such data once it is created. What is novel is the present invention's method of directly asking consumers—and asking in significant detail—about the commercial content they are most interested in seeing and hearing about, and then enabling them, through a technological structure and system, to request, poll, queue and present such content on a time and venue specific basis at a time they are most open and receptive to such information.

The following steps, Registration of Additional Family Members (432); Assignment of Family/User Names to Preference Selector (436); Family Member Selection of Personal Ad Viewing Preferences (442), and Registered Owner Determines Viewing Protocols (444), are essentially the same as discussed for the Pre Existing Vehicle registration path.

At 446, however, the new vehicle owner is given a chance to determine his vehicle's Display Preferences, something preexisting vehicles are unable to do unless they are equipped with an external or internal video display. Generally, most content scheduling will be performed at the media buy level. In other words, there is a media exposure hierarchy which determines the value of a given ad's impressions based on the platform's ability to reach specific audiences at specific times with specific and hyper-relevant messages—and for the first time with the present invention—in very precise locations. Such media buys will be significantly more valuable to certain advertisers and will therefore command high price tags to the advertiser. If a Registered Owner is able to deliver large numbers of impressions in high-value markets, then he would also logically share in the receipts generated by that particular platform, in this case his own vehicle's VIN. For this reason the applicant envisions small business spin-offs involving individuals or small companies that could register large numbers of moving objects primarily to circulate ads within the high value target markets such as the downtown areas densely populated cities. Should this generate unnecessary traffic flow within these areas, procedures could be put in place to prevent such random increases.

Because content deliveries are essentially automated and represent sophisticated media buys (sensitive to content type, viewer demographics, locations, delivery times, etc.), and because most consumers will always want to optimize the revenue generated by their delivery platforms, it is best for consumers to set their display preferences to automatic. Automatic display references are designed to generate the greatest revenue by targeting and giving priority to the highest value markets first. In this regard, at 446, both the consumer and the Distribution entity are without conflict of interest. In determining one's own display preferences it is also possible to be relatively selective. For example, profiles will allow Registered Owners to preclude (or "blacklist") any companies whose products or services it prefers not to advertise, promote or display. In so doing, that owner also forgoes revenue from those precluded display ad opportunities. Examples might include individuals who wish to boycott certain products or companies. Another might be political candidates for one party or another, especially near election time. Therein lies another responsibility for Distribution, and an inherent feature of the present invention: political promotions in and around polling places can be electronically monitored and prevented. The reverse is also true. If an individual favors a particular company or product, he can request a priority for the display of content relating that company's products or services. At his option, he can also buy a corporate sponsorship for that entity. However, each such selection is likely to have revenue consequences for the Registered Owner.

At 448, media platform owners are able to implement another step in determining the use of their assets: selecting their Personal Use Preferences for their own moving objects. Because personal ad placement decisions also bear on the VIN's overall ability to generate income, only the System Administrator for that VIN (usually the Registered Owner) is permitted to authorize them. This is done easily and privately by the consumer following prompts on his user/community web site. Such personal use is typically charged at a discount since a family or individual will be using his own asset, but clearly such use will reduce revenues from that individual's display of content for others.

At 452, family members (or small businesses) are allowed to create and submit their own personal ad content for display on their own or on other moving objects. Such content can range from simple neighborhood business ads to very spontaneous advertisements applied to vehicles on the spur of the moment, such as displaying a High School's home team logo at game time. At 454, owners are given the chance create personal messages. These can be posted instantly and spontaneously, or on a scheduled basis, on an owner's own vehicle, or on other vehicles based on a standard rate. Such messages can also be accompanied by audio content sent wirelessly to a viewing vehicle's on-board audio system, or released within a viewing vehicle from its internal hard drive, based on a received code. There are many such examples of personal ads, sponsorships or messaging: a political candidate might email you an animated electronic bumper sticker from their campaign office which, if you approve, you can then send directly to the back of your car at the click of a mouse. Another such spontaneous message might be a "For Sale" sign on the back of a vehicle, linked to "impulse request" electronics as a means for obtaining information on-the-fly (a feature described in more detail at 782 in FIG. 7). Another example might be a "Just Married" sign appearing on, perhaps, all of the vehicles in a wedding party, or a "Need Help" alert if problems are encountered on an open highway. Any number of spontaneously posted personal messages is possible providing they meet the Distribution entity's Standards and Practices for Personal Content review and are approved at 842 in FIG. 8. As explained later, this unit can electronically screen and then lock out certain graphic content that may be commonly viewed as offensive in terms of public exposure, or beyond the bounds of reasonable free speech. Such content is submitted by the Registered Owner online and once screened, can be scheduled for automated release, or can be stored on the VIN's hard drive for spontaneous or manual release by the owner in the field. The display of Personal content will be accompanied by a standard fee for the level of exposure anticipated (based on the time, place and market for that impression) less any discounts, and the transaction would show up on the VIN owner's monthly statement. Personal Use charges would normally be discounted and debited against the Registered Owner's monthly income check. The broadcast of Personal Ad Content to other moving objects, however, would constitute a media buy. Such purchases are scheduled online at the going rates (again, based on the time, place and market for such impressions) and might possibly include discounts to large users or long-term memberships within the network.

The steps of Registered Owner Agreement with Operating Contract Terms (456); Agreement with Compensation Contract Terms (458); and Registered Owner Submits Profile for Approval and Distribution (460) are similar steps to those previously described for Pre Existing Vehicles.

Step 470 indicates an ongoing process whereby Registered Owners are able to, or in fact, encouraged to periodically update their profiles and memberships for the viewing of hyper-relevant content, and to submit any new personal content for approvals to the Distribution entity 800.

It is not the intent of this disclosure to teach the ways in which personal profiles should be structured, but to leave that to the marketers and planning experts skilled in the art of interpretive research for consumer interests and responses. That said, it is an object of the present invention to facilitate a means to learn the degree to which individuals are interested in, curious about, or leaning towards, purchases in such areas as transportation, foods, clothing, real estate, banking, finance, investment, consumer goods, toys, medicine, entertainment, social networking, communications, education, advanced technologies, sports, politics, current events and the like, along with relative specifics on the timing for such interests or prospective purchases, together with identifying the kinds of information that link such interests to specific kinds of lifestyle and content delivery. It is also an object of the present invention to allow for special events, for example when a mother is searching for birthday ideas for a teen son, or a husband for a wife's anniversary. With the ability to include such hyper-relevant interests and needs into the system and to later remind users of upcoming events, automatically and on a timely basis, the present invention is able to take hyper-targeted or hyper-relevant marketing and promotion to entirely new levels of performance.

Figure 6:
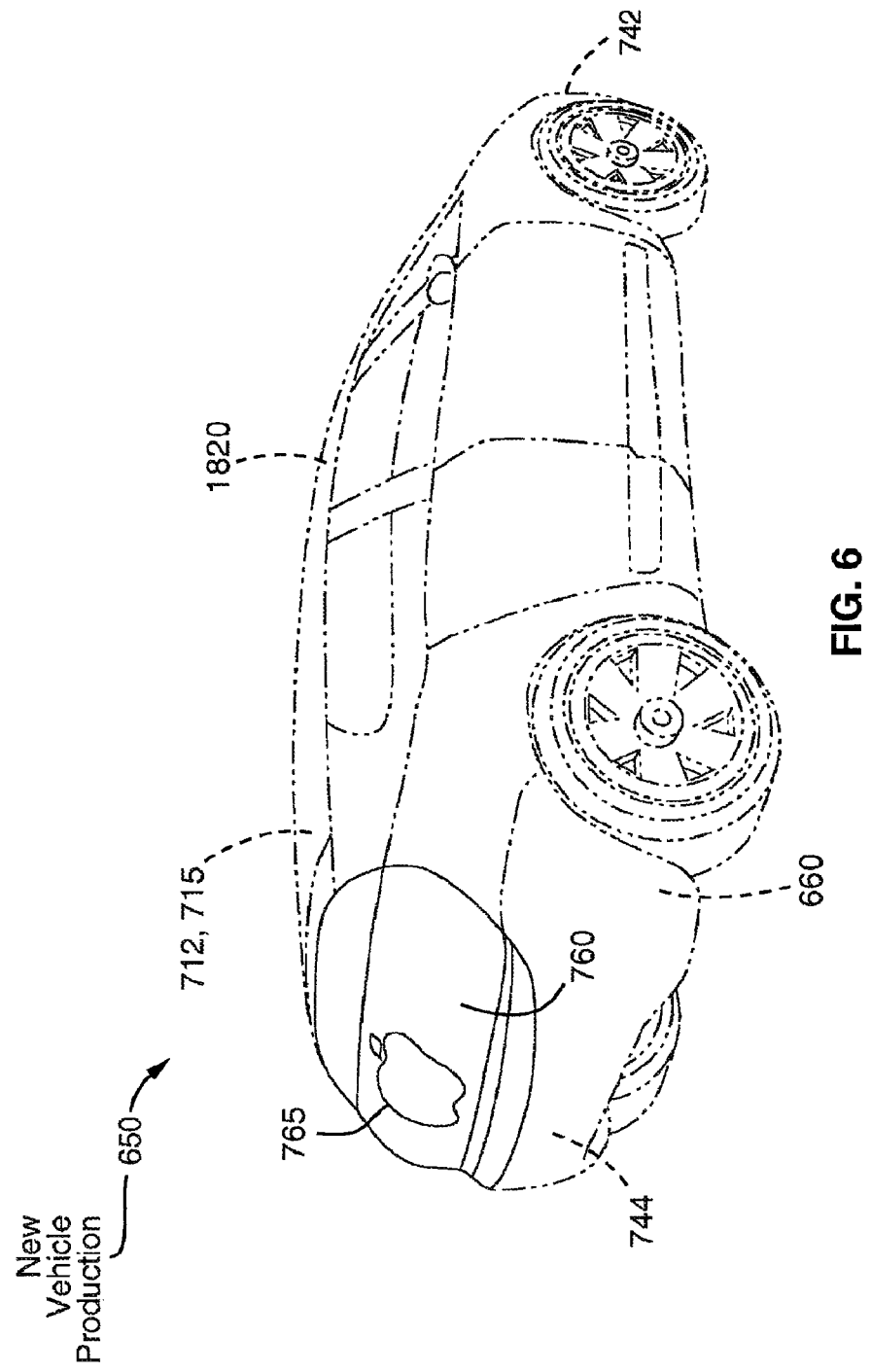
FIG. 6 illustrates a first embodiment of a land-based moving object using the invention.

FIG. 6 illustrates a first embodiment of a land-based moving object 650 where the integration of the hyper-relevant advertising display system can be clearly seen. The vehicle design and package shown follows an anticipated design evolution timeline and exhibits rear body surfaces that could naturally accommodate the display technology. A formed, printed OLED (or alternative) display 760 is present, with surfaces contoured to meet the desired rear deck lid and body panels of the subject vehicle. The display 760 is seamless and, in this example, runs the full width of the rear (5th) door; however, numerous configurations are feasible. The display 760 would be placed above the rear bumper impact zone, but may ultimately be considered a replaceable automotive crash part.

It is quite clear from this illustration that the proper design and integration of automotive digital rear ends can thoroughly enhance the aesthetic qualities of production automobiles while they optimize the functionality of the components they replace such as tail lights, turn signals, center mount stop light, back up lights, license plate lights, recesses, plates, frames and registration. At the same time, the single panel, lightweight display offers complete freedom for the automaker's model and branding, and in fact, introduces, for the first time ever, an ability to animate the way a vehicle brands, identifies and/or expresses itself. Of greatest importance, however, is the area of display 760, which can extend the full width of the rear hatch, and enables full motion video for the presentation of advertising content. A primary advantage of using formable and flexible organic light-emitting diode (OLED) displays for automotive applications of the type proposed by the present invention is that such display panels can be formed consistently with the design objectives of the original vehicle. By example, the incorporation of a conventional flat panel display in the size and type of panel shown in the figures would consume a prohibitive amount of the inner body panel cavity which is necessary for other vehicle functions. Also, because flat panel displays are not flexible, they cannot be integrated flush with a contemporary automobile's surface contours. This means that with the exception of tiny flat panel sizes which are too small for displays which can be read at appropriate distances, flat panels will produce undesirable surface reflections and significantly unrefined design appearances. OLED displays, FOLED (flexible organic light-emitting diode) displays or PHOLED (phosphorescent organic light-emitting diode) displays plus FOLED substrates which can be laminated into various types of automotive glazing, when combined represent an unending array of affordable video display opportunities for production body panel surfaces. Shown here at area 765 is a single corporate logo (in this case Apple Computer) in what might be called a "sponsorship" mode. This mode is commonly used while traveling at freeway or highway speeds, is designed for easy reading from greater distances and would permit only minor color changes or enhancements so that it would not attract the attention of nearby drivers. The display panel's background in this example could carry the same color as the vehicle's exterior finish allowing complete emphasis to be placed on the logo (the current ad content) as it is presented in this example. The moment this vehicle begins to slow, the logo would softly dissolve and brake light "zones" would appear simultaneously on the right and left sides of panel 760, along with the federally mandated center mount stop light just above the Apple logo seen here. At the same time, it is likely that license plate identification would appear in large, easy to read, well-illuminated graphics, perhaps in the center or to one side, depending on the automaker's default design. It is possible that brake light/turn signal/marker light portions of the digital rear end could change color and transition from pale amber through bright amber to amber-red, to rich bright red for the hardest braking. Such transitions in color and brightness, spread over more time and a greater panel area (while retaining the familiar left side/right side tail light visual separations which can help drivers gauge distance) provide increased levels of information relating to stopping urgency, compared to current brake warnings which transition between full on or full off, and which can lead to over-stimuli and panic stops as they so often do today. Of importance in the present invention is that during any speed or maneuvering changes the ad content slate is gently wiped clean so as to be totally non-distractive. At this moment, in fact during any vehicle maneuvering, vehicle lighting, licensing and FMVSS safety and performance systems take clear precedence over any other visual or graphic imagery on that portion of the vehicle. In other words, the present invention needn't introduce any new changes in the ways moving objects are viewed today. Drivers who are engaged with the present invention need not take their eyes off the objects moving in their paths as they must do today when viewing roadside advertisements and signage. In practice, the graphic surface character of a moving object may simply dissolve and change before a driver's eyes, but only at predetermined times (generally when fully stopped), and then always by transitioning to greater levels of safety and visual standardization at critical times. The present invention, therefore, promises not only richer, more relevant and meaningful commercial communications, but also greater operational highway and traffic safety through the optimization of uniform vehicle lighting and safety systems. The creation of common visual and lighting standards for motor vehicle braking, turning or hazard alerts, particularly in the form of solutions that can intercommunicate between multiple vehicles to more smoothly convey slowing or arising hazardous conditions to following drivers will have a greater positive impact on highway safety than do today's variety of unrelated designs and visual subsystems. The present invention allows such standardization and functional optimization for road safety and operations, while at the same time opening up greater opportunities for vehicle design creativity, product styling, branding, and free market expression. The possibilities are unlimited.

One of several possible locations for the electronics package which enables the present invention is indicated at 660. In practice, the entire unit would, in terms of today's technology, be roughly the size of a paperback book and could be located almost anywhere.

A roof location is indicated at 712 for the download antenna to receive both content and delivery instructions from antennas in parking garages, residences or on the open highway. An upload antenna is indicated at 715 for transmitting on-board data and information relating to in-field content requests and deliveries to network access points for measurement, accountability, confirmation and compensation. These antennas can be combined into a single unit or can be placed individually in numerous locations on moving objects. A possible location for the receiver which detects encoded content requests broadcast from other vehicles, as well as a potential location for a rear-looking proximity sensor (which is further described in FIG. 7), is indicated at 744. The vehicle spacing technology of the present invention, described hereinabove, enables display 760 to produce a color "spot" or visual target in the area 765, which then changes color (from green, through amber, to red) to encourage drivers to close up and position themselves at the optimum distance for viewing content and for the closest practical spacing between vehicles in an effort to conserve lane area, based on their precise vehicle types.

A front-mounted location is shown for the code transmitter 742 which sends VIN numbers, encoded user profiles and content requests, or combinations thereof, generally forward to a variety of vehicles or stationary objects for the purpose of selecting and queuing content from their internal or integral system data bases. Transmitter 742 could also be used to transmit video data from the requesting (viewing) vehicle for display reproduction on such other vehicles or on surrounding fixed or mobile objects which are equipped to interact with the present invention.

A general position is indicated for the optical sensor 1820, which reads traffic signal light color transitions and cross traffic flows as part of the Intersection Clock 1800. The Intersection Clock 1800 is an independent system which determines the time available for the display of video content at times vehicles are paused in traffic, and generally at times vehicles are stopped for traffic intersections. Optical sensor 1820 would be placed at or above eye level to the vehicle's operator and, in the case of the land-based moving object 650, could be integrated into the back side of the interior center rear view mirror case, as is often the case with headlamp sensors in contemporary passenger cars.

FIGS. 7-10 illustrate a low-cost flat panel embodiment of the present invention in a SUV 651. This application represents a non-optimized version of the present invention, suitable only for the limited production conversion of existing vehicles rather than fully-integrated OEM production. The basic elements comprising an aftermarket body panel conversion are shown as: a flat panel video display 761; a sheet metal or composite structural shell or pan 763, which provides both structure and protection for the electronic components; and a glass or plastic protective shroud 766, which both seals and keeps the video display 761 clean and secure. These elements are separately assembled, then mounted in various types of body panels from current production, after which they will be weather tested and final checked for electronic performance. The electronics package is shown at 690 and is described in more detail in a later section. Additional components may be required and depend upon the types of vehicle and installation required. FIGS. 7-10 show four views of a typical installation an SUV type vehicle. All of the examples indicated in FIGS. 7 through 16 represent conversions of existing production automotive body panels as opposed to installations on an original equipment assembly line. The intent is to address this lower cost, lower volume market as an interim step in bringing the invention to market at an earlier date and at more affordable development costs.

Figure 10:
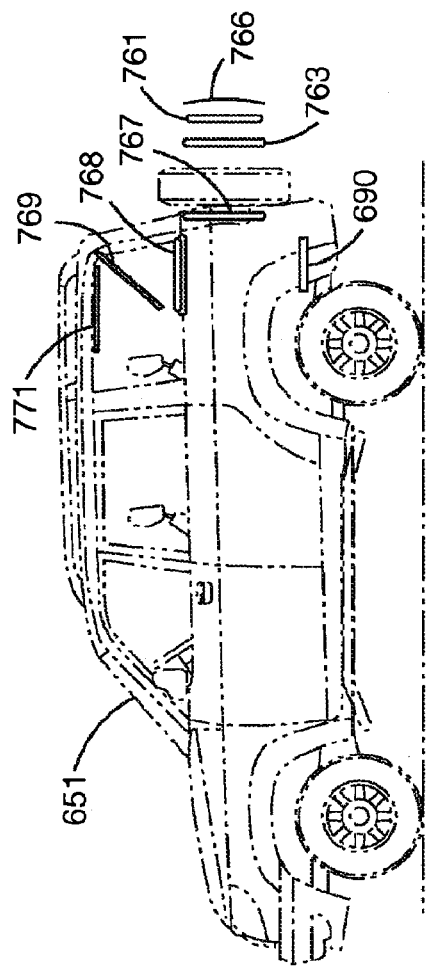
Figure 9:
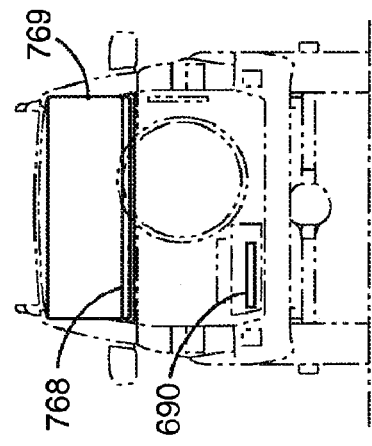

Two types of installations for SUVs are shown in FIGS. 7-10, a vertical mount in the sheet metal portion of the lower rear hatch (FIGS. 7-8, 10), and a horizontal mount which is viewed through the SUV's rear window (FIGS. 9-10). Both are designed to provide excellent viewing sightlines with respect to the occupants of a following (viewing) vehicle without consuming significant amounts of interior space or vehicle utility in the host SUV. A vertical installation is indicated at 767, and is preferred if there are no inherent obstacles such as an externally mounted spare tire (as shown in FIGS. 9-10). The horizontal video panel mount, shown at 768, can fold out of the way in the event large cargo must be carried. When in position, however, the display shown with mount 768 directs its video image upward into a partially silvered mirror, actually a flat glazed panel 769, where it is reflected rearward for viewing through the SUVs rear window. Since panel 769 is partially silvered on its lower (front) surface, it reflects a clean image and the driver's rear vision is unobstructed. The picture image output at the flat screen is, of course, reversed electronically for this application. For cargo access or maintenance, the mirror panel 769 swings away against the overhead as shown in position 771.

Today's off-the-shelf displays can perform the display functions nearly as well as the more advanced displays discussed herein and perform on a near-cost effective basis within the proposed business models. It is a simple matter to modify the aft hatch of a common SUV to incorporate a conventional flat screen television or monitor into its non-glazed sheet metal portion. It is also quite reasonable to position a flat screen monitor horizontally (on its back facing up), then place a partially silvered mirror at roughly a 45 degree angle above this display so that the image can be viewed through the rear window of the SUV without compromising the driver's rear view through this same rear window as also shown above and in FIGS. 12-13 and 15-16. Such a mounting retains the display within the vehicle, protected from weather and vandalism, and does not require modification of the external sheet metal surfaces. The mirror and sightline bending solution represents a novel installation of a large scale flat-panel display in a contemporary vehicle.

Figure 12:
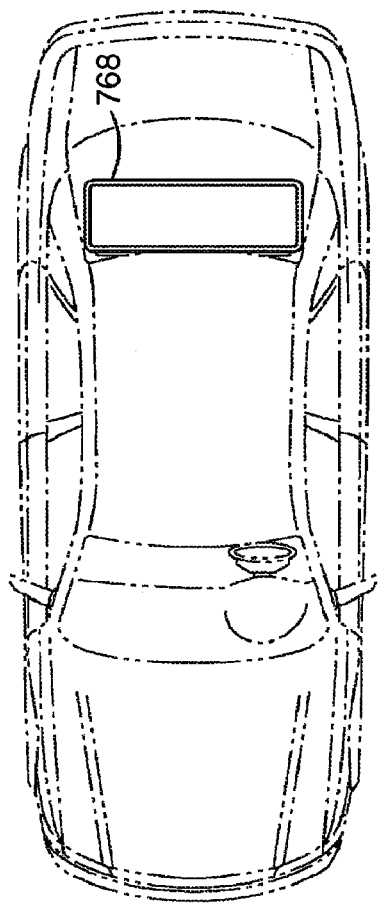
FIGS. 11-13 illustrate an aftermarket body panel conversion for a passenger sedan or Taxi.
Figure 13:
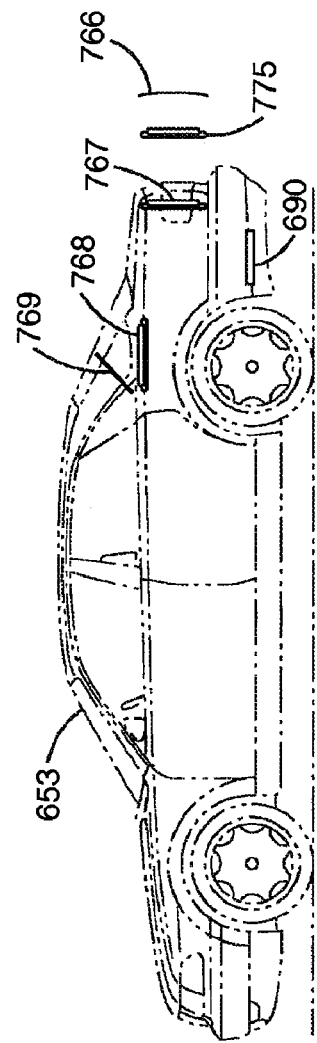
Figure 11:
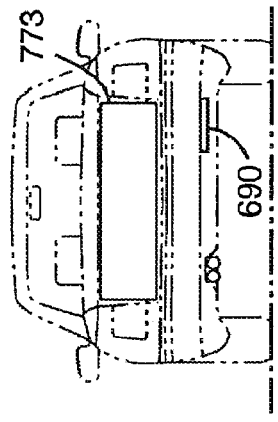

FIGS. 11-13 illustrate a general embodiment of the present invention in a passenger sedan or taxi 653. The most common installation for sedans or taxis will most likely be the vertical trunk mount 767. However, until vehicle licensing, plate lighting and registration issues are addressed, the rear license plates will need to be relocated to provide a full width display as shown at 773 in FIG. 11. Again, this unit comprises a structural pan and a video panel assembly 775 along with a protective weatherseal glazing 766. These installations would be made, fully tested and color-matched to vehicles to special purchase order. Installations would then be performed in only minutes by removing the original trunk (which would later be converted to a video display) and by installing the electronics package 690, along with wiring, into the vehicle's power and control systems. It is anticipated that the display system (which is normally on when the vehicle is operating) could be separately controlled by the driver and that such control would be exercised via a handheld remote which interacts directly with electronics package 690. This package, as will be later seen, contains the upload/download antennas, the central processor, and the hard drive for content and delivery instruction storage, along with supporting systems, sensors and drivers to control the video display. In FIGS. 12-13, a horizontal interior mounting 768 (like the SUV) is shown beneath the rear window on what is termed the package shelf. Again, a partially silvered or one-way mirror 769 allows the reversed video image to be properly viewed from the vehicle's exterior without obstruction to the driver's sightlines through the sedan's rear window.

Figure 15:
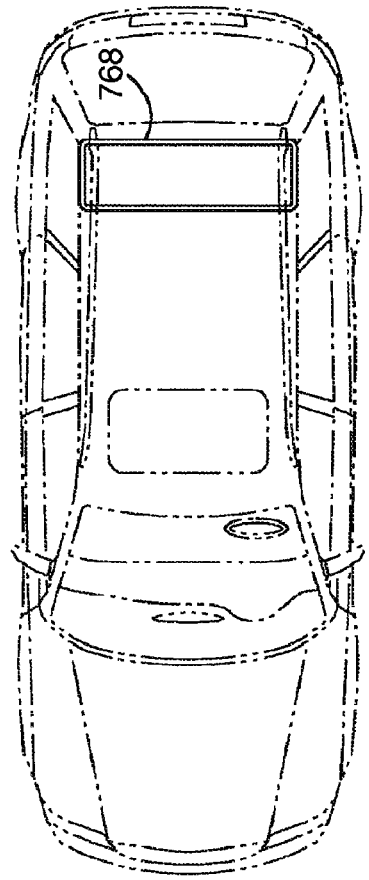
FIGS. 14-16 illustrate an aftermarket body panel conversion for a station wagon.
Figure 16:
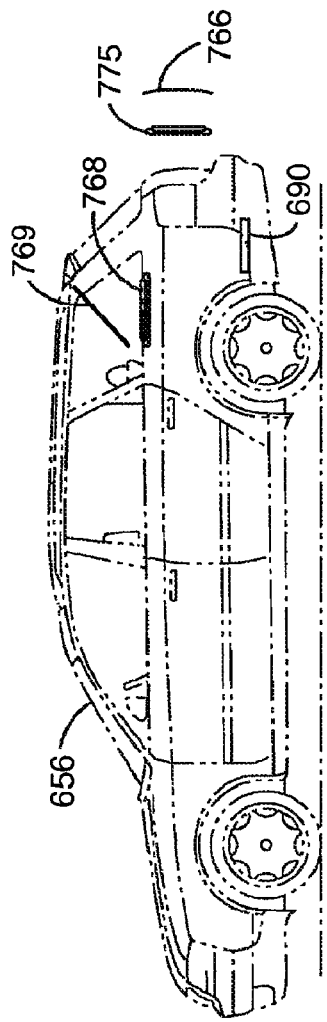
Figure 14:
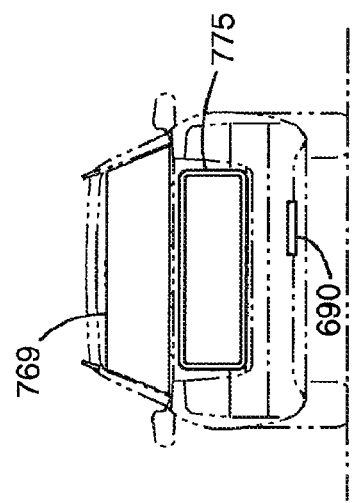

FIGS. 14-16 illustrate a general embodiment of the present invention in a station wagon 656. Again, the vertical mount full assembly 775 is shown before installation in the lower sheet metal of the station wagon's rear hatch, with its protective glazing cover at 766. As a secure alternative without the necessity of modifying any exterior body panels whatsoever, a flat panel display can be easily mounted on the interior of the station wagon with minimal infringement on the vehicle's cargo capacity below the window line with a horizontal mount 768, in the same configuration as in the SUV. The partially silvered mirror is shown again at 769 (in both side and end views), and will swing away in the event more interior space is required. Again, interior installations are not the optimum solutions as with fully integrated new vehicle production, but they are viable for the operation of a robust conversion market which will allow the users of new or used production vehicles to realize significant revenue streams from their own motor vehicles and the present invention early on. As before, the electronics package 690 to drive either of the display installations is also shown.

In terms of market size for the aftermarket conversion segment of the present invention, the applicant envisions an orderly phase-in based on the upfitting of video-equipped interchangeable body panels for the most popular makes and models of current production vehicles. Later, these panels (such as rear hatches and doors, trunk lids and pickup truck tailgates) will likely be offered as options through new car dealerships and sold in the same way as any other high-end automotive accessory. Eventually, when it becomes apparent that the present invention can generate significant revenue for all vehicle owners—indeed, incomes which can virtually pay for the purchase of the vehicle—the present invention will find its way into full original equipment manufacturing for motor vehicles and will be mass-marketed accordingly.

The present invention would be covered under traditional automotive and property insurance just as any other automotive component. As a removable panel, the present invention is easily replaced in the event of impact damage, theft, or other types of loss. Theft, at least for the purposes of generating revenue for the display of content, is not likely to yield success for the thief due to the integral safeguards of the network, discussed elsewhere. In terms of cost, such a product might today add, conservatively, $2,000 to the base price of a vehicle when fully installed. Normally, in the world of automobiles, this would be totally unacceptable but this happens to be a revenue-producing component. Using the simple income streams previously established and proven for the display of non-video vehicle advertising—and even without the commanding visual performance or the extraordinary flexibility of demographic and proximity hyper-relevant targeting—the present invention could completely pay for itself in less than 10 months and then produce positive cash flow for its owner. Meanwhile, the costs for converting to a vehicle containing a system according to the present invention would be virtually unnoticed in the financed monthly purchase or lease payments.

The applicant is unaware of the existence of any commercially-viable, low cost panel conversion alternative capable of generating revenue for the mass-market and general driving population through the display of hyper-relevant video advertising on moving objects, let alone the transmission of audio sounds to viewing vehicles, the subsequent control of such content by said viewing vehicles and the electronic distribution, measurement, engagement tracking and the later downloading of mass-market, ad hoc collected information together with owner/operator compensation.

Figure 17:
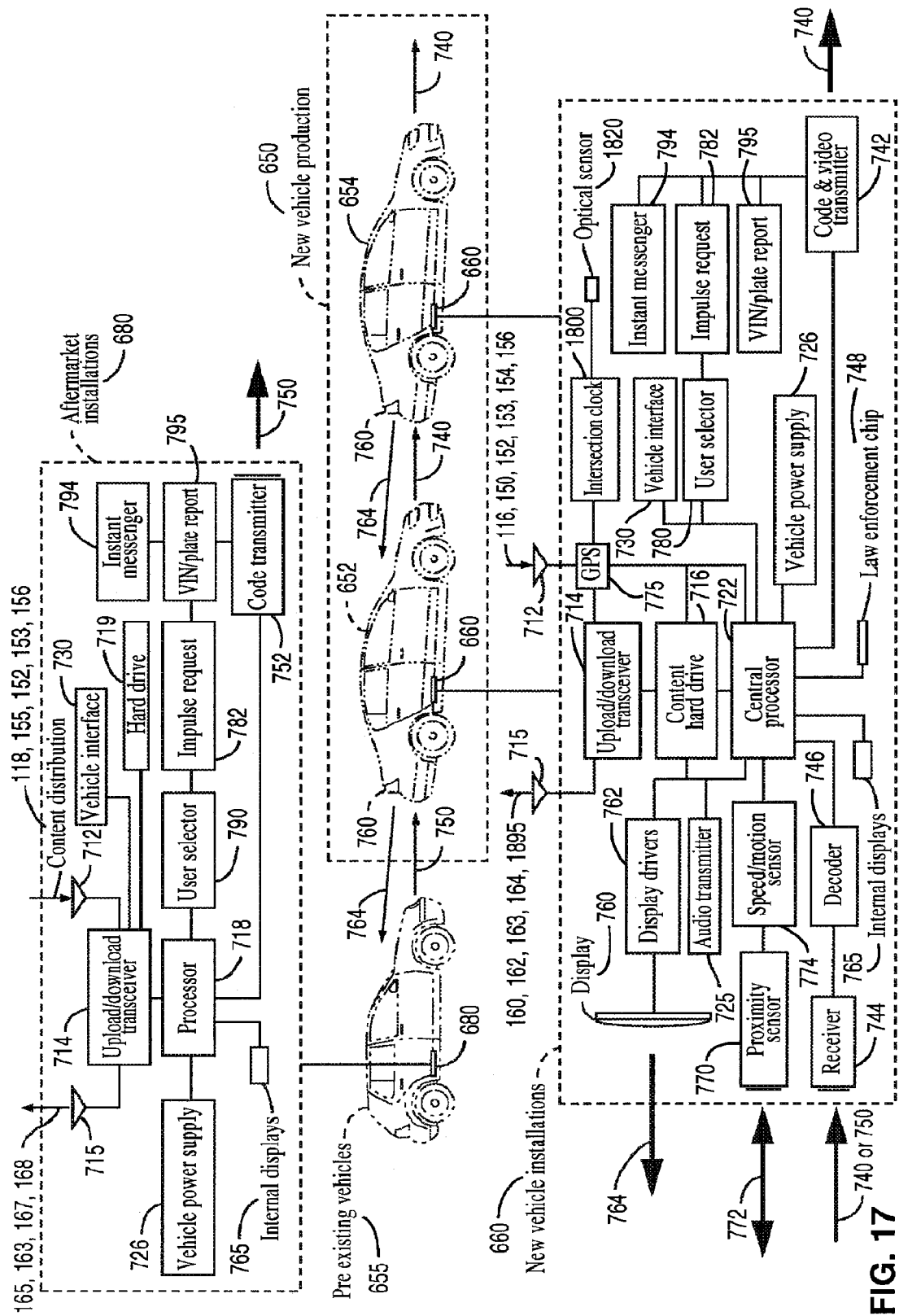
FIG. 17 is a block diagram depicting the electronic vehicle packages for the present invention.

FIG. 17 is a block diagram depicting electronic vehicle packages for the present invention. With respect to land-based vehicles, New Vehicle Production is represented at 650, and Pre Existing Vehicles are represented at 655. Inside each New Production Vehicle is an electronics package 660, which has been incorporated into the vehicle's complement of electronics. Also standard is an external video display 760, shown in the embodiment as a rear-facing configuration, intended for viewing by a following vehicle, although side panel or frontal viewing is anticipated. Video imagery 764 is viewable by the occupants of a following (viewing) moving object.

The Pre Existing Vehicle 655 also has an on-board electronics package 680; however, it does not have an integrated video display. It is possible, as previously discussed, for such owners to purchase modular or add-on video displays so that they can benefit from the advertising display revenue opportunities. Such displays, however, are not likely to have the high degree of integration of a full Production Vehicle.

Looking first at the New Vehicle Production package, note the forward-looking signal 740 transmitted from each vehicle depicted. Signal 740 is directed generally forward from code transmitter 742, and typically contains content requests (as previously discussed) comprising encoded specifications about the specific VIN including its brand, make, model, and year, and therefore its physical dimensions, perhaps its color, method of purchase (buy vs. lease), whether or not it is a rental car, its home state of registration, perhaps even data relating to its mileage or condition. Many options are possible and this data can be interpreted into a wealth of valuable cues for marketers. Signal 740 also sends encoded "content requests" based on user codes and profiles for drivers and passengers who have completed them and who have engaged their user names at user selector 780 which enables such "requests" to be included in the VIN's mobile broadcast. A Pre Existing Vehicle 655 is capable of broadcasting a similar signal, shown at 750. However, as an option, transmitter 742 can be configured to transmit digital packets comprising 6, 10, 15, 20, or 30 second commercial video spots over short distances for immediate queuing and display on a viewed vehicle. Under most circumstances, transmitter 742 only needs to transmit DMV and user code content requests for the purpose of selecting and queuing content from the on board library of a viewed (display) vehicle. However, in unusual or special cases where specific content may not available in a viewed vehicle's database, content can drawn from the viewing vehicle and be transmitted wirelessly for display if both vehicles are so equipped.

Numerous means exist to transmit and receive such wireless signals (RF, optical, acoustical), any of which may vary in wavelength, strength, range, spread, duration, modulation, or encoding, and while such variations may be dictated by venue, by the type of moving objects, by the numbers or speeds of moving objects, by weather conditions, by cost, by manufacturer, by federal or local regulations, or by the override or integration requirements with other systems and factors, it is anticipated that such signals will not interfere with other transmissions and comprise a roughly a horizontal spread pattern and range generally consistent with that of standard vehicle headlamp spreads used in night driving. In other words, the strongest signal will be transmitted straight ahead, in the direction a moving object is traveling, while the strength of that signal will fall off gradually to either side. In this way, VIN and user codes can be simultaneously received from following vehicles in differing strengths from side to side, but receiver 744 will always favor the strongest signal, which is typically from the moving object which is immediately rearward in the same path or traffic lane. It is further anticipated that to accommodate curved road conditions, RF transmission is spread laterally by either electronic or mechanical means (for example, by linking a highly directional antenna to the vehicle's steering as is done increasingly with turning headlamps, except electronically rather than mechanically) so that content requests are not merely directed forward, but also in the direction of the anticipated path, curve, or lane change.

Looking first at New Vehicle Installations 600, we see incoming content requests represented by signals 740 (750 for Pre Existing Vehicles), received at receiver 744, where they are passed on to decoder 746. Once decoded, this information is sent to central processor 722, where it is polled and matched with previously established marketing criteria which in turn permits the selection and queuing of hyper-relevant ads, public service, or personal content from hard drive 716. If signal 744 contains digital information for the reproduction of video, it will be decoded as such at 746, processed at 722, and sent to the display drivers 762, for presentation based on previously established delivery protocols.

Before content is released from on-board hard drive 716, two important things must occur. First, the amount of time available for a display of content must be determined; however, this is optional. Second, that content must be reviewed at 722 for any overriding priorities, such as Public Service Alerts, Proximity Priorities, Personal Priorities, or Law Enforcement Priorities, any of which may preempt normal commercial messages. The task of determining the available time for content deliveries is done via the Intersection Clock 1800. Since traffic stop lights represent ideal times for content deliveries, it is important to know the timing of the traffic lights at a particular location, that is, i.e. when the light will change from red to green, and at what point in the traffic light sequence a vehicle equipped with the present invention has arrived. The Intersection Clock 1800 is an electronics component that uses a vehicle's on board GPS system (or its own internal GPS type of system) to identify a specific location or intersection on a city street or roadway where infrastructures (such as traffic signals or freeway onramp monitors) are used to regulate traffic. Once it has identified a given location using the GPS, the Intersection Clock 1800 checks its own database to see if there is any stored information that will provide the signal timing sequence for this particular intersection. Next, it searches for incoming radio signals from other vehicles equipped with the present invention already in that intersection in an effort to obtain or confirm the traffic signal sequence and to synchronize its clock with any other vehicles already there. If none exist, the Intersection Clock 1800 will then open a location file and create a traffic signal signature for that venue and will store that data in its on board database. It will do this using optical sensor 1820 which reads sequential amber, red, and green light changes and records the timing between these changes for all traffic flow directions. Once these timings are known, processor 722 can select and queue content corresponding to the remaining times available. The Intersection Clock 1800 is explained in FIG. 35, and content priorities are explained in FIG. 31.

While being constantly monitored for any incoming priority overrides at central processor 722, queued content is checked against the on-board speed/motion sensor 774 and the on-board proximity sensor 770, which establishes a vehicle range signal 772, necessary to calculate the proximity and the relative positions and closing speeds between a viewed and a viewing vehicle. When previously established delivery criteria are met (content, time, place, speed, position, priorities, and previous deliveries), the selected content is released to display drivers 762 and to audio transmitter 725. The display drivers send video content to display 760, which enables the video imagery indicated at 764. If audio has been requested from the viewing VIN, it is synchronized to the video imagery and transmitted wirelessly from transmitter 725 directly to the requesting VIN's FM radio via vehicle interface 730. Alternatively, codes representing the requested audio content are sent wirelessly to the viewing vehicle via antenna 712 and transceiver 714 to hard drive 716, where they are used to queue the audio content corresponding to the video, and where it is then converted at processor 722 and delivered to vehicle interface 730 for reproduction over the requesting VIN's on-board sound system.

Two antennas are indicated with respect to the instant invention, one at 712, another at 715. Incoming antenna 712 receives transmission signals for the downloading of content and data via transceiver 714 for Encoded Owner/Operator Profiles 116; General Content Distribution 150; Public Service Content (road/weather hazard alerts, upgrades, etc.) 152; hyper-relevant ad Content 153; Driving Population Personal and Fleet/Government Public Service Content 154; and special programming instructions for ad hoc communications between vehicles 156. Antenna 715 enables the uploading of data and information gathered in the field which has been saved and stored on hard drive 716. Such information includes, but is not limited to: all Logged Content Exposure 160; Logged Public Service Exposure 162; Logged Advertising Requests from specific VINs 163; and Logged Advertising Exposure 164. Antenna 715 also enables the uploading of ad hoc research collected and stored on moving objects' hard drives (or on board memories) while in the field. Antennas 712, 715 can be combined into a single unit, depending on system design and the methods of distribution, and can be placed in a variety of locations on moving objects.

All content, along with distribution instructions (to whom and under what circumstances it is to be delivered), is uploaded from the Distribution unit 800, to hard drive 716 via transceiver 714. Such content has been previously and precisely encoded to conform to established advertising, public service, or personal content encoding guidelines and delivery instructions. Likewise, VIN information and the personal profiles associated with it are similarly encoded and uploaded at transceiver 714 to hard drive 716.

When content delivery is requested within a specific area (e.g., by a sponsor of a convention or exhibitor at a convention at the downtown convention center), these coordinates are wirelessly loaded via the Internet, along with the content, into the hard drive of all VINs operating within that physical area, for example, citywide. When central processor 722 receives information from a VIN's on board GPS system indicating that a vehicle is entering a designated area for content display, it automatically processes such requests and queues that content for display. Normally, advertising content is overridden by any emergency or a vital public service alert, should these occur in a common venue at the same time.

The on board vehicle power supply is indicated at 726. This would have a battery back up system to assure that license and registration displays are always operational and that the vehicle systems remain useable in the event of public service communications emergencies.

A vehicle interface is indicated at 730. This is a systems integration component which assures the proper interaction of the present invention with other components from standard mass production. Typical examples would be an interface which assures that incoming audio linked to a video to be displayed on a viewed vehicle is properly routed to the audio system of a viewing vehicle, that content displayed on a specific VIN's external display can also be monitored on that vehicle's internal display(s), or that a GPS navigational system, if separate, for example, is properly linked to the present invention's central processor 722 and to the Intersection Clock 1800.

At 780, the User Selector permits a Registered Owner and, if desired, any member of a family or business, to activate his personal preferences with regard to that VIN's outgoing content requests. Again, the individual user names, passwords, preferences, and their individual priorities are maintained online and are authorized for use only on a specific VIN and then only by its System Administrator (usually the Registered Owner). The human interface will likely be a small touch screen which presents the user names that are currently active for the VIN (in other words, a text or icon listing of the individuals whose profiles are currently active and influencing the display of advertising and communications on other moving or stationary objects in the vicinity). Such a display might optionally indicate the relative percentages to which each user influences outgoing content requests and possibly which user's content requests are currently being displayed.

Linked to User Selector 780 is the Impulse Request unit 782. This component stores authorized user names along with securely encoded contact and credit information to facilitate on-the-fly communications and purchases by the vehicle's registered occupants while in the field. If a teen sees a commercial for a new skateboard, for example, he only needs to touch the screen next to his name to have information on that product sent to his email address, said address having been previously stored. He can just as easily have it sent from his mom's car to his pals. If mom spots an ad for a new book, or even a new blouse, she can buy those items at the touch of a button because her credit information—and even her clothing size—would have been previously encoded and stored. When she gets home, confirmation of her purchase will be on her computer.

At 794 is the Instant Messenger. How many times have you wanted to send back a message to someone who is following too closely? Or create a special sign for school, a ball game, a sale, event, or a play? How about instant, easy to remove bumper stickers? The Instant Messenger allows operators to pre-store text messages and special designs which can be called up and presented at the push of a button or verbal command. It also allows instant signs to be typed in using an optional keyboard or through the vehicle interface 730, to receive input from cell phones or PDAs; however, software in central processor 722 continues to monitor all entries and precludes any offensive or objectionable words or content based on established system standards and practices.

The VIN/Plate Report 795 allows users to temporarily reveal another vehicle's license plate or identification and to cause it to remain displayed until a requesting VIN moves out of range or disengages its request. This report function can additionally record that license plate and VIN number for later access by the Registered Owner meaning that no one any longer has to search for a pen and paper to write down another driver's license number. If there is an accident involving multiple vehicles equipped with the present invention (such as a hit and run or a parking lot impact while you are away), such impacts are read by the proximity sensor 770, which then polls and collects information on all of the VINs in the immediate vicinity along with a time stamp, a GPS location and the speed of the host vehicle at the time. That data is then recorded into the hard drive for later downloading and potential use by law enforcement or insurance.

A Law Enforcement chip 748 can be programmed to enable a variety of features. First, this chip allows external law enforcement units (such as a pursuing Highway Patrol car or a helicopter overhead) to override the active external displays of a vehicle equipped with the present invention. Such overrides might cause a vehicle to reveal itself as stolen, for example, assuming such a report has been filed by its Registered Owner. In another example, surfaces on the subject vehicle might be caused to pulse or illuminate animated warnings in the event of such a pursuit, or perhaps to act as a primary source of illumination in the event of an open road accident or a disaster. The Law Enforcement chip can also sense tampering or hacking within the system and to optionally place a prominent advisory on the vehicle's external display, or to even lock certain systems including, but not limited to, suspending compensation to users who are in violation of the law. Technologies unrelated to the present invention are being explored to monitor and confirm erratic driving behaviors which could indicate drivers who may be under the influence of alcohol or drugs. By linking such alternative technologies via the vehicle interface 730, and by further confirming such behaviors via proximity sensor 770 and speed/motion sensor 774, the Law Enforcement chip could permit an override of operational displays to replace them with an "erratic vehicle warning" designed to warn other vehicles or alert law enforcement in the area.

Thus far, we've learned that people don't really object to viewing ads about subject matter they are interested in. We've learned that kids embrace advertising when it deals with things that are part of their lifestyles and are curious about. We've seen that it is possible for consumers to create profiles that tell advertisers "who they are" and "what they want" so that marketers are able to select, design, and deliver hyper-relevant content to those individuals on a time-and location-specific basis. We've learned that content can be distributed to moving objects where it can be stored for future use or presented in real time on external video displays and through the audio systems of other moving objects. And we've learned that consumers can be compensated for using the exteriors of their own moving objects as commercial video platforms. So, with all this, it's certainly possible to apply the same technologies to present hyper-targeted content on internal video displays 765 inside moving objects as well.

Imagine a high-end executive taxi or a commercial SUV that is able to present hyper-relevant video displays both inside and outside the same vehicle and can accommodate content requests simultaneously by separate parties, one party outside in the traffic environment, the other inside riding as a passenger. Outside the Executive SUV, surrounding vehicles would interact as previously explained, requesting content electronically which is presented on the external surfaces of the vehicle. Such displays would most likely be placed on the rear facing Executive SUV surfaces so they can be easily viewed by vehicles following. They could also be placed on the sides of the Executive SUV so they can be easily seen by pedestrians on sidewalks or by the occupants of other vehicles moving in parallel traffic lanes. But the inside of the vehicle would be configured differently. The interior would be more of a surround sound mobile theater tailored to combine a live travel experience through the presentation of highly-targeted information or advertising. Basic targeting would be done on a time and venue-specific basis; in other words, when passing retail stores, scenic attractions, and similar points of interest, any of these might be further described in informative detail or in graphic terms to enhance one's travel experience. Imagine displays embedded in glass that could superimpose graphics and information on the insides of windows so that such images would relate to, and in fact almost be superimposed over, passing real-world environments, events, and surroundings. Alternatively, envision a center-mounted touch screen console that carries a real-time camera-produced view of the passing cityscape, where all an occupant has to do is touch the screen with a finger to obtain real time information on those surroundings: the interiors of restaurants with menus, the inventory of special boutiques, or, perhaps, previews for new Broadway shows. Now envision a tiny wireless device that a person might carry in a pocket or purse which, like the hard drive in a moving object, is able hold all of your personal user codes and profiles and can transmit those codes via antenna 712, transceiver 714, and processor 722 to content hard drive 716 in your Executive SUV, so that hyper-relevant content that relates specifically to you and your interests can be queued and presented on the vehicle's interior displays.

Such a personal mobile device has been disclosed in the applicant's nonprovisional patent application Ser. No. 11/552,932, filed Oct. 25, 2006, entitled: "METHOD AND APPARATUS FOR OBTAINING REVENUE FROM THE DISTRIBUTION OF HYPER-RELEVANT ADVERTISING THROUGH PERMISSIVE MIND READING, PROXIMITY ENCOUNTERS AND DATABASE AGGREGATION", incorporated herein by reference in its entirety, and is referred to herein as MMx. MMx is able to receive, store, poll, extract, and transmit data and information in a similar manner to the moving object electronics packages depicted in FIG. 17 at 660 and 680. When an MMx device is programmed with information about a person's interests and objectives, it can then communicate this information to other MMx devices, or to any vehicle or stationary object that is equipped with the present invention. In other words, by carrying an MMx mobile device, pedestrians can interact with moving objects in the much the same way as moving objects interact with each other. By electronically telling nearby moving objects who they are and what they want, pedestrians can have the same kinds of hyper-relevant ads and other types of information presented to them on the exterior of nearby vehicles. If a person with such a mobile device rides inside a Pre Existing Vehicle that isn't equipped with the present invention, that mobile device can engage with other moving objects in its path that are equipped with the invention and can then request and control the display of hyper-relevant content on that vehicle's exterior displays. At the same time, an individual carrying a properly programmed MMx device can ride inside the kind of Executive SUV described above, and at that user's option, convert that vehicle's normally targeted content into hyper-relevant content deliveries. Thus, a simple cross-town trip in a luxury SUV equipped with the present invention now becomes a rich guided tour like none other, because it is pointing out features and details of personal interest and curiosity. Such experiences would resolve themselves through the sound systems of the Executive SUV and a complement of advanced interior video displays 765. Such limited production fleet and special purpose vehicles are anticipated as a normal part of test marketing and full production ramp up for the present invention.

Early Production

Early deployments are likely to be prototypes of Production Vehicles and specially designed fleet applications such as taxis, passenger-carrying commercial vans, SUVs, and crossover vehicles. It is also anticipated that early introductions of the present invention will be in the aftermarket conversion segment in which current, new production vehicles are upfitted with easily exchanged body panels (such as rear hatch/doors on SUVs and tailgates on trucks) which replace the original components with those having built-in video displays. An electronics package containing a full hard drive and all telematics systems would be placed in a convenient spot elsewhere in the vehicle. This aftermarket package would, in one embodiment, include a radio transmitter with a directional antenna to send short range FM signals to a following (viewing) vehicle which would then be able to enjoy sounds through its own internal sound system, synchronized to the visual presentation on the aft display of the aftermarket conversion vehicle.

Using today's off-the-shelf technology, one can easily assemble an operating version of the described invention in the form of an aftermarket conversion. The simplest implementation is that of modifying any of the large numbers of aft-facing body panel and glass elements which comprise contemporary passenger sedans, pickup trucks, or SUVs. Most of these have hinged rear hatches which, by virtue of those attachments, are easily removed from the main body structure. This means that a low cost-of-entry business opportunity exists for conversions. In practice, this would involve a new vehicle owner who, after placing an order, would drive to an assembly station where his original hatch, tailgate, or trunk would be removed and be replaced by a modified or remanufactured product containing the display technology of the present invention. The flat-screen video display and wiring harness would be typically incorporated into the sheet metal portion of the aft door assemblies. These components could also be installed on the interiors of certain vehicles or on the horizontal surfaces of interior package shelves or deck lids. These are shown more specifically in FIGS. 6-16. Metallic structures would be modified to accept the new video display, displacing, if necessary, latch handles or rear window wipers. A tinted, formed, and tempered glazing panel would be fitted over the video display for both weather and vandalism protection and to provide a well-integrated appearance. The entire assembly would then be weather-sealed and tested. A wiring harness would be attached via a connector to an electronics package installed, in most cases, beneath the rear seats or cargo shelf of the vehicle. This package would contain, among other things, a hard drive for the storage of advertising and display content, a central processor to control content distribution, a speed and vehicle motion sensor to govern content displays, an aft-looking proximity sensor to determine the presence of a following vehicle and to track its range and closing speeds, a wireless receiver to receive content with distribution instructions, a wireless transmitter to later upload in-field content delivery histories to the network and, optionally, an optical drive for the manual loading of content and control software. There would also be a hardware interface linking the electronics package to an on-board GPS navigational system for the distribution of location-sensitive content. The package would include an audio transmitter to send a corresponding audio channel to a viewing vehicle, either to its standard FM radio or via a special radio for receiving short range, encoded directional audio content signals. All of this would be controlled by the central processor and powered by the vehicle's on board power supply. When completed, the finished product need not appear substantially different from its original design except that it would contain a unique revenue-generating video display inside its newly attached rear hatch, tailgate, trunk, or door.

As an added feature, the electronics package might include an instant messenger provision that would allow a vehicle owner to place personal messages on the display at certain times. It is anticipated that such messaging would be submitted online and would therefore be screened for standards and practices and for any unwelcome content.

The greatest benefit in such an early deployment of the present invention is that it can quickly generate revenue for the owners of aftermarket conversions. Such revenue will quickly pay for the conversion itself, then go on to make the purchase and operation of the vehicle practically cost free, a significant accomplishment at a time drivers and owners are strained by increasing fuel costs and mounting traffic. Indeed, the presence of worsening bumper-to-bumper traffic sets the stage for the present invention in that registered owners can now be compensated for their wasted time and fuel expenditures in traffic each year simply by becoming part of a commercial television advertising platform, one capable of totally offsetting their costs for fuel, leases, or purchases.

Vehicle owners will be paid based upon the number of impressions they deliver relative to the value of the demographic and the market served. As full scale production emerges, increasing numbers of vehicles equipped with the present invention will be able to interact. However, until there are large numbers of interacting vehicles, the advertising displayed on them will remain relatively generic, more often targeted to specific locations, demographic groups, or times of day, rather than to the specific interests of participating individuals. With increasing new vehicle installations 660, and more Pre Existing (aftermarket) installations 680, fully targeted and hyper-relevant advertising will emerge. Until that happens, the Applicant anticipates that the use of MMx-type devices will help enable the transition to full hyper-relevant public advertising and personal messaging. And, as previously mentioned, it is possible that business models will emerge to allow the Registered Owners of Pre Existing Vehicles 655 to be compensated for requesting and viewing hyper-relevant advertising. It is also conceivable, therefore, that the users of MMx-type devices could be compensated by advertisers for viewing targeted and hyper-relevant content.

Continuing with FIG. 17, Aftermarket Installations 680 are similar to New Vehicle Production installations 660, but do not include a video display, display drivers, audio transmitters, GPS, or as large a processor, hard drive, or memory. Personal (user code and profile) content is received for storage in a similar manner to full production units via antenna 712, and includes the downloading of General Personal Preferences for non-display vehicles 118; the downloading of Content Preferences 155; the downloading of Public Service Content (road/weather hazard alerts, etc.) 152; Ad Content downloads 153; and any special software or instructions 156 relating to the ad hoc collection of data (normally vehicle-to-vehicle) for widespread monitoring and measurements. All downloaded content is stored on hard drive 719 and is processed at 718, where it is converted into encoded electrical signals for forward-looking transmission via code transmitter 752. Signal 750 is received by other vehicles equipped with the present invention via their receivers 744.

Vehicle Power Supply 726; Vehicle Interface 730; User Selector 790; Impulse Request unit 782; Instant Messenger 794; and VIN/Plate Report 795 serve the same functions in Aftermarket units as in New Production Units. If equipped with an interior on board display 765, such aftermarket installations could optionally present hyper-relevant advertising to their occupants, subject to safety standards for interior video displays.

After field use, processor 718 uploads to the network all in-field content requests that have been stored on hard drives 719 via upload/download transceiver 714 and antenna 715. In so doing, the following types of information are sent to the Compensation unit 900: Logged In-Field Content Requests from non-display vehicles 165; Logged Advertising Requests by VIN, by venue and time 163; Logged Personal Use Authorizations (including any view blocking or personal ads) 167; and Logged Personal Use Exposures or impressions 168 by VIN, venue, and times.

Figure 18A:
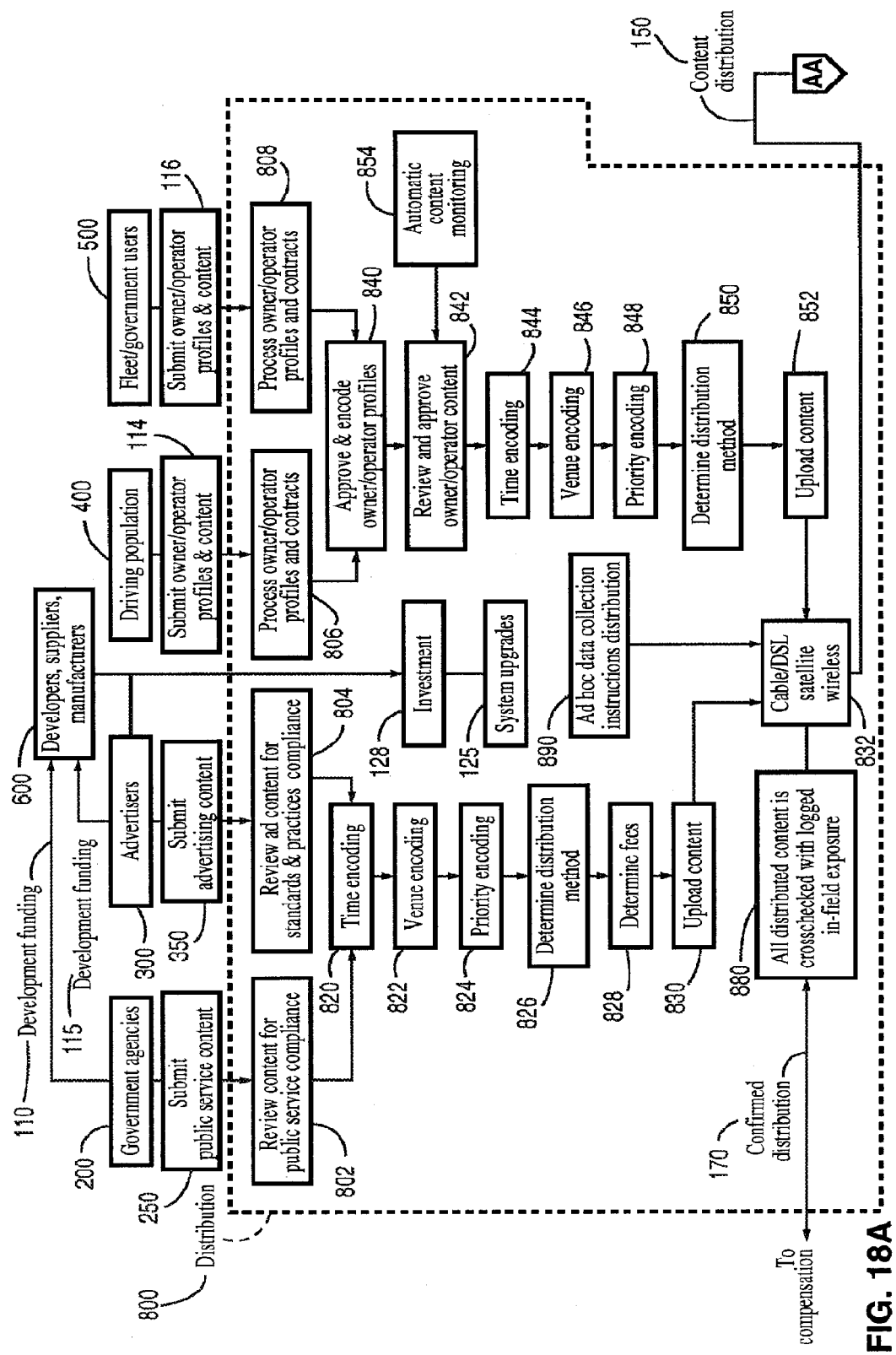
FIGS. 18A-18B are a block diagram depicting the Distribution model of the present invention.
Figure 18B:
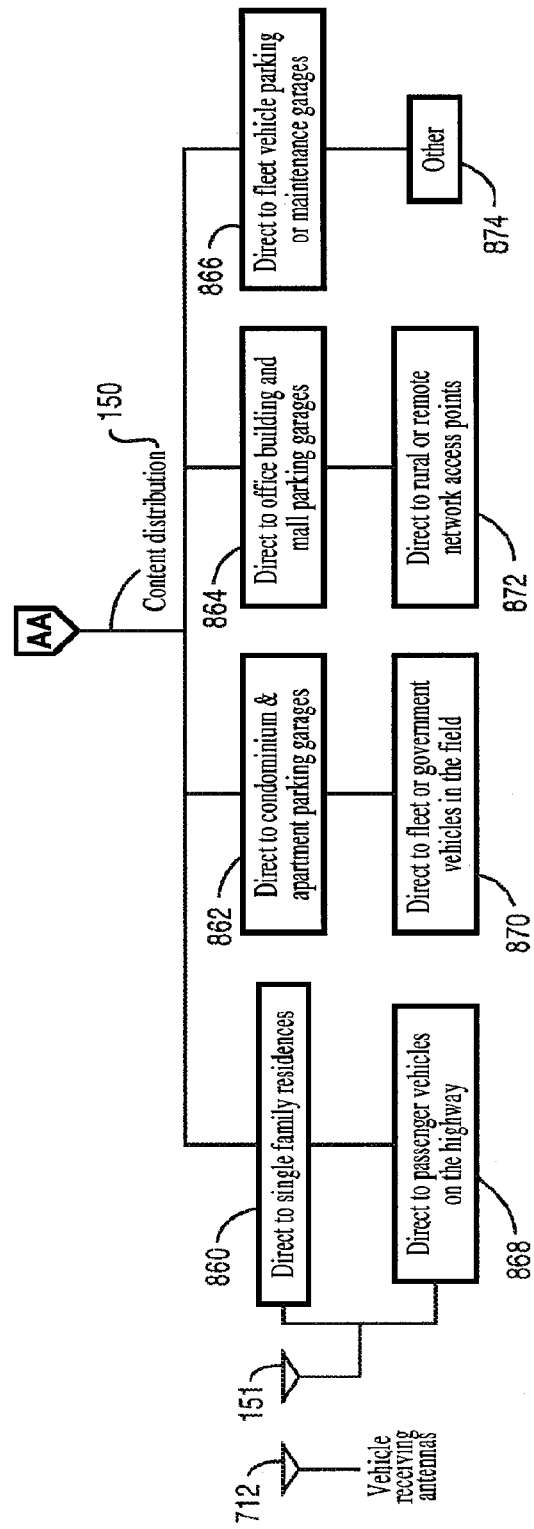

FIGS. 18A-18B show a block diagram depicting a Distribution model 800 for the present invention. This business unit (shown here separated from the compensation unit for clarity) is defined in terms of the elements essential for receiving, processing, and delivering a variety of content types to various moving or fixed objects in the field. Secondarily, FIGS. 18A-18B suggest potential funding relationships with the key parties to such a venture. At 110, potential incoming funding is indicated from various interested Government Agencies to Developers, Suppliers and Manufacturers of moving objects. At 115, the same is shown from the Advertising community, which could include large media companies or the advertisers themselves. By and large, however, it may be the makers and sellers of moving objects themselves that would support investment in such a Distribution entity, and that is shown as potential investment 128 and ongoing system upgrades 125 as part of production.

Across the top of FIG. 18A are represented the primary external user groups, comprising Government Agencies 200, Advertisers 300, the general Driving Population 400, and Fleet and Government Users 500. Each of these participating groups, which could be comprised of many sub-groups contributing to content production, submits such content in the same way they would if they were placing content with platforms such as network television. Participating Government Agencies thus submit public service content, such as state and local signage, hazard advisories, federal emergency content or local highway communications as well as vehicle licensing and registration matters at 250. Commercial advertising content submittals of all types are shown at 350. The input of Operator Profiles and Personal Content for the Driving Population is shown at 114, while the submission of Profiles and Content for Commercial Fleet and Government Users is shown at 116. Note that Government use has been depicted at both 250 and 116. Although Government use will resolve itself in many ways and applications, the depictions here assume that the uses anticipated at 250 relate more to regulatory issues and oversight in such areas public transportation and safety or highway development, whereas government use at 116 is presumed to be more vehicular in nature, such as law enforcement, border patrol, GSA, US Postal, and similar applications.

The first step in processing incoming content for Distribution is monitoring it for conformance to established content guidelines, standards and practices. This stage addresses both the message and the messenger in the sense that the content must meet approved content guidelines and the technical specifications required by the delivery platform, similar to the kinds of content and technical requirements that have to be met in configuring media for network television or outdoor billboards. These steps are shown at 802 for Government Agencies and at 804 for commercial Advertisers. Processing for the Driving Population is shown at 806 and for Fleet/Government Users at 808. Each of these steps involves the computer screening and approval of user profiles, the approval of user contracts and the monitoring of subsequently submitted personal and business content. Methods and procedures for such monitoring and approvals are well known in the industry and ample precedents exist in parallel forms of media buys and content delivery. However, it is anticipated that increasingly sophisticated forms of image recognition and content rating methodologies will evolve, as will an increased use of the Internet for all delivery and accounting functions, which reduces the need for and costs of human intervention.

In contrast to major Government and Advertiser users, the Driving Population and Fleet/Business users will engage in the creation of exacting user profiles in order to define their terms of service, the delivery of their content and their use of the platform. Online profiles are completed by all consumers and businesses reflecting the essential "who I am" and "what I want" (WIA/WIW) qualities defined in the previously disclosed MMx patent application. They next enter into service agreements which define the responsibilities and limitations of each party, establish fees and costs and the range of potential earnings for each user type and variation. These steps are indicated at 806 for the Driving Population and at 808 for Fleet users. These are then brought together at 840 where Owner/Operator Profiles (which define user interests, wants, needs, and experiences together with their demographic and psychographic data, provided in non-identifiable formats which include no personal information) are approved and encoded to allow marketers to correlate specific types of hyper-relevant advertising content with specific combinations of user codes.

The next step, at 842, is the Review and Approval of Owner/Operator developed content. After content is approved, it is passed through the system for delivery encoding (described below). Once contract accounts are established, they are routinely processed at 854, Automatic Content Monitoring, where they are automatically monitored for consumer-requested changes, compliance, and consistency, all by computers programmed to also isolate and provide alerts for content nonconformance or contract violations. This business unit 800 will ultimately be linked to the Compensation Unit 900 and to any Customer Service components for the enterprise.

The first stage encoding of content following approvals is to determine the time of delivery; this step is shown at 820 for Public Service and commercial Ad content and at 844 for the Driving Population and Fleet/Government use. Time encoding determines a specific time of day that content is to be released to any requesting or non-requesting moving or fixed objects. In nearly all cases, emergency or hazardous road condition alerts, detours, blockages, flooding, and the like will be granted a time release which corresponds to the time of the event or emergency. Emergencies, as we will soon learn, are generally always given a higher delivery priority over other types of content. For example, if there is a traffic accident at a certain intersection and a detour is necessary, the time requirement would extend from the time the accident is first reported to the traffic response section of the network until the accident has been cleared from the area. If congestion is caused instead by road work that occurs, from 7:30 AM to 3:15 PM on a daily basis, then that is the time encoding that specific alert will carry. Both of those examples have a delivery priority over commercial advertising in that immediate area and the graphic nature of the content itself would be pre-generated and stored on all moving object hard drives likely to be in areas that would need it.

The next step in encoding is for location, or venue, as shown at 822 and 846. Venue encoding is, of course, critical for any type of proximity advertising or location-based communications. These can be in the form of relatively tight coordinates, such as an intersection or a specific address, because it will most likely be GPS based, at least initially. It might also be specified as a broader area, for example, as several city blocks surrounding a specific location such as a stadium, mall, airport, or theme park.

The third method of encoding is priority encoding which is shown at 824 and 848. Again, emergencies are given top priorities over all other types of content delivery including paid priorities. An important type of priority is based of the payment of priority fees, essentially for a preferred delivery priority over other content in high value locations, or times of day, if not both.

The final encoding step is that of determining delivery fees based on the market value of specific times, places, and priorities that have been requested and scheduled. This step is shown at 828 and is not unlike establishing values that are attached to prime time television versus programming that airs during the middle of the day or middle of the night and varies due to the demographics and viewership at those times. There is no hard value for delivering a marketing message. It is worth something different to everyone. Therefore, any dollar figure is possible and that value is frequently established in a bid market.

The methods of delivering commercial advertising or public service content to the platform are more consistent and regulated than content such as consumer-generated personal content or small business content. A key step in determining the costs to consumer and fleet users, therefore, is in determining the actual methods of delivery to the active requested platforms, as is shown at 850. Such distributions would involve the Internet together with cable, satellite, or wireless and may vary widely with locations and available infrastructures. Once determined, however, content from all four basic user groups is uploaded at regular intervals at 830 and 852 to the various distribution infrastructures, represented at 832.

One vital function for the present invention, once it reaches a reasonable level of deployment, is the noninvasive, mass collection of content requests and deliveries by and from all moving objects in the field at all times of the day and night for any and all purposes. What this information represents, essentially, is any request for content by a moving object (with each moving object able to describe the precise nature, interests, experience and histories of its occupants based on WIA/WIW profiling) by location, by time of day, and by priority. This information is tracked through any other moving or fixed object which can store such a request for later uploading to the network and ultimately to the venture entity. However, all such information is collected in a non-identifiable, privacy-compliant format and, therefore, cannot by itself reveal any confidential or personal information on users of the platform. The actual tracking of physical movements could only be reconstructed by using computers to link all of the requests from a single moving object to all of the other objects or fixed locations it has communicated with, and thereby to create a venue based "contact map" comprised of time and place, optionally with any requests or response to such requests. This is information that is massively collected and valuable to many kinds of marketers and planners. However, such tracking would only be reconstructed on a specifically identifiable party and revealed by the venture entity under a lawful subpoena. The instructions for the general collection of mass data and its insertion for downloading by the platform are shown at 890.

At 880, all documented in-field requests, all logged content distributions (or attempted distributions) together with any in-field responses to content deliveries (such as driving to a specific retailer immediately after being alerted to a "discount sale" at that location) for a requesting (viewing) moving object, are cross-checked by computer with the corresponding delivering (viewed) moving object. Such data could further correlate the demographics and interests of drivers and participating passengers traveling on various roadways at various times of the day including the types of vehicles, travel ranges, points of origin and destination, route variations or detours, even in some cases documenting the reasons for such changes; in short, a rich new body of data relating to the daily movements of drivers throughout our rural and urban transportation systems and community infrastructures worldwide. This data is then confirmed with the Distribution entity 800 to be certain such data has in fact been distributed into the network and was active during those claimed viewing periods. These are important steps incorporated to prevent the generation of false delivery claims for compensation, the equivalent of "click fraud" found increasingly in the online advertising business. This two-way data transfer is indicated at 170, as is the forwarding of confirmed delivery information to the Compensation Unit 900.

The aggregate distribution of content is shown at 150 in FIG. 18B. Once content has been uploaded at 830 and 852 and its means of distribution has been selected via 832, content is distributed via the Internet (cable, DSL), satellite, or wireless networks, or combinations thereof, using electronic distribution infrastructures as indicated at 150 for receipt and distribution at a multiplicity of potential locations and environments. Included are: direct distribution to single family residences 860 and/or network access points (NAPs) in neighborhoods via the Internet, satellite or wireless networks such as WiMax; the same for residences but to condominiums, apartments, mall complexes or parking garages 862; direct distribution using the same infrastructures to office buildings, malls, retail stores and commercial, government or public service signage installations 864; direct broadcast to busses, trains, fleet commercial and/or public transit routes, airports, train terminals, docks and major roadways 870; direct broadcast to passenger vehicles on the highway via satellite, Internet NAPs or wireless such as WiMax, etc. 868; direct distribution to fleet vehicle parking or maintenance garages including emergency or temporary sites 866; direct to rural or remote locations such as outlaying towns or villages, rural highways, harbors, mountain, desert, beach or offshore locations 872; or other types of emerging and popular locations 874 where mobile proximity communications or commercial communications is desired or necessary.

The diagram in FIG. 18B further includes an antenna 151, which provides a wireless transmission point (a 2-way NAP or satellite downlink) for transmitting content, user codes and delivery instructions to other mobile or stationary antennas. A receiving antenna 172 is also present, typically found on moving objects or on stationary objects equipped with the present invention. Such antennas 172 not only receive content requests with user codes and delivery instructions, but also return encoded confirmations regarding the delivery of content by time and place along with accurate tracking information which bears on consumer engagement plus encoded data from a multiplicity of moving objects participating in the widespread collection of data on an ad hoc basis.

Figure 19:
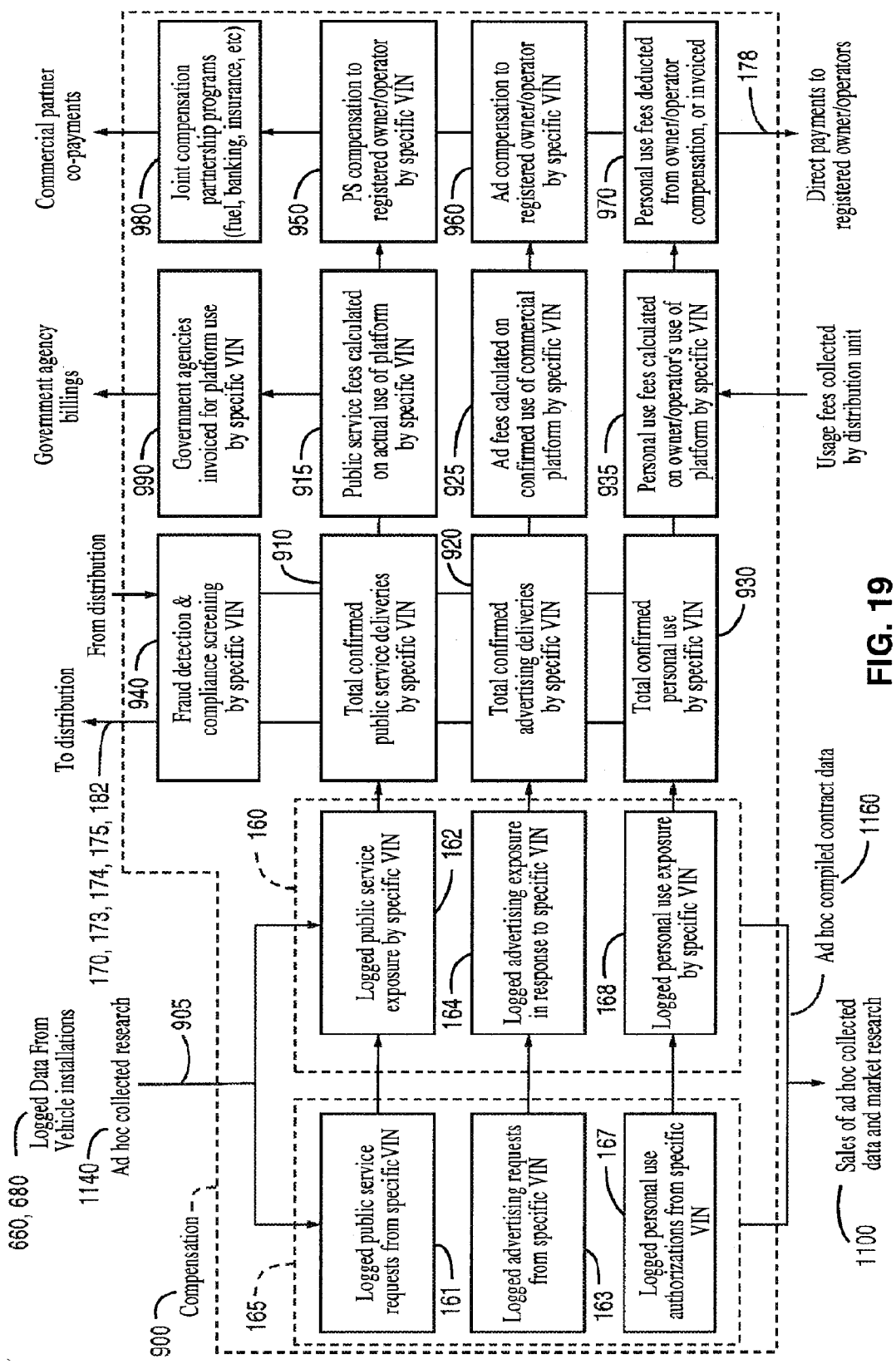
FIG. 19 is a block diagram depicting the Compensation model of the present invention.

FIG. 19 is a block diagram depicting the Compensation model of the present invention. As previously mentioned, the compensation functions have been separated here for clarity but would likely remain an integral part of the Distribution unit 800 or of the primary venture entity. Although this unit can include numerous variables, FIG. 19 suggests a basic and essential flow of information and revenue with which to enable compensation to be paid to platform users.

This flow begins with composite data downloads from all platform vehicles. Such inflow is referenced at 905 and represents, in this example, data downloads from the hard drives of New Production Vehicles 660 and from the hard drives of Pre-Existing Vehicles 680. Such downloads would also include composite data from the ad hoc collection of user codes communicated between authorized or programmed moving or fixed objects, indicated at 1140. As previously mentioned, the widespread collection of such data has been heretofore unavailable. Its uploading from moving objects to the Distribution unit is shown in FIG. 9 at 1160, and its sale to marketers and researchers is indicated at 1100.

While the inflow of raw in-field data may vary with vehicle types and delivery missions, incoming information will fall generally into two categories: Logged Content Requests from all vehicles (including Personal Use Authorizations from non-display vehicles) depicted here at 165, and all Logged Content Exposure (including completed or partially completed content deliveries) depicted here at 160. Within each of these categories, three content types are shown: For Logged Content Requests 165, there are Logged Public Service Requests from Specific VIN Numbers 161; Logged Advertising Requests from specific VIN numbers by venue and time 163; Logged Personal Use Authorizations from specific VIN numbers (including any view blocking or personal ads) 167; and for Logged Content Exposure 160, there are Logged Public Service Exposure 162; Logged Advertising Exposure 164; and Logged Personal Use Exposure or impressions by specific VIN, venue and times 168.

This information is next computer cross-checked laterally between categories. In other words, between the specific VINs involved, all documented Advertising Requests 163 are compared with all documented Advertising Exposures 164, thereby confirming both an in-field request and an exposure (an actual delivery) between these specific VINs, also verifiable by time and place. This comparative process is completed by computer and only when they are conclusively matched for each content type, are they encoded as being confirmed. Thus, at 910, all Public Service Deliveries are confirmed for a specific VIN; at 920, all Advertising Deliveries are confirmed for a specific VIN; and at 930, all Personal Use Deliveries are confirmed for a specific VIN.

The next step in this fully automated process is to determine that this content was actually released for distribution by the Distribution entity 800 at the times and with the proper encoding for it to have been requested and delivered in the field by the VINs in question based on their confirmed interactions. This means that the confirmed content collected at 910, 920 and 930 is routed to a Fraud Detection & Compliance Screening unit 940, where it is compared to the originally distributed data and content codes. This two-way cross-checking of all data is indicated in FIG. 9 at 170. At the same time, Confirmed Ad exposures vs. distributions are indicated at 173; confirmed Personal and Fleet/Government exposures vs. distributions are indicated at 174,175; and confirmed Public Use exposures vs. distributions are indicated at 182. Why is this cross-checking important?

Click Fraud

As previously mentioned, "click fraud" is a term given to a method of generating clicks (or apparent requests) for ads on the Internet in an effort falsely tally online "hits" and thereby show interest in those items—or responses to key word selections in search formats—in order to receive greater payments for those ads by reflecting increased apparent value, where, in fact, those ads have not actually been viewed at all. The present invention could be vulnerable to such fraud unless precautionary methods are implemented. Imagine, for example, a couple of teens using their own vehicles, each of which is equipped with the present invention. What would prevent them from parking those vehicles in a driveway for an extended period in which one vehicle was allowed to constantly request content and another vehicle constantly display the content in order to show confirmed viewings or "impressions" and to then be paid for these viewings? There are a number of ways to prevent such fraud—and still others will emerge once such technologies are deployed—but as in most businesses and systems, combating fraud and assuring security must be a sustained activity. Meanwhile, there are a few basic monitoring and preventative procedures offered by the invention itself.

First, it is anticipated that such fraud or misuse of the invention would, or could, be treated like many infractions of the laws when operating moving objects. Such infractions could be linked to a person's driver's license in such a way that if you were convicted of such fraud, your right to generate income using the system of the present invention could be revoked, just as your driver's license could be suspended. In terms of generating proof of infractions, certain inherent systems exist in the invention which could be used to defeat such misuse. For example historic patterns for the actual requesting and delivery of content will be established over time and will be recognizable by monitoring computers set up to do precisely that. The requesting and delivery of content is itself a source of checks and balances. Each request is linked to a specific VIN, thus a pattern of requests from each unique vehicle is established over time as the vehicles operates (time, place, routes, consistencies, etc.). The same is true for the vehicles receiving such requests. Over time a "normal" pattern of requests and responsive deliveries are stored on each vehicle's hard drive in the same way as cell phone calls to certain parties are documented and stored for later use in accounting and billing. Furthermore, each such request and responsive delivery is linked not only to the respective VINs involved, but to the registered owner of those VINs, and to authorized use profiles connected to that registered owner which are on file in that user's account. Thus any sustained misuse can be traced to a specific user as well as to any specific irregular pattern of misuse. Next the precise time and place of each request and each delivery is documented via GPS, along with exacting data as to the speed, the relative speed, proximity, attitude and direction of travel for the all of the vehicles involved. Also, of course, the consecutive number of similar requests and deliveries are carefully counted along with the duration of each delivery (since completed deliveries are important to the quality of service and to ultimate billings and compensation). There are also common methods of determining when drivers and passengers are actually inside a vehicle and which seats they are occupying as is used in seat belt and automotive safety systems. There are further methods which enable actual vehicle tracking over time. Thus, in the case of the teens, repetitive requests and deliveries between the same vehicles, which are apparently parked (regardless of their occupants), would place the event out of the normal "pattern envelope" and content deliveries could be subject to investigation and possible suspension. When such vehicles are moving there will be attentive drivers at the wheel and impressions made at progressive locations would likely be valid. Motion, speed, and proximity sensors within the system can further identify conditions during content deliveries. When time-linked to GPS information, specific time and place correlations can be made, and GPS tampering could be easily traced and documented. Indeed, tampering with linked GPS inputs with respect to a compensation system would probably be a Federal violation based on anticipated rulemaking for the present invention. It is conceivable that a pair of vehicles could follow each other at slow speeds and then stop, causing a number of content delivery events to occur over a prolonged period, but in fact such instances could also constitute legitimate content impressions or deliveries since their occupants must be attentive and viewing uniquely queued hyper-relevant content tailored to those drivers. GPS can also identify recognizable traffic patterns and relate them to specific environments, such as differentiating bumper-to-bumper traffic on a freeway or a surface street from a pair of vehicles parked in a residential neighborhood, or alone on a rural highway. Additionally, if required, the Distribution system can compare and confirm surrounding traffic patterns by electronically reading the movement patterns of adjacent traffic equipped with the present invention. Again, in terms of differentiating traffic patterns that would be generated over periods of use, any repetitive incidence of two or more vehicle VINs which consistently request and display content to each other would become suspect. It can also be assumed that any great lengths to falsify content requests and deliveries between vehicles is going to be far more trouble that it is worth, will compromise the rights of the registered owner and (short of tampering or hacking the electronics which are monitored and protected under alternative criteria) is likely to result in the actual exposure of content to the persons involved anyway. A further barrier against fraudulent claims of content delivery is by comparing all claimed matched requests and deliveries to the original content uploaded to the network for distribution. Such content always contains release codes which describe the nature, time, and place that the content is to be uploaded to vehicle hard drives and is therefore available in the network for deliveries. These codes and/or their content may be changed as many as several times per day, thus, if artificial content or content codes are fraudulently generated they could be identified, along with the vehicles transmitting them.

Upon final confirmation, distribution fees are calculated for each content category, by specific VIN. These are shown in FIG. 19 as Public Service fees 915; Advertising fees 925; and Personal Use fees 935. The relative values for various fees are discussed in a later section; however, Public Service fees 915 and Advertising fees 925 represent income for the platform owner/user, while Personal Use fees 935 usually represent a cost to the owner/user, because he is displaying his own content on his own VIN or is paying to have his own content displayed on other VINs in the platform network. In other words, the Personal Use fees 935 will, in most cases, be deducted from any revenue accumulated by that VIN for the display of Advertising or Public Service content to others.

Once fees are calculated, a designated billing unit can invoice and collect Usage Fees from all platform participants. This would include contract fees and bid rates charged to major brand advertisers or government users. Such fees can be routed from a collecting unit, in this case the Distribution unit 800, to the Compensation unit 900, for disbursement to participants. Government Agencies are billed at this stage for the delivery of any Public Service content by platform users and this is shown at 990.

With fees properly calculated and invoiced, each content segment can submit final totals and compensation can be sent to the Driving Population, Fleet/Government users, and all other participants who have allowed their personal property to be used in this novel advertising and communications platform. This step is shown at 950 for Public Service utilization, at 960 for Advertising use, and at 970 for Personal use or for any other User-generated content exposures. Again, payments for the display of user-generated content typically involves debiting one's own account for one's own use of his moving object against revenues that VIN may have earned. These direct payments to Registered Owners and Operators 1000, are indicated in FIG. 19 at path 178.

At 980 is a feature of the Compensation system which can allow co-payments, financial partnerships, or promotional sponsorships with entities such as automakers, banks, petroleum companies, insurance companies, and others. Any of these might offer promotions with incentives for the use of this unique advertising platform and these could eventually take many forms. For example, a petroleum company might offer free gas plus a premium for buying their brand instead of simply receiving ad dollars from the entity. This kind of co-compensation might apply to automotive insurance, credit cards, or to even to the automakers themselves. A manufacturer might, for example, integrate the present invention first into its offerings of what are sure to be more costly alternate-energy vehicles, and then rely on their revenue-generating potential to offset their higher acquisition costs for consumers. Thus, the present invention, appropriately integrated into fuel-efficient vehicle planning and production would actually stimulate the earlier adoption of such advanced or more costly products.

Figure 20:
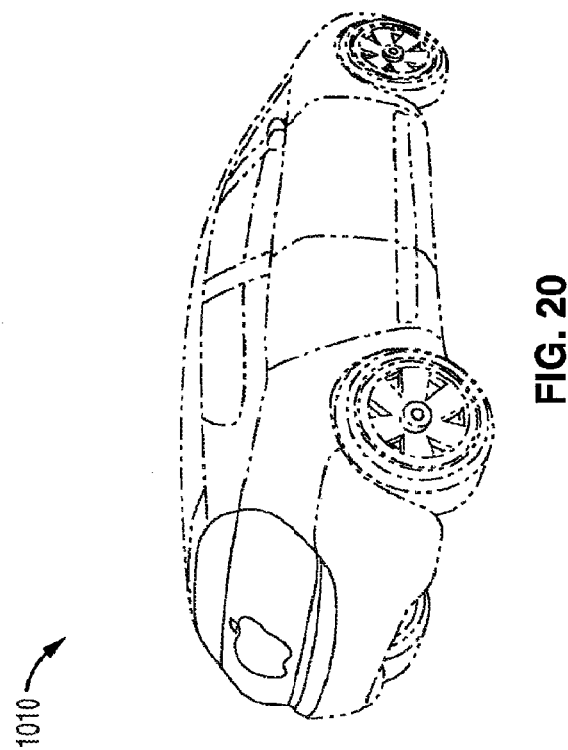
Figure 24:
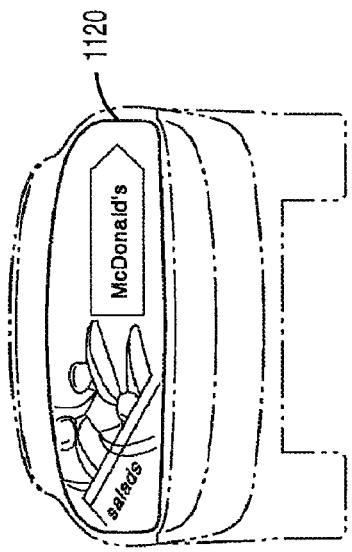
FIGS. 24-27 are illustrations showing four different types of content display.
Figure 25:
Figure 26:
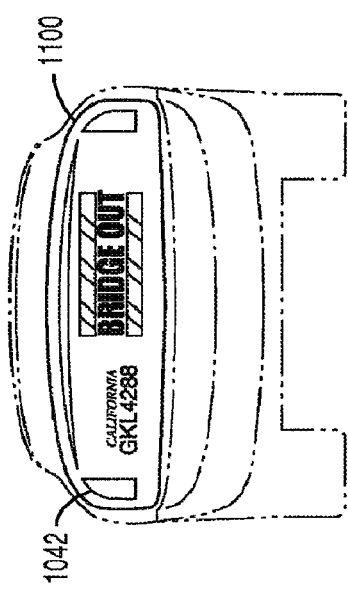
Figure 27:
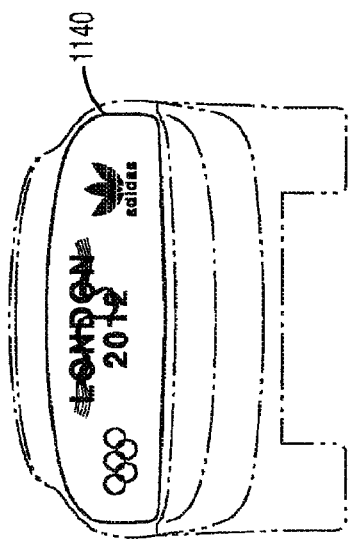

FIGS. 20-23 are illustrations showing a land-based vehicle with three examples of displays based on modes of operation and their relationships to the environment and to other moving or fixed objects. Although there will be numerous methods for integrating displays FIG. 20 depicts a typical 4-door passenger car 1010 of the anticipated period having a digital rear end and a contemporary, low-profile one-box design. Its relatively elevated rear hatch puts the digital display well above its rear bumper impact zone, in excellent line of sight for the occupants of most following (viewing) moving objects. In this example, the overall surfaces and default color of the vehicle's contoured OLED video display blends well with its inherent design lines.

Figure 21:
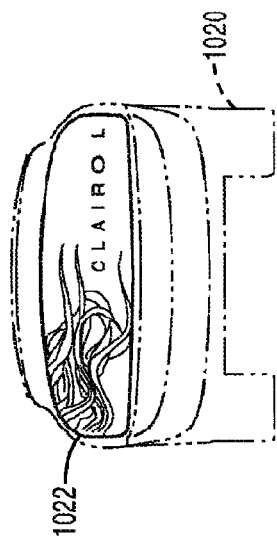
FIGS. 20-23 are illustrations showing a land-based vehicle and three basic types of displays.
Figure 22:
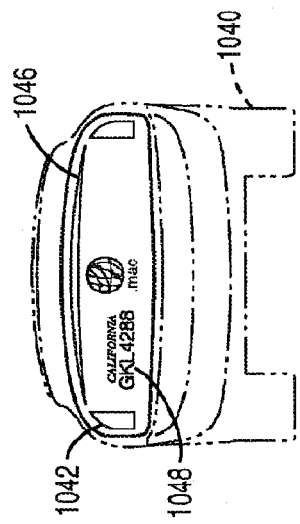
Figure 23:
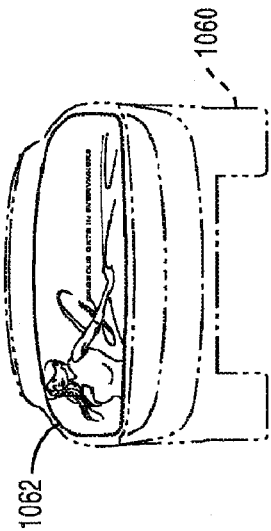

FIGS. 21-23 depict three different kinds of displays. Although there are numerous possible kinds of displays, steady-state vehicle 1020 in FIG. 21 presents an image that might be seen when a vehicle is at speed, cruising in a steady state during daylight hours, in which there are few, if any, speed or maneuvering changes, as might occur on an open road or freeway. Such a display would be static and quite similar to the graphics seen on vehicles in traffic today. These images might be allowed to introduce minor animations, such as the hair waving in image 1022, or they might dissolve softly into other images, but only when the vehicles on which they are displayed are in stopped or near-stopped conditions. Standards and practices will be established for all such animations and image transitions. Even minor animations or changes will likely be precluded at speed since they could be distractive to the operators of vehicles nearby. Thus, displayed graphics using the present invention, as shown in FIG. 21, are not dissimilar at all to what is on the road today.

Transitional-state vehicle 1040 in FIG. 22 illustrates a condition characteristic of any vehicle that is making changes in speed or direction. All such changes-slowing, rapid braking, accelerating, turning, creeping slowly forward or backward-would cause nonessential imagery to quickly dissolve to be replaced by all federally mandated lighting and safety systems (assuming these become digital and not part of a traditional independent lighting system). Such digital lighting would include a pair of tail lights at optimum spacing with turn signals and brake lights 1042, a center-mount stop light 1046, plus backup lights and reflectors. If the license plate and registration systems are also generated via digital video, as shown at 1048, these too would instantly reappear during any vehicle speed or attitude changes unless federal or local requirements ultimately dictate their presence at all times. If commercial imagery of any kind is presented at such times, these would be minimal, non-animated and non-distractive, all very similar to the kinds of branding seen on automobiles today.

Stopped vehicle 1060 in FIG. 23 depicts a display on a vehicle that is fully stopped. When the speed sensor in a display (or viewed) vehicle indicates a non-moving condition, and its proximity sensor indicates a requesting vehicle or device within range (or even in the absence of such electronics requests), then that display vehicle is able to queue and present full motion, conventional, or hyper-relevant video imagery 1062. If the display vehicle should drift slowly forward, the full motion video imagery could, under most scenarios, dissolve and be replaced by the lighting, licensing and safety systems shown in FIG. 21. Rulemaking and resulting Federal Motor Vehicle Safety Standards (FMVSS) would be adopted after thorough consumer and safety testing to determine the speed and motion boundaries for full motion video animation, transitions and deliveries, and the appropriate start and cutoff timings based on the relative speeds and the movements of the other vehicles involved.

It is worth noting that at night or during periods of darkness or under potentially hazardous conditions, all lighting systems will be displayed. There are some genuine advantages to land vehicles having digital rear ends. One of these is graphics standardization for critical operations. The size and lateral separation of taillights combine to provide valuable cues to any vehicles following as to the range or distance to vehicles ahead. When taillights are of different sizes and have different lateral spacing, the effectiveness of these cues is diminished. The present invention allows for the widespread standardization of these important visual elements. It additionally allows for intercommunications between all vehicles having digital video body panels or glazing to display early warnings and even graduated warnings during slowing or stopping. In the event a vehicle leading a long lane of vehicles at speed begins to slow, then all vehicles could simultaneously receive a slowing alert via radio and that signal would introduce a uniform amber taillight alert that would shift gradually towards red as all vehicles slow at roughly the same rate. This feature alone could prevent the very common increasingly exaggerated stops as brake lights flash on without warning in a lane of traffic at speed.

FIGS. 24-27 are illustrations of four types of displayed content 1100 depicts an Emergency type display. Most of these will be in the Public Service category and would be stored and deployed by Federal, State or local governments. This would not preclude personal or consumer emergency buys however. Emergency graphics can be stored in all hard drives or can be uploaded to vehicles based on their locations and travel environments. Emergency content is typically embedded with instructions for distribution at precise times and under exacting conditions, usually triggered by local area wireless signals, GPS coordinates at precise time periods, or through vehicle to vehicle wireless transmissions. Note that emergency displays will cause all vehicle license and registration information to immediately reappear, assuming they are digitally represented. Emergency content transmissions will have higher priorities than all other types of content and would be triggered by a proximity to, or entry upon, a hazardous area often defined by GPS coordinates.

At 1120, a typical Proximity advertisement is shown. A consumer in a following vehicle might request such proximity content be displayed on nearby objects, or these might appear passively based on a proximity media buy. In an example to be later described, Proximity buys could be based on a time of day (e.g., meal time) and, most certainly, on a location (e.g., the city blocks surrounding a restaurant. Graphics might include animated signage, such as the right turn arrow depicted in Proximity illustration 1120. In the case of a drive-thru restaurant, graphics on a viewed vehicle immediately ahead in the drive-thru line could display a pictorial and even an animated menu in rich video imagery, along with current prices.

The present invention uses existing onboard GPS Navigational systems to deliver ads at precise locations determined by the advertiser or by the media buying agencies. By coupling specific content stored on board a vehicle's internal hard drive to specific geographical locations (e.g., a city block, an entire section of a city, or a length of rural highway), advertisers can target specific demographic groups by area and can call attention to specific products or services while drivers or consumers are close to them. This is called proximity advertising. The ability to advertise restaurants, promote special sales or points of interest, to capture spontaneous interest, or to inform those who may be unfamiliar with an area is powerful and much sought after in the world of marketing. In practice, the desired GPS coordinates are coupled with the ad content at the time of upload. When a vehicle's GPS system later indicates travel within those specific boundaries, then those ads are either queued or are given priority over other content.

At 1140 is an example of Sponsorship content. For example, a convention promoter or exhibitor could purchase time or content for the city streets and freeways surrounding a convention center. As vehicles equipped with the present invention approach sponsored venues, such as theme parks, sports stadiums, national parks, or airports, content representing those sponsors could appear on all of the objects moving in and around that immediate area.

Another common form of sponsorship is likely to be where marketers, entities, or individuals purchase time and space on the surfaces of moving objects as a free courtesy or a service enhancement for viewing parties. Imagine two vehicles equipped with the present invention stopped one behind the other at a traffic signal in which the vehicle behind is able to view the external display surfaces on the vehicle ahead. Assume the viewing vehicle is at that moment tuned to a radio station, using an onboard entertainment system, or listening to a portable handheld device such as a future iPod, satellite portable, MMx, or phone. When such equipment in or around a viewing vehicle is equipped with a means to wirelessly broadcast an encoded signal describing the content it is currently using, then a vehicle ahead is able to enhance that use by introducing visual content synchronized to a consumer's current audio environment. In other words, if the occupants of a viewing vehicle are listening to a satellite radio station that is playing specific music, that music code (or the content itself) could be transmitted forward to the viewed vehicle, and the display of that vehicle could then present video material which is both related to and is synchronized with the audio content being received or consumed in the viewing vehicle. The logo or the tag lines of the sponsor offering such free entertainment or marketing enhancement would of course be displayed somewhere on the video display within the line of sight of the viewing vehicle. Naturally, these commercial sponsorships could be turned off or locked-out by any properly equipped viewing vehicle or any compatible portable device within range.

At 1160 is an example of a Personal media content placement. Such media can be generated by consumers or professionals and can be uploaded by users themselves. If personal ads are placed on other vehicles, they will pay the going media rate for the anticipated location, time of day for the number of impressions. If such content is placed on an owner's own vehicle, then that cost would be deducted from revenues earned from the display of content for others.

It is worth noting that a major application of the present invention will be that of displaying commercial advertising in large indoor and outdoor parking lots and structures by using the rear surfaces of parked cars. In this way, consumers can even earn revenue while they are shopping, by presenting commercial advertising to passing motorists who are looking for parking places or to pedestrians on foot who are walking past rows of parked cars on their way to the retail spaces. This proximity application alone will be of significant value to the parking spaces surrounding retail stores. Imagine the large number of vehicles parked in spaces near a major mall anchor such as a Nordstrom's or a major brand restaurant or theater chain that could display specials or show film trailers to families passing on their way from the lot into the mall. Proximity sensors on board each vehicle could activate such ads as pedestrians approached and passed behind them. These displays can also easily be targeted by proximity, venue, or time of day, and when consumers further carry handheld MMx units which broadcast a consumer's "who I am" or "what I want" encoded preferences, then parked moving objects are able to display hyper-relevant content to those pedestrians.

EXAMPLE 1

Figure 28:
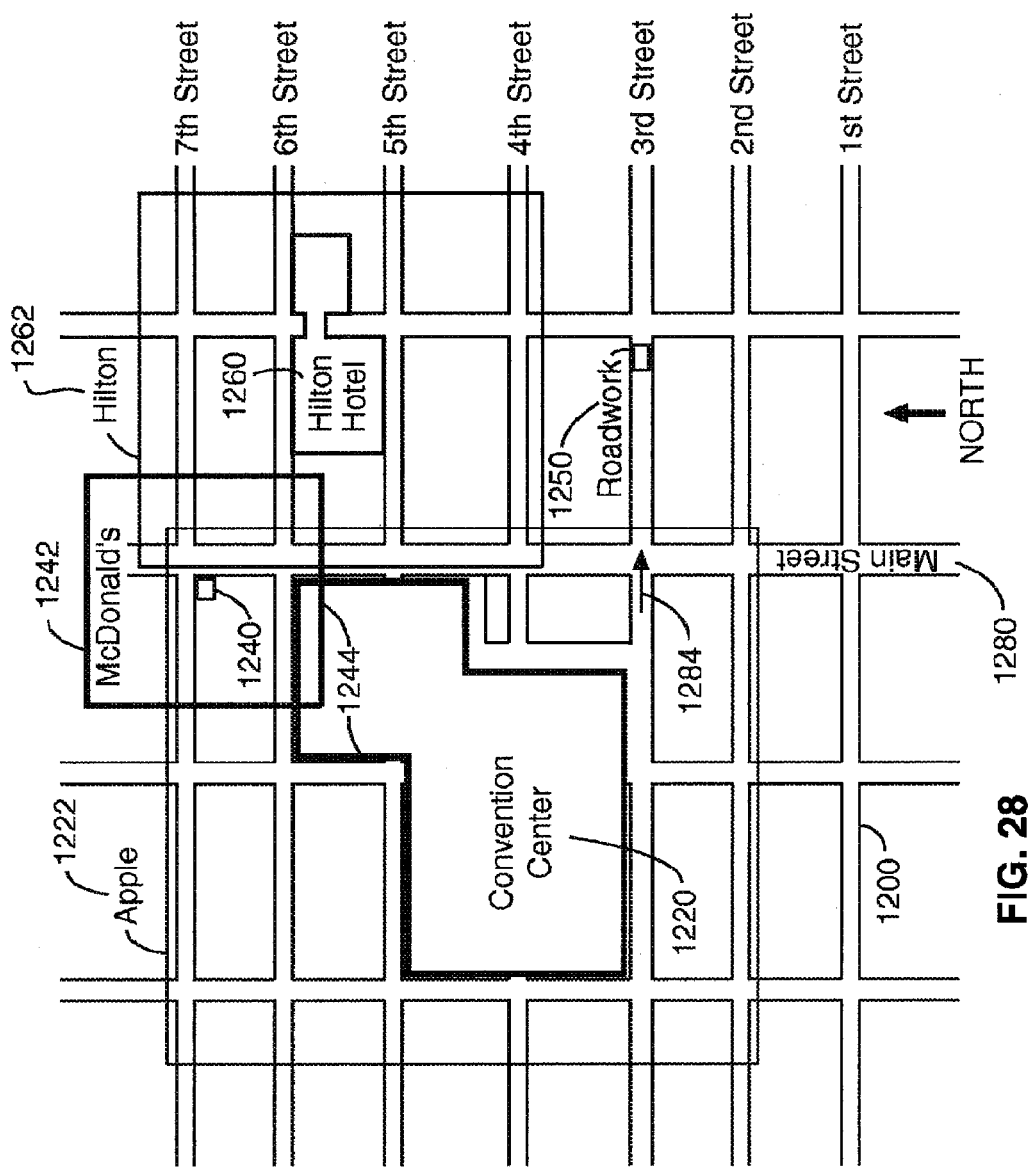
FIG. 28 is a diagram showing geo-specific content distribution.

FIG. 28 is a diagram showing geo-specific content distribution. It depicts several city blocks with in a representative downtown area. Main Street is shown at 1280 and 1st street at 1200. The Convention Center is located at 1220. A McDonald's Drive-thru is shown at 1240, and a Hilton Hotel is shown at 1260. 3rd Street is a one-way street, as indicated by the arrow at 1284, and temporary road work is shown at 1250. In terms of content media buys, Apple Computer has purchased the several square block area surrounding the Convention Center, but only during visitation hours for the electronics show. This area is indicated at 1222. McDonald's restaurant, 1240, has a renewable lease for the city block area immediately surrounding its restaurant and the boundaries for this media area is indicated at 1242. However, McDonald's has also purchased media rights to the subsurface parking garage for the convention center on a 24/7 basis, such additional space being represented at 1244. Hilton Hotels, meanwhile, has leased the areas surrounding its hotel but has also negotiated exclusive rights to traffic flowing along Main Street a half block from the Hotel. Each of these areas has boundaries defined by GPS coordinates and each has an individual priority for content deliveries based on the time of day. The fees for such areas and their relative priorities are established by the anticipated level of exposure—typically based on the number of targeted impressions they can deliver at any given time—in the same way as outdoor billboard advertising is valued. Specific content purchases are described in FIG. 29. In FIG. 30, we will take a drive North on Main Street to experience the kinds of content that will be seen by four different types of users during their travels.

Figure 29:
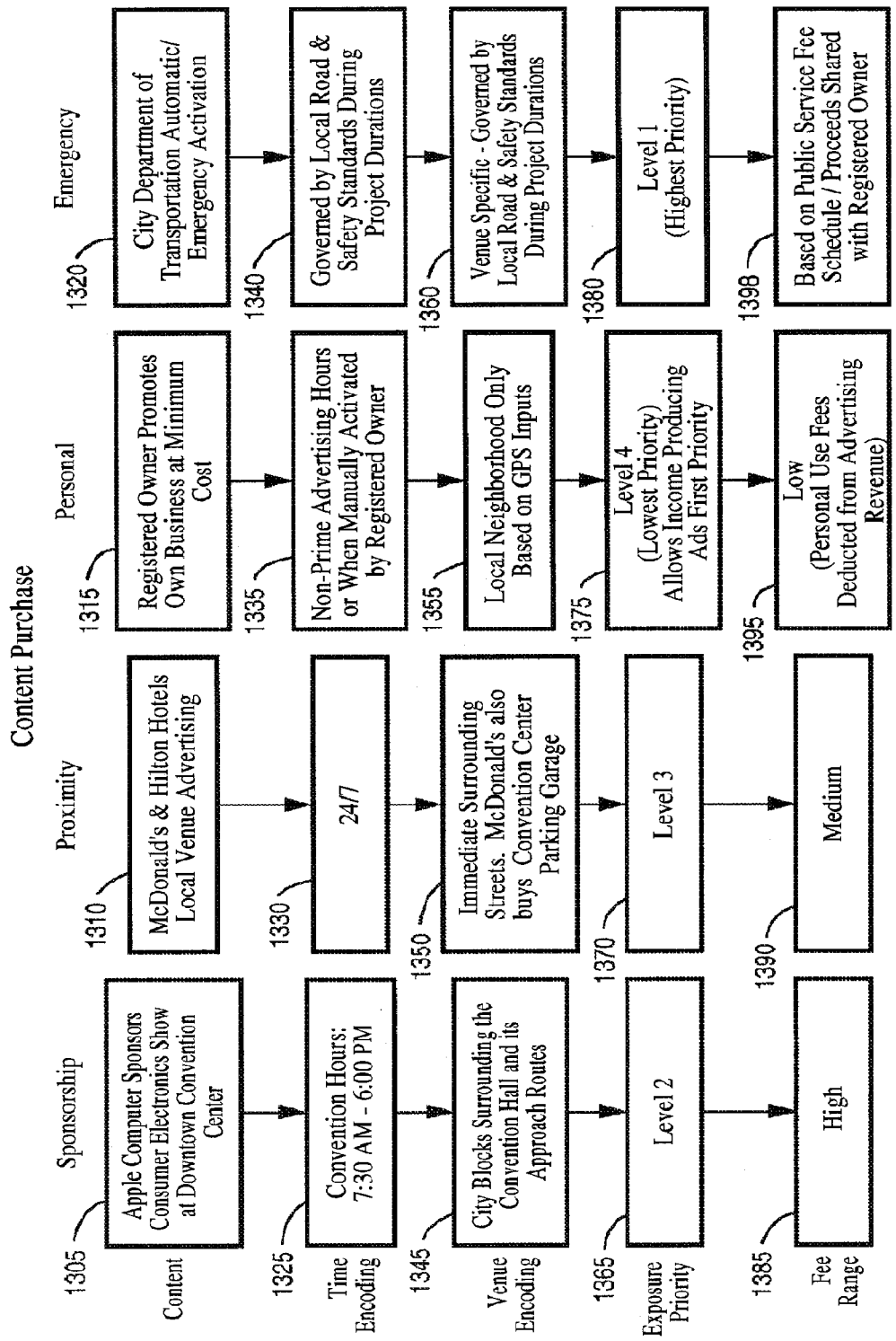
FIG. 29 is a diagram showing content purchase and encoding by content type.
Figure 30:
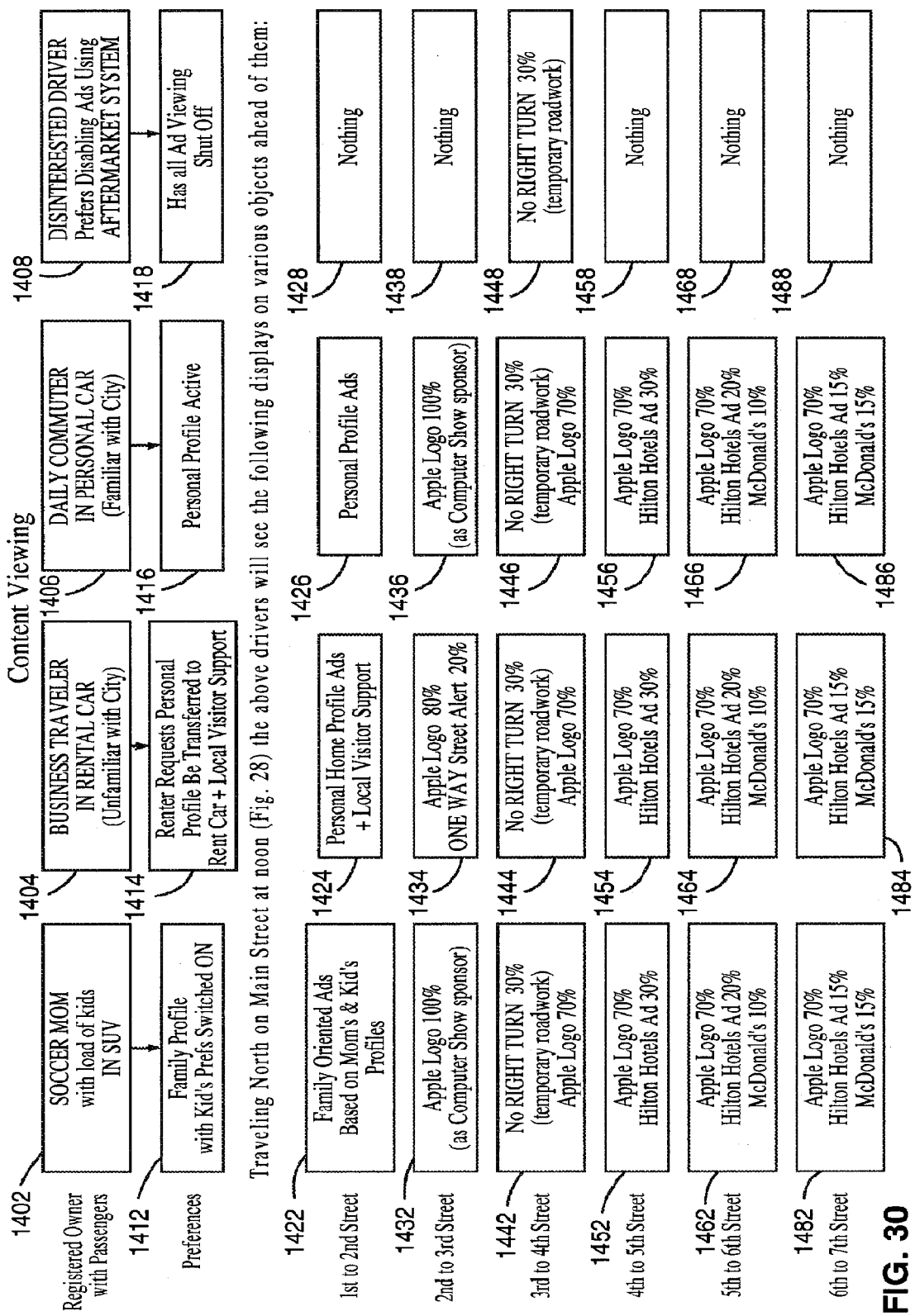
FIG. 30 is a diagram showing content viewing based on FIG. 28.

FIG. 29 is a diagram showing content purchase and encoding by content type. Across the top are the Column headings of Sponsorship, Proximity, Personal, and Emergency, representing the four content categories discussed in FIGS. 24-27. On the left side, from top to bottom, are the headings of Content, Time Encoding, Venue Encoding, Exposure priority, and Fee range. Together, these represent the kinds of media buys described in FIG. 28.

Reading from top to bottom in the Sponsorship column, at 1305, we see Apple's purchase of the Consumer Electronics Show at the Downtown Convention Center. At 1325, we see that Apple has purchased the prime time hours when the Convention Center is open, from 7:30 AM to 6:00 PM during the run of the electronics show. At 1345, we also note that Apple has purchased the several square block area surrounding the Convention Center which includes all of the approach routes to entry and parking. The Exposure Priority assigned for Apple's sponsorship (the preference with which Apple's promotion is given over other types of content) is shown at 1365 as Level 2, with Level 1 being highest. Finally, the Fee Range, at 1385, is "High", based on the show and on the high value business traffic at this venue.

The Proximity content column at 1310 reflects McDonald's and Hilton Hotel's Local Venue advertising buys. Both companies, at 1330, have selected media purchases on a round-the-clock or 24/7 basis. 1350 indicates McDonald's buy of the streets immediately surrounding its restaurant but, as shown in FIG. 28, also includes the entire Convention Center underground parking garage in an effort to attract hungry convention goers. 1370 indicates a Level 3 priority (from a total of four), meaning that Apple's sponsorship at Level 2 would take priority if there were a conflict in time and place. Finally, based on McDonald's and Hilton's annual deals for Proximity advertising, they have negotiated costs in a Medium fee range, shown at 1390.

Under Personal Content at 1315, we find a Registered Owner who wants to Promote his own business at minimal cost. An example of such content would be the Dog Walking business shown at 1160 in FIG. 27. In order to keep costs down, yet hit his target market, this person has chosen Non-Prime Advertising hours at 1335, so that during these periods he can continue to generate revenue by displaying brand advertising for big companies, but he has also selected an option which lets him manually override his own schedule to present his own or other personal ads whenever he chooses. Also, because his business operates in a localized area and involves such a personalized service, at 1355 this owner had selected his immediate neighborhood based on GPS inputs. In other words, when he ventures further from home he can earn money through the display of major brand advertising, but as soon as he re-enters his home neighborhood, his Personal or Business ads will queue up and promote his local enterprise. At 1375, we see this has resulted in the lowest Exposure Priority for his own content, allowing him to first optimize income producing content. His fees for Personal content will therefore be among the lowest available, and will simply be deducted from his monthly ad revenue, as indicated at 1395.

In the last column, Emergency, we see at 1320 that the City Department of Transportation has requested a Public Service placement, and has designated it for automatic activation. This means the network will cause the requested content to automatically appear on the displays of all moving or fixed objects equipped with the present invention operating within the specified venue in accordance with local laws and time/place specifications. At 1340 and 1360, we see that both Time Encoding and Venue Encoding will be governed by Local Road, Highway and Safety Standards During Project Durations. This simply means that "alert" or "emergency" content will be posted at the times and places where they are required. Since many of these media postings are Emergency alerts that may bear on transportation or highway safety, they are granted the highest priority, Level 1, shown at 1380. Fees for such media are typically borne by public funds or taxpayer dollars. However, if Government agencies are using privately-owned assets to deliver its messages, the proceeds for any such Public Service media buys will be shared with the registered owners of those assets, as indicated at 1398.

FIG. 30 is a diagram showing Content Viewing referencing information from FIGS. 24-29. In FIGS. 24-27, we learned four basic types of content. In FIG. 28, we saw how certain content could be displayed selectively based on its proximity to people, places and things, and in FIG. 29, we learned about content priorities, encoding, and fees. FIG. 30 now brings all of these together to demonstrate what four different vehicle drivers (each expressing individual interests and needs) would see on the various fixed or moving objects around them that are able to communicate with the present invention as they move north on Main Street, as shown in FIG. 28, at 12:00 noon.

Across the top of FIG. 30, four different driver types are represented: at 1402 is a Soccer Mom driving an SUV with a load of kids; at 1404 is a Business Traveler who is unfamiliar with the city and is driving a rental car; at 1406 is a local Daily Commuter (who is quite familiar with the city) driving in his personal car; and at 1408, we have a disinterested driver who is using a car equipped with an aftermarket system (as described in FIG. 17 at 680) to disable advertising on the various moving objects within his point of view.

The second row indicates the preference settings each of these drivers has assigned to his particular vehicle that are currently switched on. The soccer mom at 1412 has a Family Profile engaged in her SUV with her kid's preferences also active. At 1414, the business traveler has asked his car rental company to transfer his preferences from his personal car to the rental car and has further requested the rental agency to add its local visitor support program, which will guide him through the city based on his personal interests. The business commuter, at 1416, has his normal personal profile active. The disinterested driver has all of his ad viewing preferences shut off, as indicated at 1418. So, when driving north on Main Street at noon, each of these drivers, along with any occupants on board, is likely to see the following kinds of content in front of or around them on surrounding displays equipped with the present invention:

From 1st Street to 2nd Street, mom in her SUV will see family oriented ads derived from her own interests, mixed with the interests of her children (since their profiles have been so adjusted), as shown at 1422. At 1424, the business visitor in town will see ads and content based his own WIA/WIW profile interests, except that any proximity-based interests will reflect his current location. In other words, if one of his preferences has been set for fine Jamaican dining in his home town of Chicago, he will now be alerted to the presence of nearby Jamaican restaurants in this current location (e.g., Los Angeles), especially here at lunch time. Because our visitor has asked the rental company to add its Local Visitor Support package at 1424, he will be also shown a variety of local interests in his new travel area. If he is more interested in certain kinds of fishing or boating, than he is interested in, for example, museums, a much larger emphasis will be placed on these points of interest. At 1426, our local business commuter will be presented with content corresponding to his personal profiles that are switched on. Finally, at 1428, the disinterested driver will see nothing displayed on the objects in front of his vehicle as he moves between 1st and 2nd Streets.

Between 2nd and 3rd Street, our northbound drivers will enter the first and largest zone for a proximity media buy, the one purchased by Apple Computer at the Convention Center. Here, our mom with her kids at 1432, our business traveler at 1434, and our local commuter at 1436, will all see Apple's sponsorship imagery on the various objects around them; however, because our rental car visitor has requested local visitor support, he will also see, at 1434, a One Way Traffic Alert which will result in an absolute display priority during the last 20% of travel as our visiting driver approaches the intersection. At 1438, our disinterested driver continues to see nothing displayed on the vehicles or fixed signage around him.

Between 3rd Street and 4th Street, mom and kids at 1442, the rental car driver at 1444, the local commuter at 1446, and even the disinterested driver at 1448, will all see a "NO RIGHT TURN" alert as they approach the intersection calling attention to a temporary roadwork and closure condition during the present hour. All vehicles will receive an alert since these have the highest priority and involve issues of traffic safety. As vehicles near the intersection, this alert overrides even Apple's high cost promotion and the disinterested driver's preferences at 1448 to not view commercial content. Apple's exposure during this hour will drop to approximately 70% of the driving time between these parallel streets. Such road hazard information would be regulated by the local area city and traffic signage infrastructure.

From 4th Street to 5th Street, mom at 1452, our rental car visitor at 1454, and our daily commuter at 1456 will see, presented on the objects before and/or around them, both the Apple promotion and Hilton Hotel's proximity ads. Apple's logos will be seen approximately 70% of the time between 4th and 5th along Main Street, and Hilton's ad will be seen about 30% of the time, due to Apple's premium fee paid for the temporary Convention Center sponsorship. Between 4th and 5th, our disinterested driver at 1458 returns to being presented with no commercial content, in accordance with his pre-established preferences.

Between 5th Street and 6th Street, mother and kids at 1462, the rental car user at 1464, and our daily commuter at 1466 will all be presented with essentially the same levels of paid content: Apple at 70% (due to the premium fee), Hilton Hotel's ads at 20% of the linear block, and McDonald's at 10% of the linear block, due to the surrounding surface street proximity area purchases which they have leased from the network. Between these streets, however, our disinterested driver at 1468, in the absence of any further road or traffic safety alerts, sees nothing displayed for his benefit.

In the final stretch between 6th Street and 7th Streets, our disinterested driver continues to have no commercial content displayed, as shown at 1488. However, our soccer mom with her kids at 1482, our rental car driver at 1484, and our daily commuter at 1486 will all continue to view ads based on their previously scheduled proximity media buys and their content delivery instructions. The result is the following approximate split in content display: Apple Computer at 70% (for its premium fee), with the balance split equally between McDonald's and the Hilton (15% each), depending on linear area traveled over time. It is important to note that after 6:00 PM, when the Computer Show closes at the Convention Center, the traffic between 2nd Street and 7th Streets will no longer be shared with Apple (since the company has purchased time only during show hours). This time will now be divided between McDonald's and Hilton Hotels based on areas 1242 (for McDonald's) and 1262 (for Hilton), as shown in FIG. 28. In the remaining areas along Main Street which are not defined by the proximity content purchases shown in FIG. 28, presentations will be based upon the active personal "Who I Am"/"What I Want" personal profiles or on preferences stored on board each vehicle, which have also been activated by their owners (or system administrators).

Figure 31:
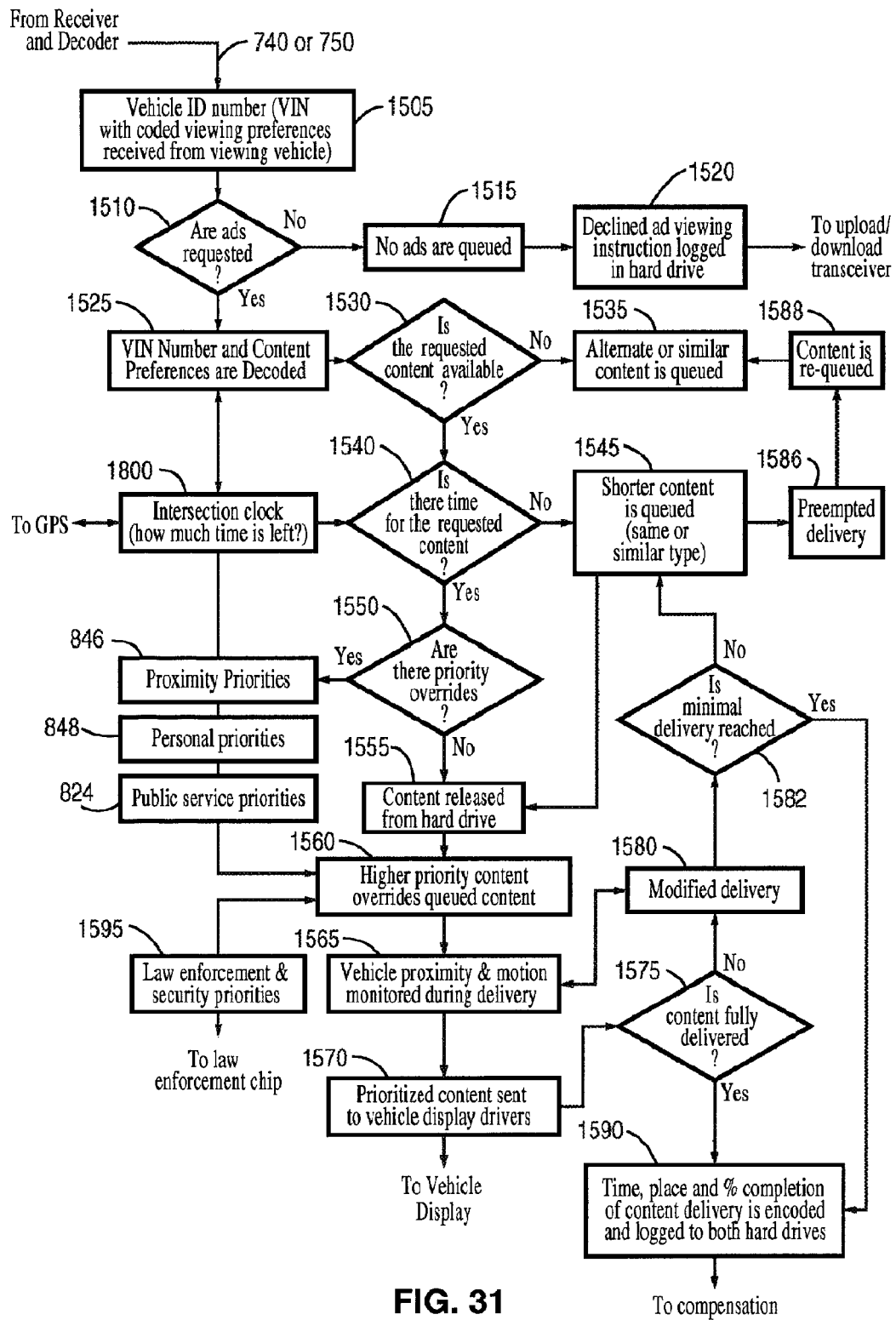
FIG. 31 is a block diagram showing content protocols and queuing in a viewed vehicle.

FIG. 31 is a block diagram showing a possible content delivery protocol between moving objects. Such a sequence typically begins at 740/750 with a local wireless signal from another moving object or from a portable, mobile hand-held device containing data and a means to transmit a combination of VIN numbers, profiles, user codes, or content requests. Such signals are received at receiver 744 and are decoded at 746. This information is then processed aboard a receiving (or viewed) vehicle, or a moving or a fixed object, as indicated at 1505. Once received, an initial question is asked at 1510: Are ads rejected? If the answer is YES, no ads are queued, as indicated at 1515, and subsequently, at 1520, the declined ad viewing instruction is logged on the hard drives of both the requesting (transmitting) and the displaying (receiving) moving objects. Eventually, this declined data delivery is uploaded to the network along with information on VIN, time, place, and demographics via transceiver 714.

If, at 1510, the answer is NO, then the preferences associated with that VIN are decoded at 1525. At 1530, a second question is asked: Is the requested content available? If the answer is affirmative, another question/decision follows at 1540: Is there time for the requested content? Input for this decision comes from the Intersection Clock 1800, which is explained in more detail in FIG. 35. The Intersection Clock 1800 is an independent database that is linked to a moving object's GPS (geo-location or navigational) system 755, which, over time, records and learns event delay performance at precise locations, primarily at traffic lights, bridge or railroad crossings, freeway on ramps, and throughout urban or rural environments that experience heavy stop-and-go traffic. This database is linked to a short range wireless transceiver system capable of synchronizing its current database with signals from other moving objects (those equipped with the present invention) which may have arrived at the intersection earlier, and then lock onto the ongoing traffic signal sequencing at that location. Based on this information, the Intersection Clock 1800 can determine how much time remains for the display of content before stopped traffic starts to move again.

If, at 1540, adequate time remains to display the requested content, then at 1550, the system determines if there are any priority overrides to deal with. Such overrides can come from multiple sources. Block diagram elements 846, 848, and 824 represent Proximity Priorities, Personal Priorities and Public Service Priorities, respectively. These priority assignments are typically embedded with their content as release instructions and are triggered by time, place, or hierarchy as discussed in FIGS. 29 and 30. Another kind of priority override is shown at 1595. Law Enforcement and Security Priorities can be triggered from outside the system as opposed to using a preprogrammed internal protocol. The law enforcement chip at 748 is an example of a trigger which provides for the override of moving object displays by members of law enforcement in the interests of public safety. Imagine, for example, that a missing child is reported in a specific area of the city. It would be possible in only minutes to distribute a photograph of that missing child and to reproduce that image on the display panels of all equipped vehicles within several square miles of where that child was last seen. In another example, it would be possible to place "WARNING STOP WAIT" graphics on vehicle displays in the event that Emergency Vehicles are approaching the intersection.

If priority overrides are embedded in the content, these are revealed at 1550, and content is displayed accordingly. If there are no priorities, then at 1555 content is released from the on board storage hard drive. Priority monitoring is an ongoing and constant real time process as indicated at 1560. If delivery conditions change, content queuing or display can be instantly suspended or even substituted with other content. One of the most critical steps in monitoring content deliveries is to confirm vehicle relative speeds and proximities in real time. This step is shown at 1565. When all pre-established delivery criteria has been met between a requesting and a presenting vehicle, prioritized content is sent to the presenting vehicle's display drivers, as shown at 1570, then on to its video display 760. If, during display, delivery changes are detected at 1565, it may be necessary to suspend or modify the delivery of content. For example, a presenting vehicle creeps slightly ahead in traffic, altering the viewing angle and range, and, more importantly, introducing a need for the operator of a viewing vehicle to focus on maneuvering his vehicle forward in a stop and go traffic lane. It becomes immediately critical to suspend any content delivery that could compromise the maneuvering process and to reveal all vehicle visual lighting and safety systems. An essential purpose of the present invention is to maintain, at a minimum, the safe operating conditions which exist today between moving objects and their operators. For this reason, it is anticipated that video impressions would occur only when vehicles are static, parked, or moving only within minimal acceptable limits. Thus, at 1580, any changes beyond established norms will modify content delivery.

Once content has been sent to the display drivers, the extent of the delivery will be confirmed at 1575. If the queued content has been totally delivered, then the time, place, and percentage of that delivery will be encoded and logged onto the hard drives of both the requesting and the presenting vehicles, as indicated at 1590. This is an important confirmation step as it reveals to marketers and to the distribution network that the intended content was indeed delivered as requested and that platform owners and operators can now be properly compensated by the Compensation unit 900. Although it is not reflected in FIG. 31, content delivery, as previously discussed, includes the transmission of either audio codes or content, so that the audio portions of video content can be reproduced over the sound systems of viewing or requesting vehicles and devices. Deliveries can therefore be confirmed on several levels, the four most common being: (1) Content was NOT viewed (content requests were shut off or content was rejected); (2) Content was viewed only (requested content was displayed but sound was shut off); (3) Content was both viewed and heard (both systems functioned fully during delivery); and (4) Content caused viewer to specifically respond after such viewing (meaning that a receiving party might have driven to a specific location, requested more information on a product, or made a purchase within a specified period).

If the delivery of content is modified for any reason at 1580, then it is determined at 1582 whether minimal delivery requirements have been met to constitute an actual delivery. This is generally interpreted by the amount of content exposed to the viewer. If minimal exposure was met at 1582, then this will be logged as a percentage delivery at 1590. If minimal exposure was not met, then shorter content of a similar type can be queued (as indicated at 1545), or the delivery can simply be preempted as shown at 1586 and re-queued in its entirely at 1588.

If, at 1530, it is determined that requested content is unavailable (meaning, possibly that a hard drive may not have been recently updated from the network), then, at 1535, alternate, similar, or generic content is queued. If it is determined at 1540 that there is insufficient time to display 100% of the requested content (e.g., a 30 second spot), then, at 1545, a shorter commercial spot of the same or similar content can be substituted. Once such revised content is queued at 1535 or 1545, it is released from the hard drive, as indicated at 1555.

Figure 32:
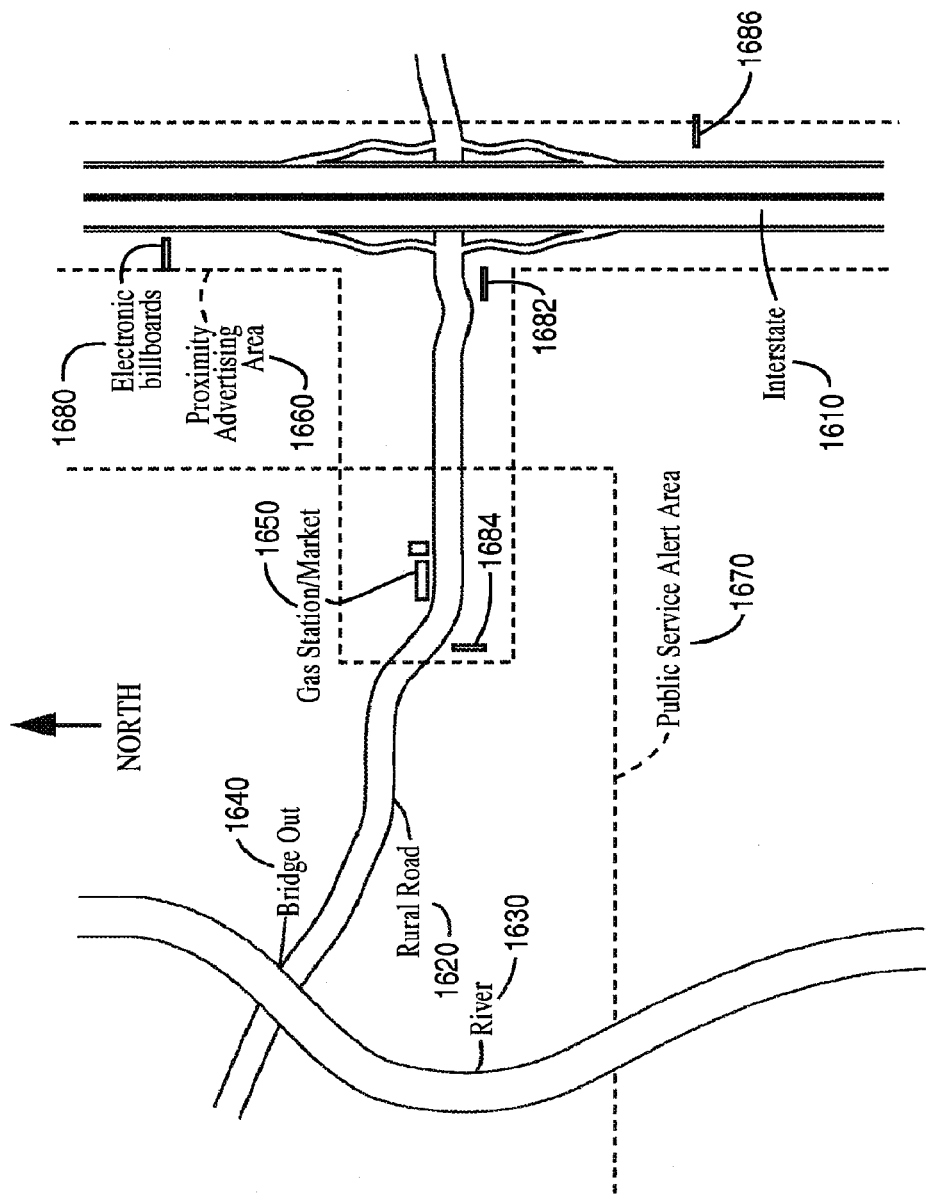
FIG. 32 is an illustration showing geo-specific content distribution in a rural area.

FIG. 32 is a diagram illustrating geo-specific content distribution in a rural area. The map shows an Interstate Highway 1610 passing north/south through a rural countryside. A rural road is shown at 1620, a river at 1630 and a bridge-out condition at 1640. Several hundred feet from the highway is a Gas Station/Market at 1650. A rectangular boundary is indicated around the Gas Station/Market area. This area defines a proximity advertising area 1660 within which specific commercial or public service messages can be delivered. Another boundary is indicated at 1670. This rectangular area defines the bridge-out warning alert area and is referred to as a Public Service Alert Area. Finally, four electronic billboard installations are represented at 1680, 1682, 1684 and 1686.

When stop and go congestion exists on the interstate, then moving objects equipped with the present invention can use other objects immediately in their paths to display commercial or public service content. It is generally anticipated that non-animated graphics (e.g., signage announcing an upcoming gas station or market stop ahead) could be placed on nearby moving objects at speed since they would be no more distractive than other types of graphics which exist today on moving objects and would, in fact, be easier to read since they are moving with the viewer at traffic speeds, as opposed to passing quickly by at roadside. However, in the absence of traffic equipped with the present invention, electronic content would have to be placed on other kinds of display surfaces, such as the billboards indicated at 1680. The difference between standard electronic billboards and those equipped with the present invention is that those equipped according to the present invention able to receive and interpret aggregated requests for commercial, personal, or public service content and then display such content to the occupants of passing vehicles.

For example, southbound traffic on Interstate 1610 will transmit advance wireless signals (each representing VINs, profiles, and user codes with content requests) to the billboards depicted at 1680. When a vehicle approaches such a billboard, the billboard has already polled its internal storage (see FIG. 31), and will queue and display content requested by that VIN as it approaches. In this way, even single or lone vehicles using the present invention can function independently within the environment by causing highly appropriate or hyper-relevant content to appear on many types of surrounding surfaces. Imagine fuel is nearing empty on that southbound vehicle. Such a "low fuel" condition can be interpreted through the vehicle interface 730 and, once coordinated with GPS data regarding the location of the service station, can encode and broadcast a radio signal 740 via transmitter 742 to enable nearby billboards to display information on the proximity of available fueling stops. While it is true that such information could be presented on displays inside a vehicle, other types of content are better suited for showing externally on electronic billboards. For example, billboard 1680 could reveal the presence of Gas Station/Market 1650, which might otherwise be obscured from direct view of Interstate traffic. Billboard 1682 could further indicate directions to the Gas Station/Market and might feature other products and services based on the preferences and interests of the occupants of any approaching VINs. Westbound traffic on Rural Road 1620 would be exposed to electronic billboard 1694 before leaving the populated area defined by Proximity Advertising Area 1660. Normally, billboard 1694 would carry content relating to features along the road or would respond to content requests. However, in this example showing a proximity Public Service Alert area, 1670, such requested content for billboard 1684 would be overridden by the "bridge-out" alert until the condition is eliminated. Electronic billboards would have content uploaded to them using the Internet and a delivery means such as cable, wireless, or satellite. Again, embedded with the content for delivery can be specific instructions for the dissemination of that content. In the case of the "bridge-out" alert, these instructions would likely be in the form of GPS coordinates defining the perimeter of the alert area. Such a boundary is indicated at 1670. Once these boundary coordinates are identified and approved by a governing agency, they can be sent out via Internet/cable/wireless/satellite to all such electronic display devices within an affected area. This means that all moving objects, whether or not equipped with the present invention can encounter such visual displays. Secondly, these coordinates can be sent to all moving objects equipped with the present invention as indicated at 868, 870, 872 or 974 in FIG. 18B, causing such an alert to override other types of content on any equipped vehicles that enter the area 1670 boundary. The advantage, of course, is that local governments are able to instantly deploy critical public service alerts like bridge out or flooding/turn back warnings without having to visit the site to physically set up such temporary signage as is commonly done today. Both fixed electronic signage and moving objects can be quickly changed over from commercial revenue to emergency public service purposes by carrying their audio/visual messages directly to the vehicles, venues and consumers concerned on an exacting and timely basis.

EXAMPLE 2

Figure 33:
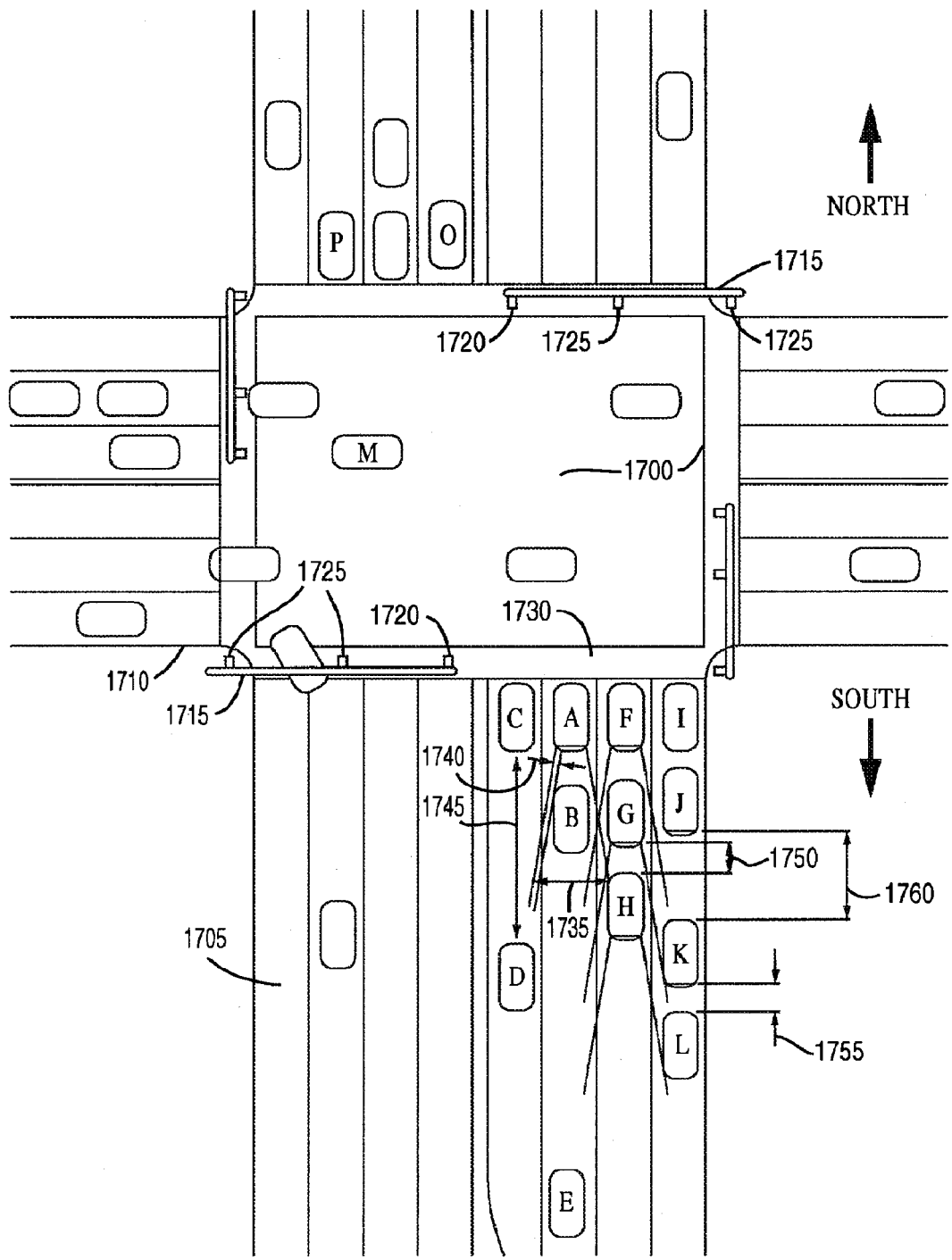
FIGS. 33-34 are illustrations showing the display interactions between moving objects in a city and in a freeway environment.

FIG. 33 illustrates the interactions between moving and stationary objects at a typical city intersection and will help clarify two elements relating to the queuing and display of content on moving objects: (1) allocating timing for display through the use of the Intersection Clock 1800, and (2) specific methods of vehicle-to-vehicle viewing.

A traffic intersection is shown at 1700, bounded by pedestrian crosswalks, a configuration increasingly common in city and rural environments. 1705 indicates an eight lane north/south highway. 1710 represents an east/west highway with active cross traffic. Overhanging traffic light structures 1715 are shown in two places for the north/south corridor. Each of these carries a left turn signal 1720 aligned opposite and above the left turn lane, plus a green/amber/red signal light above through traffic lanes, plus an identical light on each corner, shown as 1725.

Note first the northbound vehicles marked A through L. In this first example, vehicle A has arrived and stopped at the intersection first. Vehicle A is equipped with a production version of the present invention; however, it has not previously been through this particular intersection. As a result, as Vehicle A approached this intersection, several things occurred: (a) the driver of Vehicle A, seeing light 1725 change from green to amber, braked and eased to a stop at crosswalk 1730; (b) a forward-looking optical sensor on Vehicle A, monitoring its approach to the signal light, sensed the signal light's color shift from green to amber; (c) sensing the color change (in the same way as its driver), Vehicle A engaged its onboard Intersection Clock 1800 to begin a recording function to document the signal's red (stop) duration before its return to green (go). By recording this elapsed time and by cross-referencing the vehicle's GPS location and its last heading (northbound), vehicle A is able to initially compile, in terms of gross timing, a beginning database for the signal sequences at this particular location.

Every signal intersection has basic and relatively consistent event timing protocols. Some locations, however, have unique event schedules, but even these can be learned by the Intersection Clock 1800 as defined by the present invention. For example, intersection traffic lights will normally halt traffic flowing in opposing directions to permit the flow of cross traffic. This process normally begins by allowing cross traffic to complete opposing left turns first. After left turns are timed out (about 12-16 seconds), those lanes are then stopped and through traffic is allowed to proceed. After a predetermined period (anywhere from 60 to 90 seconds), this process is halted and the sequence will repeat itself with traffic flowing in the perpendicular direction. Clearly, there are many variations, including one-way streets, multiple streets converging, railroad crossings, etc.; however, when coupled with GPS identification and an ability to spot the start of an event (such as a color transition from green to amber), any vehicle equipped with the Intersection Clock of the present invention can automatically construct a database by time of day for any intersection it uses. Table 1 illustrates a typical traffic signal event timing cycle.

In addition to constructing an event timing database from scratch, moving objects equipped with the present invention are also able to receive intersection event timing data from other moving objects in and around that intersection. In other words, if another vehicle that has previously passed through this intersection arrives moments later, this second arriving vehicle will have the traffic event sequence for this intersection stored in the database of its own onboard Intersection Clock. For example, assume that vehicle H (or even vehicle M, which is currently crossing the intersection) contains such information. Each of these vehicles will automatically broadcast the event sequence for this intersection when it enters or crosses it, by wirelessly transmitting it from its Intersection Clock 1800 through transmitter 714 and antenna 715. In this way, all vehicles equipped with the present invention can immediately update their onboard database for this intersection. At the same time, Vehicle A can contribute an accurate synchronizing signal for these later arrivals because it began recording event timing for the northbound lanes beginning with the signal's light change from amber to red. Through this instant, ad hoc exchange of information at any populated intersection, all properly equipped vehicles can distribute current event timings and synchronize their internal clocks without relying on external infrastructures.

One last step for each Intersection Clock is to calculate for its respective vehicle the amount of time remaining for content presentations before the light turns green in its lane and the traffic begins to flow. From Table 1, one can see that if a vehicle (e.g., southbound Vehicle P) should arrive at the intersection later and synchronize with other vehicles at event Stage 4, then it will have approximately 92 seconds within which to queue and present video content before these vehicles begin to move again. Ninety-two seconds is adequate for two full 30-second commercial spots, two 15-second spots and a two-second dissolve to a corporate logo sponsorship before mandatory vehicle safety systems must again kick in.

Vehicle-to-vehicle communications will be governed through testing, rule making, and the administration of content delivery procedures that define where, when, and under what conditions various types of content can be displayed without compromising highway and traffic operational safety. It is essential that content not detract from a vehicle operator's need to focus on the movements of all objects around them rather than on any graphic content those objects might be displaying, beyond federally mandated lighting and safety systems. The present invention can assure that content will only be viewed or presented when vehicles are fully stopped. It can also assure that content cannot be viewed by vehicles that are passing in adjacent lanes, because this could produce a significant distraction. The kinds of displays anticipated by the present invention can be combined with thin film overlays that can optically or electronically increase or reduce the angles at which imagery can be seen. Optical filters, for example, can be embedded into the outer protective layers for these displays. One basic filter of this kind is 3M Corporation's micro-louvre technology which optically restricts the viewing angles in flat panel displays. Still another technique, created by Sharp Corporation and Sharp Laboratories of Europe, Ltd., permits an LCD to simultaneously display different information and image content in right and left views on a single display by directionally controlling the viewing angle of the LCD. This makes it possible to provide information and content tailored to specific users depending on the precise angle at which they view the display. Such an application could, for example, direct requested hyper-relevant video content directly rearward to a following vehicle, while the view from vehicles passing at more oblique angles could cause the same imagery to dissolve into the default body color for a given vehicle, or into content appropriate for generic or non-requested viewing.

A primary reason for selective or controlled viewing is that content requests are generally private and based on non-identifiable information requests. If an individual in a following (viewing) vehicle has allowed preferences which request content that is quite personal in nature, it would not be desirable for that content to be viewable by the occupants of vehicles in adjacent traffic lanes. Note, for example, Vehicle A, which is presenting requested hyper-relevant content to vehicle B behind it. Note the angular spread indicated at 1735. This lateral spread controlled by the previously mentioned technologies prevents the occupants of surrounding vehicles D, G, or H from seeing what is being displayed on the rear-facing surfaces of Vehicle A. Vehicle D's exposure is blocked by vehicle B, as shown by dimension 1740. If Vehicle B were not in close proximity to Vehicle A, this condition would be detected by Vehicle A's proximity sensor 770, and the system would prevent the queuing of highly personal hyper-relevant content. Vertical viewing angles can be controlled in the same way as horizontal viewing angles to prevent, for example, the viewing of personal content from adjacent trucks or busses having seating positions that are inherently higher relative to the ground. Additionally, all such imagery would not incorporate animations or otherwise distractive content until the surrounding viewing vehicles have come to a complete stop.

Note that at 1745, Vehicle D has requested content from Vehicle C. Vehicle C can select and queue that content; however, it cannot present it until Vehicle D has come to a full stop at a predetermined range behind Vehicle C, such spacing predicated on the respective VINs of the two vehicles. Such optimum spacing is reflected by Vehicles G and H, at dimension 1750. Here, vehicle G is a high SUV and vehicle H is a low two-door sports coupe. The VIN numbers exchanged between these vehicles during the requesting protocol has identified the respective heights of each vehicle along with the eye envelope for an average percentile driver in the following (viewing) vehicle. This information yields an optimum viewing range between these two objects. Furthermore, as vehicle H closes the gap with vehicle G, a small green dot will appear on the rear-facing display of Vehicle G. As the driver of Vehicle H continues forward, this spot will grow increasingly amber and finally red which indicates the optimum stopping point for best viewing through vehicle H's windshield. At this point, the dot will disappear and content viewing will commence. This fore/aft vehicle spacing feature of the present invention will additionally conserve thousands of square feet of space in traffic lanes simply by allowing vehicles to maintain more efficient vehicle-to-vehicle tandem spacing.

By contrast, vehicles K and L have reached optimum spacing, as shown at distance 1755; however, vehicle K cannot present content because both vehicles are drifting slowly forward in the same lane. Once both vehicles reach a full stop, they can commence content display. On the other hand, Vehicle K has made an automatic content request of Vehicle J at a relatively distant range shown at 1760. Because vehicle J is at a full stop, it might be allowed to queue and present certain kinds of static content (such as a non-animated corporate logo) until Vehicle K is fully stopped at optimum spacing behind vehicle J.

Figure 34:
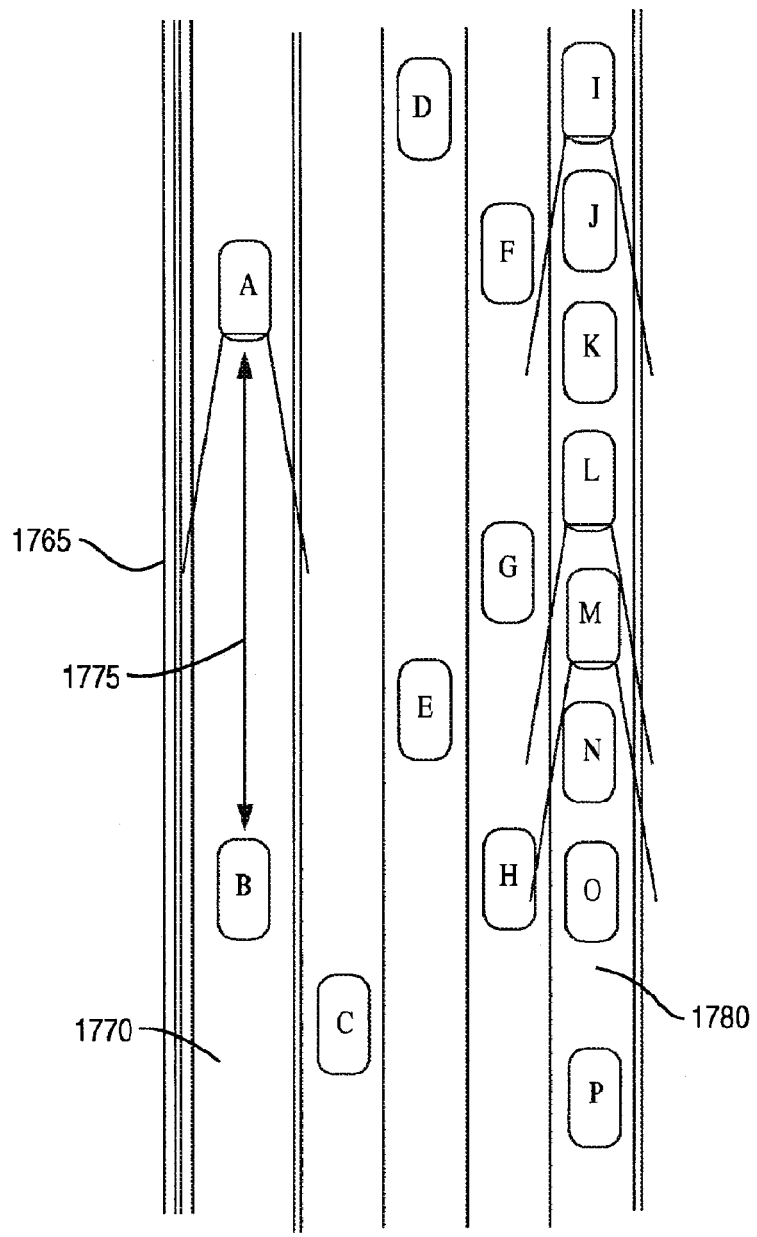

FIG. 34 shows a section of freeway with lanes in one direction, having a center divider 1765 and a carpool lane 1770. Moving at consistent freeway speeds, Vehicle B may make content requests forward to Vehicle A, as shown at 1775, however, such requests will be fulfilled only on a limited basis due to relative vehicle speed and range protocols. During day and night hours at speed, commercial imagery is likely to be limited to small centrally-located display areas on digital rear-ends and animation would not be permitted unless vehicles are fully stopped. This is because animated or moving images can distract nearby drivers. At the same time, protocols would not want to dissolve or delete commercial imagery before engaging a vehicle's lighting and safety systems as this could introduce dramatic changes in object appearance while they are underway. Additionally, during night driving hours, all lighting and safety systems would remain active on all moving objects, regardless of speed, proximity, or location since uniform taillights, running lights, and turn signals are vital elements in allowing drivers to judge the distances and conditions of vehicles ahead.

An exception might occur between stopped or extremely slow stop and go traffic as depicted in the far right lane 1780. Such a condition could be caused by a backed-up off ramp. If, over time, such blockages on heavily traveled freeways become repetitive, these conditions would gradually be recorded on the Intersection Clocks of moving objects equipped with the present invention. Estimates of such delays can then be monitored for consistency and certain kinds of content or public service alerts can be displayed. In such cases, vehicles can use their on board transmitters to measure the relative movements in long rows of vehicles and opportunities can be identified for the queuing and display of short duration content while these vehicles are near-stationary. In lane 1780 from top to bottom, Vehicle I is presenting nonspecific (generic) commercial content to Vehicle J (which does not possess the present invention), Vehicle L is presenting hyper-relevant content to vehicle M (which has requested it), and vehicle M is presenting generic content to vehicle N. Of significant value in such situations is the ability of any vehicle fitted with the present invention to synchronize public service or traffic safety displays with other properly equipped vehicles. As previously mentioned, freeway speed changes, when communicated uniformly by radio between multiple vehicles simultaneously, followed by a uniform response (such as causing all of the vehicle's rear lighting systems to glow amber (for caution) and then transition at the same rate to red-amber and then red at uniform brightness levels (as opposed to individual brake lights flashing instantly on without warning), will result in considerably safer driver control and in the virtual elimination of progressively exaggerated slowing which leads to rear-end collisions. The U.S. Government currently has programs in place to develop such highway technologies which could easily adopt or interface with the present invention. One such program is the Forward-Looking Rear-End Collision Warning System (FCW) designed to explore and ultimately deploy driver warning methodologies. The digital vehicle rear-end and lighting safety systems anticipated by the present invention conforms to all of the targeted Warning Display Characteristics and to the Following-Too-Closely Warning Methodologies dictated by the study since it approaches the FCW warning display in a distinctly novel way. Of equal importance is the present invention's consumer adoption plan—one driven by commerce rather than legislation—because it enables participating consumers to generate revenue and, as a result, represents a unique opportunity for new technology adoption. Suppose we wanted to stimulate the broad adoption of energy-efficient vehicles. By incorporating the present invention into such vehicles first, we allow consumers to generate significant personal revenues, which effectively offset their inherently higher manufacturing, acquisition, and infrastructure costs.

Figure 35:
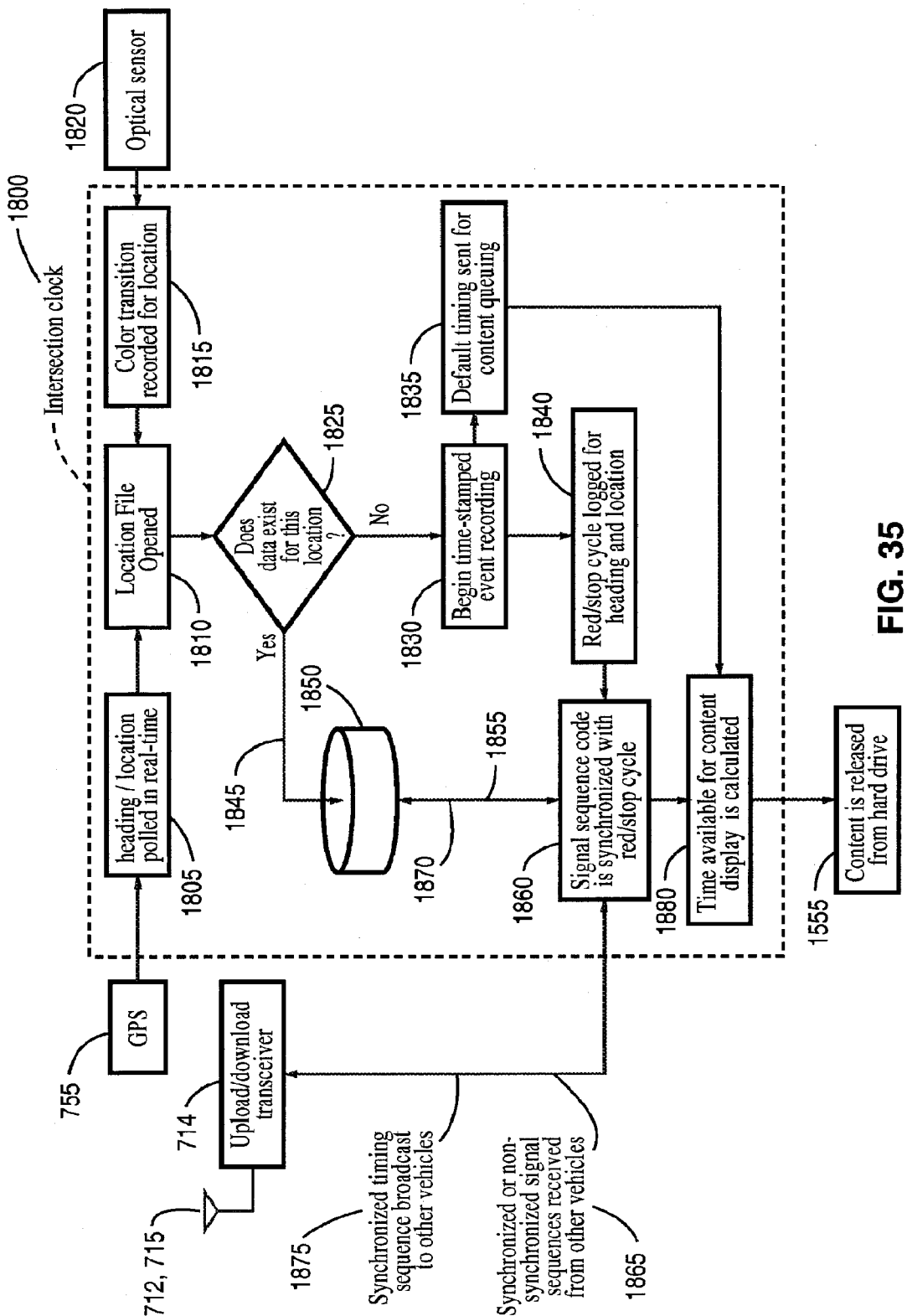
FIG. 35 is a diagram of the Intersection Clock for measuring the time available for display.

FIG. 35 is a block diagram of the Intersection Clock 1800, a device that enables the recording of traffic signal timing sequences and measures the time available for the display of content at locations where traffic flow is controlled by infrastructure. The Intersection Clock is linked to a vehicle's onboard GPS navigation system 755 (normally through vehicle interface 730), which introduces vehicle heading and location data to the Intersection Clock as indicated at 1805 on an ongoing basis in real-time. The Intersection Clock is also linked to an optical sensor 1820, which, in a traditional land-based traffic environment, is forward-looking and, in a preferred embodiment, reads the colors of traffic signal lights as the vehicle approaches them. This sensor seeks and monitors the presence of a green light, which is characteristic of traffic "go" conditions, then activates to an "alert" status when the green light transitions to amber, responding in the same way as a driver would to the light color change. Color transitions are received and documented at 1815, where they are assigned a GPS location using traditionally available electronic means. The moment this amber light transitions to red, a time-stamped signal is sent to clock component 1810 and a Location File is opened for that venue based on the vehicle's last direction of travel and its current position. At that moment, the Intersection Clock 1800 checks for previously stored information for this location. If, at 1825, it is determined that no sequence code or synchronizing signal is stored, event time recording is triggered at 1830, commencing with the light's transition from amber to red. At the same time, a default time-remaining signal 1835—an average based on stored data for traffic signals in the area—is forwarded to Intersection Clock 1880, which allows certain content to be queued. Meanwhile, at 1840, the red/stop cycle timing (which began with the amber to red transition) is logged for the vehicle's direction and location for storage in its clock's database 1850. In the absence of further incoming data, this information will be logged in this vehicle's database for future use at these GPS coordinates. If there is indeed data in database 1850 which relates to this location, then that signal sequence code data is retrieved at 1845, then passed from the data base as shown in path at 1855 to 1860, where the sequence code is then synchronized to the red/stop cycle just logged for this heading and location.

However, it is also possible for synchronized signal sequence codes or non-synchronized signal codes to be received, as indicated at 1865, from other vehicles equipped with the present invention. This is accomplished via antennas 712, 715 and transceiver 714. These codes, as well as synchronizing signals, can be broadcast between vehicles that are either passing one another or arriving on the scene at different times. If a vehicle arrives that possesses signal sequence codes regarding the location, it is able to broadcast, on an ad hoc basis (from one vehicle to another), the traffic light timing sequence it has logged for this location. In this way, a vehicle that does not originally have the timing sequence can receive it as shown at 1865, and can then synchronize this sequence at 1860 using the red/stop cycle event recording it is either processing or has logged at 1840. When a new or updated code sequence has been received from another vehicle, or has been recorded for a specific location using new data, it is sent to database 1850, as indicated at 1870, for storage and use when that vehicle returns to the same location. Conversely, when a vehicle that possesses the sequence code in its database for a particular location arrives after a vehicle which has begun recording the amber-red event start cycle, that vehicle can then synchronize its sequence code with the earlier arriving vehicle.

The final step for the Intersection Clock 1800 is to calculate the time remaining for the display of content. This is accomplished by identifying the current point in the timing cycle (based on the amber to red transition for a given direction by any vehicle, and as shown in more detail in the description for FIG. 33), and then determining, at 1880, the time remaining before the red (stop) light transitions to green (go) for a given direction of travel. Once that is determined, content packages fitting the remaining time can be queued and released from the content hard drive 716, as shown at 1555. Bear in mind that the Intersection Clock 1800 merely defines the time within which moving objects equipped with the present invention can display imagery before it must be terminated in favor of other operating systems. This process does not in any way control the physical operation of motor vehicles or moving objects.

EXAMPLE 3

Finally, a much more basic example of a preferred embodiment of the present invention is the incorporation of such a system into the family car. Bringing home an automobile with the present invention built in could be reminiscent of bringing home the first family television, video recorder, or computer of years past.

Dad decided it would be a family surprise—a new Lexus 'Crossover' car—rugged enough for family vacations, yet refined enough for the office and for mom to do lunch with her friends. It came in two models, one basic, the other with Lexus' new on-board ad display system, something the company called an "ad/hybrid." Other than this, the models were identical. With financing, the slight increase in cost for the ad/hybrid was barely noticeable in the monthly payment, but the window sticker made it clear the car would produce handsome annual revenue for its owner, significantly offsetting the costs of its built-in ad display technology. On the sticker, this revenue had been translated in terms of the car's annual savings in operating costs in the same way as its average fuel performance had been estimated. Dad signed the papers, the dealer pre-registered the ad/hybrid's VIN and dad headed for home.

The kids were all over the car as soon as it drove up the drive. Right away, his 8-year old daughter wanted to place picture ads for her after-school dog walking business. His 14-year old son was ready to hook up his DVD player so that he and his friends could watch wide screen tailgate movies on the lawn. In fact, both kids seemed to know more about the technology than dad, and mom just looked on disapprovingly from the door, irked at the thought of such blatant commercialism. Indeed, a car that shows commercials!

That night, dad logged onto the well-crafted Lexus site which had the look and feel of a welcoming online community. It allowed him to create user names for each family member and to finish the registration process he'd begun at the dealership. Quietly and thoughtfully, dad completed his user profile by following the easy prompts, describing himself, his interests, and those of his family. He noticed that he was never asked any truly personal information in the profile—just age, gender, occupation, educational level, and the like—all in easy to answer multiple choice questions, which also encouraged him to describe the things he liked and was genuinely interested in. He guessed correctly that everything was somehow linked to the new car's VIN.

When he was done he clicked "send." Later that evening, when he stepped to the garage for another look at his new car, he was surprised to see that its new license plate was softly glowing on the car's otherwise dark rear digital display. What an improvement, he thought, to no longer have to bolt on metal plates and add new stickers each year.

The next morning, when pausing behind another car at a boulevard stop on his way to work, the display on the car ahead burst into light and color, greeted dad with his own user name and welcomed him to the Lexus ad network. Minutes later, behind another vehicle on the freeway on ramp, he viewed a 30-second spot for his favorite ball club, a promotion for ABC's Monday Night Football, and was offered 50% off for his birthday at the Sports Chalet a few blocks from his home. He had completely forgotten that next week was his birthday!

Dad parked the new Lexus in his regular spot in the company's parking garage, unaware that antennas overhead were already uploading the morning's recorded ad deliveries and downloading to his hard drive the latest content released to the Internet just seconds before in New York.

On the drive home, in stop and go freeway traffic, dad noticed that all of the cars in front of him, regardless of make or model, displayed a brightly colored Nike logo that pulsed and glowed as the cars slowed and sped up. Of course! They were passing the convention center and this week was the big Sporting Goods Manufacturing Association (SGMA) Show, where Nike was a major sponsor. Smart of them to buy the local ad space, he thought to himself. A few blocks past the convention center, the Nike sponsorships dissolved to be to be replaced by logos for American Express, Best Buy, Home Depot, and NASCAR. Dad noted that when cars were moving at reasonable speeds, they were unable to display anything other than simple, non animated logos, easily read from distances; in fact, not much different from trucks and commercial vehicles seen on the streets in past decades. Dad squeezed the ad pad on his steering wheel and the small display in his instrument cluster revealed the image that was currently playing on the back of his Lexus to whomever was behind him: Victoria's Secret! He recalled that his profile allowed him to check off any sponsor whose product or service he preferred not to carry. As the freeway traffic slowed, he noticed that logos would softly fade to be replaced by standard brake or turn signal lighting, which now even changed color gradually with reduced speeds, shifting from deep amber for gradual speed reductions to brilliant red for full braking. Later, as traffic crept slowly forward, each car's license plate was prominently displayed absent any advertising. Every time his new Lexus drew close to a car ahead which was at a full stop, a green spot appeared on that car's rear-facing display and gradually changed to amber, then red, at which point he stopped and the spot vanished. This, he knew, placed him at a minimum spacing between vehicles in traffic, and at the optimum range and sightline for best viewing based on the model and VIN codes transmitted between the two vehicles. According to the reports he had read, this proximity compacting byproduct alone had conserved hundreds of square miles of wasted traffic lane space on city streets, freeing up turn lanes at many crowded intersections. Once he was fully stopped in traffic, the display on the car in front of him faded to black and music filled his own car's interior, fed through his Lexus' surround sound system. The display on the car ahead then burst forth into a wide-screen movie trailer complete with stereo sound, which then faded out, to be replaced with brake lights, as traffic crept forward again. Stopped once again, the brake lights faded and the movie preview picked up where it had left off and finished by offering him family discount tickets at the theater in his own neighborhood. And it was his kind of movie. Dad knew the preference codes came from his own on-board profile in the Lexus, but he was unsure as to whether the video and audio content came from his car or the car ahead. He knew it could come from either.

When dad arrived home he found that his daughter had finished a little graphic ad for her dog walking service. How could he refuse to let her upload it to the family car? After all, it would only show in the immediate neighborhood, and then, only at special times of the day. In fact, the procedure was so simple, that once she completed her profile, she was able to upload her little commercial for network approval all by herself; however, the network declined to let her present her phone number since she was under the age of 18. Her brother, meanwhile, had completed his profile using his own computer and had downloaded it—again for network approval—under his own name and password using the family's wireless home network.

As dad drove to work the next morning, he was barraged by ads for snowboards, video games, a radical new soda, and previews for kid's TV shows until he realized the car was tuned to his son's new preferences and not to his own preference settings. That evening, he made sure that each family member had their own password and he proclaimed himself the ad/hybrid's official system administrator.

On Saturday, mom borrowed the Lexus to accompany two of her friends for a luncheon and a book review at the Mondrian Hotel downtown. Dad showed her how to switch off the system so it wouldn't become an 'embarrassment' to her while she chatted with her friends. Sure enough, not once was the girls' conversation interrupted by unseemly commercials on the backs of the cars ahead, although at one corner, a large SUV lit up in front of her warning of roadwork and a closed road on her usual route to the Mondrian. Thanks to the ad/hybrid's to warn her of a traffic blockage in real time, she and her friends arrived on time, while other attendees got caught up in the delay and missed the beginning of the show. Driving home alone, and now curious, mom switched on the ad/hybrid's system. Two blocks from the Hotel, a black Escalade lit up in front of her, displaying an elegant photo of the Mondrian and thanked her for her recent visit, followed with an offer of a getaway package for two at any of the Mondrian hotels nationwide. Mom pushed the "I" button dad had told her about, and requested that information be emailed to her computer. Before mom got home, she had watched a knockout commercial for a new Clairol product, a teaser for a new high-end shoe store, and was persuaded to drive three blocks off her route to a Borders Bookstore Grand Opening. That evening, she relented and completed her own online ad/hybrid profile so she too could receive hyper-relevant ads.

A month passed and mom's Visa Statement arrived. To her surprise, it showed a $48.70 credit under a Citibank promotion, just because she had watched a few ads! That evening, she mentioned her little windfall to her husband. Dad went to his home office and returned proudly with a check from Lexus in the amount of $849.60, just because he had displayed a few ads.

Those skilled in the art will appreciate that the exemplary embodiments described herein can be implemented in various ways. For example, visual displays can be of any conventional type, such as thin film transistor (TFT) displays, organic light-emitting diode (OLED) displays, or any other type of visual display suitable for the particular context of installation and use. Network systems and devices can be server-based or peer-to-peer, centralized or decentralized, secured or unsecured, or the like. Communications and network interfaces between systems and devices can include wired (e.g., Ethernet, wire cable, optical fiber, and the like) and wireless (e.g., radio frequency, infrared, light modulation, and the like) interfaces. Systems, devices and components can be implemented using hardware, firmware, software, or any combination thereof, including programmed or programmable data processors, fixed or removable memory or other storage media, input/output (I/O) devices and adapters, and the like. Furthermore, means for displaying the content can be fixed or removable, can be attached to or integrated into moveable or stationary objects (including but not limited to cars, trains, trucks, aircraft, watercraft, mobile telephones, wireless handheld data devices, and other devices having, or capable of, being connected to a visual display), according to context of use.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Typical Traffic Signal Event Timing Cycle

| | North/South Traffic | | | East/West Traffic | |
|---|---|---|---|---|---|
| | Left Turn | Thru Traffic | Seconds | Left Turn | Thru Traffic |
| (1) | red/wait | amber-red/stop | 3 sec | red/wait | red/wait |
| (2) | red/wait | red/wait | 12 sec | ← green/go | red/wait |
| (3) | red/wait | red/wait | 68 sec | ← red/wait | green/go |
| (4) | red/wait | red/wait | 3 sec | red/wait | amber-red/stop |
| (5) | ← green/go | red/wait | 14 sec | red/wait | red/wait |
| (6) | red/wait | green/go | 78 sec | red/wait | red/wait |

What is claimed is:

1. A system, comprising:
   a mobile communication device comprising a transmitter capable of forming a direct communication link with a vehicle that is capable of moving, and a memory storing data regarding a user associated with said mobile communication device, wherein said data includes a user defined set of choices that determine timing and proximity for display of content on the vehicle based on choice data provided by said user regarding said user;
   the vehicle comprising a receiver, wherein the direct communication link is formed with aid of the receiver, and an exterior display capable of displaying the content;
   wherein the mobile communication device and the vehicle directly exchange information via the direct communication link, said information including (a) position information about the mobile communication device or the vehicle used to calculate a proximity between the mobile communication device and the vehicle, wherein the proximity between the mobile communication device and the vehicle is recalculated when the vehicle moves, and (b) a request for content to the vehicle based on the data regarding the user associated with the mobile communication device;
   wherein the content is presented to the user associated with said mobile communication device, at least a portion of which is displayed on the exterior display of the vehicle; and
   wherein a record of the presentation of the content is stored in a memory, said record comprising (1) information regarding the content presented, and (2) information comprising confirmation of the direct communication link between the mobile communication device and the vehicle.

2. A system as recited in claim 1: wherein said data regarding the user associated with the mobile communication device includes a profile of the user that indicates what the user wants.

3. A system as recited in claim 1, wherein the information comprising the confirmation of the direct communication link includes confirmation by both the mobile communication device and the vehicle of the direct communication link.

4. A system as recited in claim 1: wherein the at least the portion of the content is displayed when said mobile communication device is at a predetermined direction relative to the vehicle.

5. A system as recited in claim 1: wherein said mobile communication device is a second vehicle.

6. A system as recited in claim 5: wherein said vehicle and said second vehicle are capable of being in self-propelled motion while the direct communication link is formed.

7. A system as recited in claim 5: wherein the presentation of said content occurs in an interior portion of said second vehicle.

8. A system as recited in claim 1: wherein said mobile communication device is a handheld device.

9. A system as recited in claim 1: wherein said mobile communication device is a second vehicle; and wherein said data regarding the user associated with said mobile communication device includes other users or potential users associated with said mobile communication device.

10. A system as recited in claim 1: wherein said mobile communication device and said vehicle directly exchange information via the direct communication link relating to one or more of the following: information relating the character, configuration, and properties of said mobile communication device or said vehicle; information relating to surrounding objects; or information relating to surrounding locations.

11. A system as recited in claim 1: wherein presentation of said content is influenced by information relating to scheduling patterns of nearby traffic signals.

12. A system as recited in claim 1: wherein said content further includes a portion not based on said data regarding the user.

13. A system as recited in claim 1, further including: a priority system relating to presentation of said content based on a nature of said content.

14. A system as recited in claim 13: wherein the nature of said content is classified as emergency content; content relating to a surrounding environmental condition; registration and identification content relating to said second object; public safety content; or a combination thereof.

15. A system as recited in claim 1: wherein relative motion data from said mobile communication device and said vehicle determines one or more of the following: whether content is presented; or whether presented content is presented as animated video or static video.

16. A system as recited in claim 1: wherein said content includes one or more of the following: audio content, or video content; said audio content presented by said mobile communication device; and said video content presented by either said mobile communication device or said vehicle.

17. A system as recited in claim 1: wherein said mobile communication device is a second vehicle; and wherein said content indicates to an operator of said second vehicle a stopping position relative to the vehicle for an optimal line of site to said content.

18. A system as recited in claim 17: wherein speed and positioning information is exchanged between all vehicles within a transmission range; and wherein said content presented to said second vehicle indicates to an operator of said second vehicle relative braking conditions of any vehicles in front of said second vehicle.

19. A system as recited in claim 1: wherein said vehicle has a user associated with said vehicle; and wherein at least a portion of said content presented to said user associated with said mobile communication device is created by said user associated with said vehicle.

20. A system as recited in claim 1: wherein a third party purchases a right to present content on said vehicle; and wherein said vehicle presents content based on preferences of said third party.

21. A system as recited in claim 20: wherein said right is based on one or more of the following: a fixed or relative geographical area; a time of day; or a period of available display time.

22. A system as recited in claim 1: wherein said data regarding the user is transferable to other vehicles at an option of the user associated with said mobile communication device.

23. A system as recited in claim 1: wherein said content is presented in a manner to render said content not viewable by individuals other than the user associated with said mobile communication device.

24. A system as recited in claim 1, further comprising: a display integrated into an exterior body panel of said vehicle; wherein at least a portion of said content presented to said user associated with said mobile communication device occurs on said display.

25. A system as recited in claim 1: wherein the presentation of said content occurs on an exterior portion of said vehicle.

26. A system as recited in claim 1, further comprising: a first storage medium associated with said mobile communication device; a second storage medium associated with said vehicle; wherein the record of the presentation of said content is stored in said first and second storage media.

27. A system as recited in claim 26, further comprising: a central server wirelessly connected to said mobile communication device and the vehicle; wherein said record of the presentation of said content is uploaded to said central server.

28. A system as recited in claim 27: wherein a compilation of uploaded data is offered for sale.

29. A system as recited in claim 28: wherein said record of the presentation of said content includes time of display; subject matter of said content; duration of display of said content; a subset of said data regarding the user; or any combination thereof.

30. A system as recited in claim 1, further comprising: a record of compensation to said user associated with said mobile communication device for forming the direct communication link with the vehicle.

31. A system as recited in claim 1: wherein information is exchanged between said mobile communication device and the vehicle related to identities of said vehicle and the mobile communication device.

32. A system as recited in claim 1: wherein said mobile communication device and said vehicle exchange information related to audio playing in said mobile communication device; and wherein said content is video content synchronized to said audio.

33. A system as recited in claim 1: wherein content presented to said user associated with said mobile communication device is limited by a user associated with said vehicle.

34. A system as recited in claim 1, wherein at least a portion of the content is displayed on a formed display with surfaces contoured to meet body panels of the vehicle.

35. A system as recited in claim 1, wherein the display is an organic light-emitting diode (OLED) display.

36. The system of claim 1 wherein said information including the request for content is exchanged via the direct communication link when the calculated proximity between the mobile communication device and the vehicle fall within a predetermined proximity threshold.

37. The system of claim 1, wherein said timing and said user defined set of choices include a number of passengers in the vehicle other than the user.

38. The system of claim 1, wherein said timing and said user defined set of choices include whether the vehicle is moving or stationary.

39. The system of claim 1, wherein timing and said user defined set of choices include the user's willingness to view advertisements during a given time period.

40. The system of claim 1, wherein the defined set of choices includes blocking at least a subset of the content displayed on the exterior display of the vehicle from individuals other than the user.

41. The system of claim 1, wherein the defined set of choices includes blocking of at least one specified advertisement type.

42. A computer implemented method, comprising:
compiling a user defined set of choices that determine timing and proximity for the display of content on a vehicle that is capable of moving based on choice data provided by said user regarding said user;
associating said defined set of choices with a mobile communication device, said mobile communication device associated with said user;
forming the direct communication link between the mobile communication device and the vehicle via a transmitter of the mobile communication device, and a receiver of the vehicle;
transmitting position information about the mobile communication device or the vehicle, directly via the direct communication link from said mobile communication device to said vehicle;
calculating a proximity between the mobile communication device and the vehicle using the position information transmitted via the direct communication link, wherein the proximity between the mobile communication device and the vehicle is recalculated when the vehicle moves;
transmitting a request for content to the vehicle via the direct communication link based on said user defined set of choices; and
presenting the content to said user associated with said mobile communication device, at least a portion of which is displayed on an exterior display of said vehicle, wherein a record of the presentation of the content is stored in a memory, said record comprising (1) information regarding the content presented, and (2) information comprising confirmation of the direct communication link between the mobile communication device and the vehicle.

43. A method as recited in claim 42, wherein the information comprising the confirmation of the direct communication link includes confirmation by both the mobile communication device and the vehicle of the direct communication link.

44. A method as recited in claim 42, further comprising: prioritizing the presentation of said content based on a purpose of said content; wherein purpose of said content is one or more of the following: advertising; informational; traffic related; safety related; news related; region specific; political; or mere frivolity.

45. A method as recited in claim 44, further comprising: pre-empting the presentation of said content based on one or more of the following: surrounding environment of said mobile communication device and said vehicle; presence of emergency circumstances; or public interest.

46. A method as recited in claim 42, further comprising: prioritizing the presentation of content based on preferences of said user.

47. A method as recited in claim 42, further comprising: transferring said user defined set of choices to other vehicles at an option of said user.

48. A method as recited in claim 42, further including: displaying registration and identification information for said vehicle on said vehicle.

49. A method as recited in claim 42, further including: displaying content created by a user associated with said vehicle on said vehicle.

50. A method as recited in claim 42, further including: displaying indicators of optimal traffic and view positioning on said vehicle to said user; wherein said mobile communication device is a second vehicle.

51. A method as recited in claim 42, further including: pre-empting the presentation of said content in the presence of external wireless signals for emergency or traffic direction purposes.

52. A method as recited in claim 42, wherein said mobile communication device is a second vehicle and further including: presenting audio content to said user using said second vehicle.

53. A method as recited in claim 42, further including: presenting video content to said user using one or more of the following: said mobile communication device, or said vehicle.

54. A method as recited in claim 42: directly exchanging information relating to information relating the character, configuration, and properties of said mobile communication device and said vehicle; information relating to surrounding vehicles; and information relating to surrounding locations; or any combination thereof, via a direct communication link formed between said mobile communication device and said vehicle.

55. A method as recited in claim 42, further comprising: presenting no content or content as one or more of the following: animated video, or static video, based on relative speeds between said mobile communication device and said vehicle.

56. A system as recited in claim 42: wherein said exterior display is integrated into an exterior body panel of said vehicle.

57. A system as recited in claim 42: wherein said exterior display is on a rear portion of said vehicle.

58. A system as recited in claim 42, further comprising: storing the record of the presentation of said content in said mobile communication device and said vehicle.

59. A system as recited in claim 58, further comprising: uploading said record of said presentation of said content to a central server wirelessly connected to said mobile communication device or said vehicle.

60. A system as recited in claim 59, further comprising: offering a compilation of uploaded data from said central server for sale.

61. A system as recited in claim 60: wherein said record of said presentation of said content includes one or more of the following: time of display; subject matter of said content; duration of display of said content; or a subset of said user defined set of choices.

62. The method of claim 42 wherein the display is a display integrally forming a one or more body panels or glazing of said body panels, wherein the display is an OLED display.

63. The method of claim 62 wherein the OLED display integrally forms a back panel or glazing of a back panel of the vehicle.

64. The method of claim 42 wherein the transmission of the request for content occurs when the calculated proximity between the mobile communication device and the vehicle fall within a predetermined proximity threshold.

65. The method of claim 42, wherein said record of the presentation of the content further comprises information comprising financial compensation for the content presented, said financial compensation determined based on the information about the confirmation of the direct communication link.

66. The method of claim 65, wherein said financial compensation is calculated to be zero.

67. A method, comprising:
 forming a direct communication link between a mobile device and a vehicle via a transmitter of the mobile communication device and a receiver of the vehicle;
 populating said vehicle with content; and
 presenting said content to a user associated with said mobile communication device on a display integrally forming one or more body panels or glazing of said body panels of said vehicle, wherein at least a portion of said content indicates to the user of the mobile communication device a stopping position relative to the vehicle for an optimal viewing distance between the vehicle and the mobile communication device for the user to view said content, depending on information transmitted directly from said mobile communication device to said vehicle via the direct communication link, said information including a unique profile or portion thereof of the user the associated with said mobile communication device that is provided by said mobile communication to said vehicle.

68. A system, comprising:
 a mobile communication device comprising a transmitter capable of forming a direct communication link with a vehicle, and a memory storing data regarding a user associated with the mobile communication device;
 the vehicle comprising a content storage device and a receiver, wherein the direct communication link is formed with aid of the receiver; and
 a display integrally forming one or more body panels or glazing of said body panels of said vehicle for presenting content stored on said content storage device to the user associated with the mobile communication device, wherein at least a portion of said content indicates to the user of the mobile communication device a stopping position relative to the vehicle for an optimal viewing distance between the vehicle and the mobile communication device for the user to view said content, depending on information transmitted directly from said mobile communication device and said vehicle via the direct communication link, said information including said data regarding the user associated with the mobile communication device.

69. A system as recited in claim 68, wherein at least a portion of the content is displayed on a rear surface of the vehicle.

70. The system of claim 68 wherein the portion of said content that indicates the stopping position includes a visual color change indicative of proximity to the vehicle.

* * * * *